United States Patent
Kobayashi

(10) Patent No.: US 8,213,516 B2
(45) Date of Patent: Jul. 3, 2012

(54) IMAGE PROCESSING APPARATUS, IMAGE PROCESSING METHOD, AND COMPUTER PROGRAM

(75) Inventor: Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1539 days.

(21) Appl. No.: 11/382,965

(22) Filed: May 12, 2006

(65) Prior Publication Data
US 2006/0262861 A1 Nov. 23, 2006

(30) Foreign Application Priority Data

May 17, 2005 (JP) ................. P2005-144146

(51) Int. Cl.
H04N 7/12 (2006.01)
H04N 11/02 (2006.01)
H04N 11/04 (2006.01)
H04B 1/66 (2006.01)

(52) U.S. Cl. ................................. 375/240.21
(58) Field of Classification Search .......... None
See application file for complete search history.

(56) References Cited

U.S. PATENT DOCUMENTS

| | | | | |
|---|---|---|---|---|
| 5,270,813 A | * | 12/1993 | Puri et al. | 375/240.15 |
| 5,748,789 A | * | 5/1998 | Lee et al. | 382/243 |
| 6,148,027 A | * | 11/2000 | Song et al. | 375/240 |
| 6,332,002 B1 | * | 12/2001 | Lim et al. | 375/240.17 |
| 7,177,358 B2 | * | 2/2007 | Inomata et al. | 375/240.12 |
| 7,457,474 B1 | * | 11/2008 | Haskell et al. | 382/243 |
| 7,680,191 B2 | * | 3/2010 | Nguyen et al. | 375/240.19 |
| 2002/0064296 A1 | * | 5/2002 | Kondo et al. | 382/100 |
| 2004/0036807 A1 | * | 2/2004 | Takahashi et al. | 348/700 |
| 2006/0083309 A1 | * | 4/2006 | Schwarz et al. | 375/240.16 |

FOREIGN PATENT DOCUMENTS

| | | |
|---|---|---|
| JP | 03-007473 | 1/1991 |
| JP | 03-093377 | 4/1991 |
| JP | 07-222145 | 8/1995 |

OTHER PUBLICATIONS

Japanese Office Action dated Jun. 16, 2010 for Japanese Application No. 2005-144146.
"Overview of Fine Granularity Scalability in MPEG-4 Video Standard", IEEE Transactions on Circuits and Systems for Video Technology, vol. 11, No. 3, Mar. 2001.

* cited by examiner

Primary Examiner — Nhon Diep
(74) Attorney, Agent, or Firm — SNR Denton US LLP

(57) ABSTRACT

An image processing apparatus that compresses moving-picture data includes an image converter configured to decimate pixels in individual blocks that are defined by dividing moving-picture frames, the image converter being configured to generate a plurality of layer signals using different sampled pixels corresponding to representative pixels in pixel decimation; and an encoder configured to receive input of the plurality of layer signals generated by the image converter and to generate encoded data based on the layer signals.

7 Claims, 37 Drawing Sheets

| $P_{00}$ | $P_{10}$ | $P_{20}$ | $P_{30}$ |
| --- | --- | --- | --- |
| $P_{01}$ | $P_{11}$ | $P_{21}$ | $P_{31}$ |
| $P_{02}$ | $P_{12}$ | $P_{22}$ | $P_{32}$ |
| $P_{03}$ | $P_{13}$ | $P_{23}$ | $P_{33}$ |

(b) REPRESENTATIVE PIXEL (SAMPLING POINT) → $P_{10}$, $P_{11}$, $P_{12}$, $P_{13}$ (c) REPRESENTATIVE PIXEL (SAMPLING POINT) → $P_{01}$, $P_{11}$, $P_{21}$, $P_{31}$

(b) REPRESENTATIVE PIXEL (SAMPLING POINT)
| $P_{00}$ | $P_{01}$ | $P_{02}$ | $P_{03}$ |
| $P_{20}$ | $P_{21}$ | $P_{22}$ | $P_{23}$ |

(c) REPRESENTATIVE PIXEL (SAMPLING POINT)
| $P_{00}$ | $P_{10}$ | | $P_{20}$ | $P_{30}$ |
| $P_{02}$ | $P_{12}$ | | $P_{22}$ | $P_{32}$ |

IMAGE PROCESSING APPARATUS, IMAGE PROCESSING METHOD, AND COMPUTER PROGRAM

CROSS REFERENCES TO RELATED APPLICATIONS

The present invention contains subject matter related to Japanese Patent Application JP 2005-144146 filed in the Japanese Patent Office on May 17, 2005, the entire contents of which are incorporated herein by reference.

BACKGROUND OF THE INVENTION

1. Field of the Invention

The present invention relates to image processing apparatuses, image processing methods, and computer programs. More specifically, the present invention relates to an image processing apparatus, an image processing method, and a computer program with which scalability is provided so that it is possible to control quality of picture display selectively in accordance with the status of bandwidth of a transmission path, the processing ability of an apparatus, and so forth.

2. Description of the Related Art

In schemes for encoding moving pictures, for example, defined by MPEG (Moving Picture Experts Group), techniques referred to as SNR (signal to noise ratio) scalability and FGS (fine granular scalability) exist. Using these techniques, it is possible to define layers of encoded bitstreams so that a recipient of encoded data can determine the quality of output pictures by selectively decoding data.

SNR scalability techniques are defined in MPEG-2 encoding. According to the techniques, a low-SNR bitstream (base layer) generated by an encoder with a rough quantization size, and extra bitstreams (enhancement layers) generated by small quantization sizes from signals obtained by subtracting base signal components from input signals are transmitted in layers, so that a recipient can obtain a low-SNR picture of a lowest quality by decoding only the base signal in accordance with the status of communications.

FGS techniques are defined in MPEG-4 encoding. According to FGS techniques, it is possible to control SNR more delicately in enhancement layers. According to FGS techniques, DCT (discrete cosine transform) coefficients are bit-plane encoded for transmission, so that it is possible to control picture quality by decoding only high-order bits depending on the transmission bandwidth. The SNR scalability techniques in MPEG-2 and the FGS techniques in MPEG-4 are described, for example, in "Overview of Fine Granularity Scalability in MPEG-4 Video Standard", IEEE TRANSACTIONS ON CIRCUITS AND SYSTEMS FOR VIDEO TECHNOLOGY, VOL. 11, NO. 3, MARCH 2001.

SUMMARY OF THE INVENTION

According to the techniques described above, a base layer is generated on the basis of SNR. However, in generating the base layer, human vision characteristics are not sufficiently considered, so that the quality of picture display is visually degraded when only the base layer is decoded.

There is a need for an image processing apparatus, an image processing method, and a computer program that allow alleviating degradation in picture quality in slow playback mode or degradation in picture quality at boundaries of objects by receiving and decoding enhancement layers while minimizing degradation in visual picture quality in a base layer.

According to an embodiment of the present invention, there is provided an image processing apparatus that compresses moving-picture data. The image processing apparatus includes an image converter configured to decimate pixels in individual blocks that are defined by dividing frames of moving-picture data, the image converter being configured to generate a plurality of layer signals using different sampled pixels corresponding to representative pixels in pixel decimation; and an encoder configured to receive input of the plurality of layer signals generated by the image converter and to generate encoded data based on the layer signals.

In the image processing apparatus, the image converter may include a block generator configured to divide individual frames of moving-picture data into blocks; an amount-of-movement detector configured to detect amounts of movement of an object in the individual blocks generated by the block generator; and a block processor configured to execute spatial decimation, temporal decimation, or spatial and temporal decimation of a plurality of blocks in a plurality of successive frames forming a unit of decimation, on the basis of the amounts of movement detected by the amount-of-movement detector, the plurality of blocks being decimated spatially, temporally, or spatially and temporally so that a plurality of pieces of decimated data corresponding to a plurality of layer signals is generated using different sampled pixels.

In the image processing apparatus, the image converter may include a packing processor configured to generate a packed block in which sampled pixels included in data output from the block processor are packed, and the packing processor may be configured to generate a plurality of packed blocks corresponding to a plurality of layer signals using different sampled pixels.

In the image processing apparatus, the encoder may be configured to encode the plurality of layer signals as the packed blocks generated by the packing processor, thereby generating streaming signals corresponding to the individual layer signals.

In the image processing apparatus, the encoder may be configured to calculate a difference of the layer signals and to generate encoded data on the basis of the difference calculated.

In the image processing apparatus, the block processor may be configured to generate a plurality of layer signals using different sampled pixels so that the plurality of layer signals have equivalent amounts of information.

According to another embodiment of the present invention, there is provided a moving-picture conversion apparatus that converts moving-picture data. The moving-picture conversion apparatus includes a block generator configured to divide individual frames of moving-picture data into blocks; an amount-of-movement detector configured to detect amounts of movement of an object in the individual blocks generated by the block generator; and a block processor configured to execute spatial decimation, temporal decimation, or spatial and temporal decimation on a plurality of blocks in a plurality of successive frames forming a unit of decimation, on the basis of the amounts of movement detected by the amount-of-movement detector, the plurality of blocks being decimated spatially, temporally, or spatially and temporally so that a plurality of pieces of decimated data corresponding to a plurality of layer signals is generated using different sampled pixels.

According to another embodiment of the present invention, there is provided an image processing apparatus that receives input of encoded moving-picture data and that reconstructs a picture. The image processing apparatus includes a decoder configured to receive input of encoded moving-picture data and to decode the encoded moving-picture data to generate a plurality of layer signals used for reconstructing moving-picture data; and an image converter configured to receive input of the layer signals generated by the decoder and to reconstruct the moving-picture data through data expansion based on pixel data included in the layer signals. The plurality of layer signals is generated on the basis of a plurality of pieces of decimated data using different sampled pixels corresponding to representative pixels in pixel decimation. The image converter is configured to reconstruct moving-picture data on the basis of layer signals of one or more layers that are to be processed, the layer signals being selected from the plurality of layer signals generated by the decoder, and to expand data in different manners in accordance with the number of layers selected for processing.

In the image processing apparatus, the image converter may be configured to reconstruct individual blocks defined by dividing frames of moving-picture data, and the image converter may be configured to reconstruct the blocks by copying the sampled pixels in different manners in accordance with the number of layers selected for processing.

In the image processing apparatus, the image converter may be configured to execute copying of the sampled pixels so that the number of pixels in a block after copying is n/Lm times as large as the number of pixels before copying, where Lm denotes the number of layers selected for processing, and n denotes the total number of the plurality of layer signals generated on the basis of the plurality of pieces of decimated data using different sampled pixels.

In the image processing apparatus, the image converter may be configured to reconstruct the individual blocks, defined by dividing frames of moving-picture data, by executing at least one of block expansion corresponding to spatial decimation, temporal decimation, and spatial and temporal decimation.

In the image processing apparatus, the image converter may include an unpacking processor configured to unpack a packed block in which sampled pixels corresponding to layer signals generated by the decoder are packed, and the unpacking processor may be configured to unpack a plurality of packed blocks corresponding to a plurality of layer signals that are generated using different sampled pixels.

In the image processing apparatus, the decoder may be configured to receive a streaming signal generated on the basis of a difference of a plurality of layer signals as encoded moving-picture data, and to generate a plurality of layer signals used for reconstructing the moving-picture data by adding decoded data to decoded data generated by decoding the streaming signal.

The image processing apparatus may further include a controller configured to determine the number of layer signals that are to be processed in the image converter in accordance with at least one of a processing ability and a data communication status of the image processing apparatus, and the image converter may be configured to process layer signals corresponding to the number determined by the controller.

According to another embodiment of the present invention, there is provided a moving-picture conversion apparatus that reconstructs a picture on the basis of decimated moving-picture data. The moving-picture conversion apparatus includes a block distributor configured to determine manners of processing of blocks to be processed according to amounts of movement in the blocks, the blocks being defined by dividing frames of moving-picture data; and a block processor configured to reconstruct the individual blocks by executing block expansion corresponding to at least one of spatial decimation, temporal decimation, and spatial and temporal decimation, the blocks being defined by dividing frames of moving-picture data. The block processor is configured to reconstruct the blocks on the basis of a plurality of layer signals generated on the basis of a plurality of pieces of decimated data, the plurality of pieces of decimated data being generated using different sampled pixels corresponding to representative pixels in pixel decimation, and to reconstruct the blocks by executing data expansion in different manners in accordance with the number of layers selected for processing.

According to another embodiment of the present invention, there is provided an image processing method for compressing moving-picture data. The image processing method includes the steps of executing image conversion by decimating pixels in individual blocks that are defined by dividing frames of moving-picture data, the image conversion generating a plurality of layer signals using different sampled pixels corresponding to representative pixels in pixel decimation; and executing encoding by receiving input of the plurality of layer signals generated by the image conversion and generating encoded data based on the layer signals.

In the image processing method, the image conversion step may include the steps of generating blocks by dividing individual frames of moving-picture data into blocks; detecting amounts of movement of an object in the individual blocks generated in the block generating step; and executing block processing by executing spatial decimation, temporal decimation, or spatial and temporal decimation of a plurality of blocks in a plurality of successive frames forming a unit of decimation, on the basis of the amounts of movement detected in the amount-of-movement detecting step, the plurality of blocks being decimated spatially, temporally, or spatially and temporally so that a plurality of pieces of decimated data corresponding to a plurality of layer signals is generated using different sampled pixels.

In the image processing method, the image conversion step may include the step of executing packing by generating a packed block in which sampled pixels included in data generated in the block processing step are packed, and the packing step may generate a plurality of packed blocks corresponding to a plurality of layer signals using different sampled pixels.

In the image processing method, the encoding step may be a step of encoding the plurality of layer signals as the packed blocks generated in the packing step, thereby generating streaming signals corresponding to the individual layer signals.

In the image processing method, the encoding step may include the step of calculating a difference of the layer signals and generating encoded data on the basis of the difference calculated.

In the image processing method, the block processing step may be a step of generating a plurality of layer signals using different sampled pixels so that the plurality of layer signals have equivalent amounts of information.

According to another embodiment of the present invention, there is provided a moving-picture conversion method for converting moving-picture data. The moving-picture conversion method includes the steps of generating blocks by dividing individual frames of moving-picture data into blocks; detecting amounts of movement of an object in the individual blocks generated in the block generating step; and executing block processing by executing spatial decimation, temporal decimation, or spatial and temporal decimation on a plurality of blocks in a plurality of successive frames forming a unit of decimation, on the basis of the amounts of movement detected in the amount-of-movement detecting step, the plurality of blocks being decimated spatially, temporally, or spatially and temporally so that a plurality of pieces of decimated data corresponding to a plurality of layer signals is generated using different sampled pixels.

According to another embodiment of the present invention, there is provided an image processing method for receiving input of encoded moving-picture data reconstructing a picture. The image processing method includes the steps of executing decoding by receiving input of encoded moving-picture data and decoding the encoded moving-picture data to generate a plurality of layer signals used for reconstructing moving-picture data; and executing image conversion by receiving input of the layer signals generated in the decoding step and reconstructing the moving-picture data through data expansion based on pixel data included in the layer signals. The plurality of layer signals is generated on the basis of a plurality of pieces of decimated data using different sampled pixels corresponding to representative pixels in pixel decimation. The image converting step is a step of reconstructing moving-picture data on the basis of layer signals of one or more layers that are to be processed, the layer signals being selected from the plurality of layer signals generated in the decoding step, and expanding data in different manners in accordance with the number of layers selected for processing.

In the image processing method, the image conversion step may be a step of reconstructing individual blocks defined by dividing frames of moving-picture data, and the image conversion step may reconstruct the blocks by copying the sampled pixels in different manners in accordance with the number of layers selected for processing.

In the image processing method, the image conversion step may execute copying of the sampled pixels so that the number of pixels in a block after copying is n/Lm times as large as the number of pixels before copying, where Lm denotes the number of layers selected for processing, and n denotes the total number of the plurality of layer signals generated on the basis of the plurality of pieces of decimated data using different sampled pixels.

In the image processing method, the image conversion step may reconstruct the individual blocks, defined by dividing frames of moving-picture data, by executing at least one of block expansion corresponding to spatial decimation, temporal decimation, and spatial and temporal decimation.

In the image processing method, the image conversion step may include the step of executing unpacking by unpacking a packed block in which sampled pixels corresponding to layer signals generated in the decoding step are packed, and the unpacking step may be a step of unpacking a plurality of packed blocks corresponding to a plurality of layer signals that are generated using different sampled pixels.

In the image processing method, the decoding step may receive a streaming signal generated on the basis of a difference of a plurality of layer signals as encoded moving-picture data, and generate a plurality of layer signals used for reconstructing the moving-picture data by adding decoded data to decoded data generated by decoding the streaming signal.

The image processing method may further include the step of exercising control by determining the number of layer signals that are to be processed in the image converter in accordance with at least one of a processing ability and a data communication status of the image processing apparatus, and the image conversion step may process layer signals corresponding to the number determined in the controlling step.

According to another embodiment of the present invention, there is provided a moving-picture conversion method for reconstructing a picture on the basis of decimated moving-picture data. The moving-picture conversion method includes the steps of executing block distribution by determining manners of processing of blocks to be processed according to amounts of movement in the blocks, the blocks being defined by dividing frames of moving-picture data; and executing block processing by reconstructing the individual blocks by executing block expansion corresponding to at least one of spatial decimation, temporal decimation, and spatial and temporal decimation, the blocks being defined by dividing frames of moving-picture data. The block processing step reconstructs the blocks on the basis of a plurality of layer signals generated on the basis of a plurality of pieces of decimated data, the plurality of pieces of decimated data being generated using different sampled pixels corresponding to representative pixels in pixel decimation, and reconstructs the blocks by executing data expansion in different manners in accordance with the number of layers selected for processing.

According to another embodiment of the present invention, there is provided a computer program for allowing a computer to execute processing for compressing moving-picture data. The computer program includes the steps of executing image conversion by decimating pixels in individual blocks that are defined by dividing frames of moving-picture data, the image conversion generating a plurality of layer signals using different sampled pixels corresponding to representative pixels in pixel decimation; and executing encoding by receiving input of the plurality of layer signals generated by the image conversion and generating encoded data based on the layer signals.

According to another embodiment of the present invention, there is provided a computer program for allowing a computer to execute processing for restoring a picture. The computer program includes the steps of executing decoding by receiving input of encoded moving-picture data and decoding the encoded moving-picture data to generate a plurality of layer signals used for reconstructing moving-picture data; and executing image conversion by receiving input of the layer signals generated in the decoding step and reconstructing the moving-picture data through data expansion based on pixel data included in the layer signals. The plurality of layer signals is generated on the basis of a plurality of pieces of decimated data using different sampled pixels corresponding to representative pixels in pixel decimation, and the image converting step is a step of reconstructing moving-picture data on the basis of layer signals of one or more layers that are to be processed, the layer signals being selected from the plurality of layer signals generated in the decoding step, and expanding data in different manners in accordance with the number of layers selected for processing.

These computer programs according to embodiments of the present invention can be provided, for example, using storage media that allow providing the computer programs in computer-readable forms to computer systems capable of executing various program codes, for example, recording media such as a CD, an FD, or an MO, or via communication media such as a network. By providing the programs in computer-readable forms, processing according to the programs is executed on the computer systems.

Other objects, features, and advantages of the present invention will become apparent from the following detailed description of embodiments of the present invention with reference to the accompanying drawings. In this specification, a system refers to a logical combination of a plurality of apparatuses, and is not limited to one in which constituent apparatuses exist within the same case.

According to the embodiments of the present invention, at an image compressor, a plurality of layer signals is generated using different sampled pixels corresponding to representative pixels, on a basis of individual blocks defined by dividing frames of moving-picture data, and encoded data based on the layer signals is output. At an image expander, data expansion is executed in different manners in accordance with the number of layers selected for processing, and moving-picture data is reconstructed by executing data expansion based on pixel data included in the layer signals. At the image expander, it is possible to process the layer signals selectively in accordance with the bandwidth of a transmission path, a processing ability of an apparatus, and so forth. This allows controlling the quality of picture display, so that scalable processing is allowed.

Furthermore, according to the embodiments of the present invention, compression is executed using human vision characteristics, so that high-quality display is possible even when only a base layer is decoded. Furthermore, it is possible, for example, to improve picture quality in slow playback mode or picture quality at the boundaries of moving objects by selectively receiving and decoding enhancement layers. The individual layers have equivalent amounts of information, so that it is possible to choose an arbitrary layer as a base layer.

BRIEF DESCRIPTION OF THE DRAWINGS

FIG. 3 is a diagram for explaining an example of processing executed by a block processor in the image converter;

FIG. 5 is a diagram for explaining an example of processing executed by a block processor in the image converter;

DESCRIPTION OF THE PREFERRED EMBODIMENTS

Now, image processing apparatuses, image processing methods, and computer programs according to embodiments of the present invention will be described with reference to the drawings.

Figure 1:
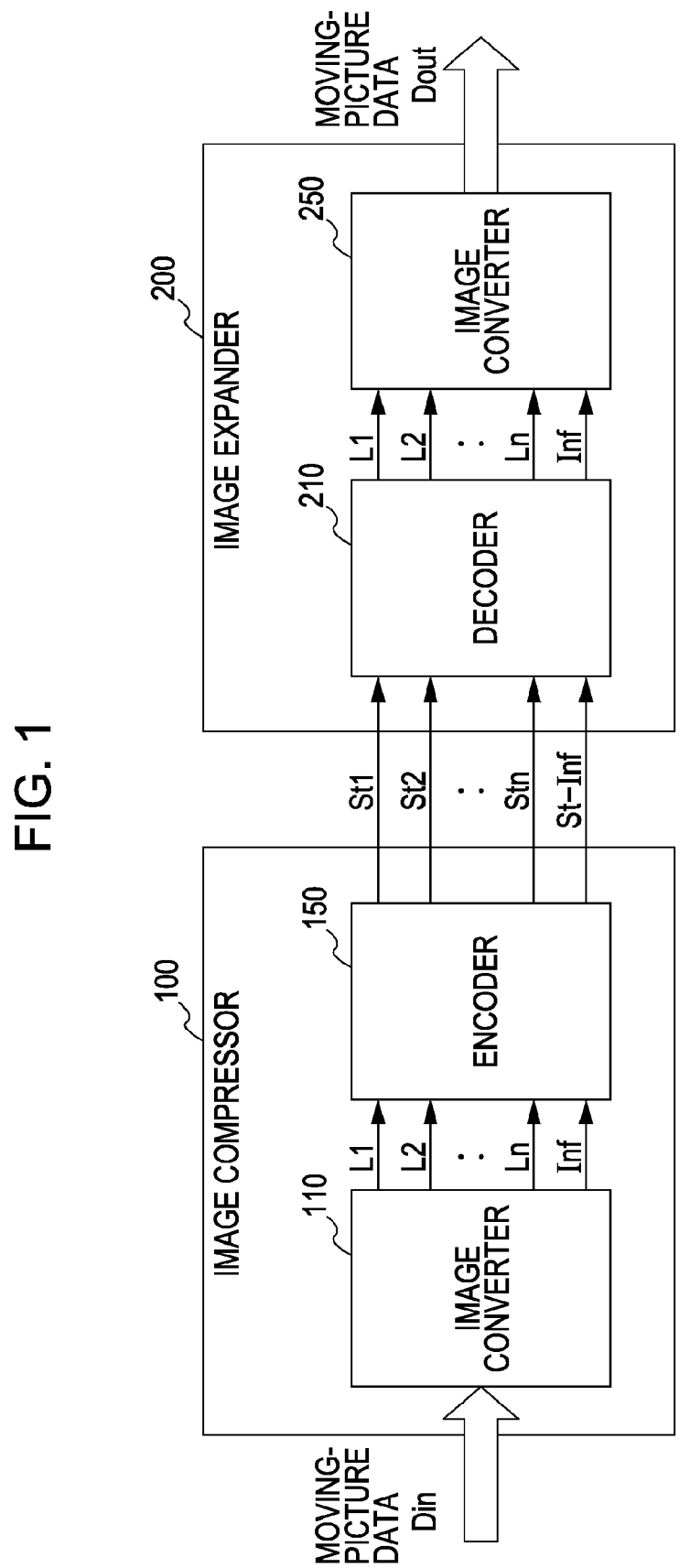
FIG. 1 is a diagram showing basic constructions of an image compressor and an image expander.

The construction of an image processing apparatus according to an embodiment of the present invention will be described with reference to FIG. 1 and subsequent figures. FIG. 1 shows an image compressor 100 that receives input of moving-picture data and compresses the input moving-picture data, and an image expander 200 that receives input of compressed picture data and expands the compressed picture data.

Signals generated by the image compressor 100 are transmitted to the image expander 200, for example, via a network. It is possible to implement an image processing apparatus having the function of either one of the image compressor 100 and the image expander 200, and it is also possible to implement an image processing apparatus having the functions of both the image compressor 100 and the image expander 200.

The image compressor 100 includes an image converter 110 and an encoder 150. The image expander 200 includes a decoder 210 and an image converter 250. Input/output and transmission/reception of data are executed via an input/output unit and a communication unit (not shown).

In the image compressor 100, the image converter 110 receives input of moving-picture signals Din that are to be compressed. The image converter 110 then converts the moving-picture signals Din into layered moving-picture signals L1 to Ln using different spatial and temporal sampling patterns for individual image blocks in accordance with movement of an object, the image blocks being defined by dividing moving-picture frames into units of a predetermined pixel area. The generation of the layered moving-picture signals L1 to Ln will be described later in detail. The image converter 110 also generates block processing information Inf including information representing manners of generation of the layered moving-picture signals L1 to Ln, and inputs the block processing information Inf to the encoder 150 together with the layered moving-picture signals L1 to Ln.

The encoder 150 encodes the layered moving-picture signals L1 to Ln and the block processing information Inf input from the image converter 110 in accordance with a predetermined bitrate, thereby generating layered streams St1 to Stn and a block-processing-information stream St-Inf as signals to be transmitted to the image expander 200. The encoder 150 then outputs the layered streams St1 to Stn and the block-processing-information stream St-Inf to the image expander 200 via a data output unit or a data transmitter (not shown).

In the image expander 200, the decoder 210 receives input of the layered streams St1 to Stn and the block-processing-information stream St-Inf via a data input unit or a data receiver (not shown). Then, the decoder 210 adaptively decodes the layered streams St1 to Stn in accordance with the status of data reception and the data processing ability of the image expander 200 to generate the layered moving-picture signals L1 to Ln, and decodes the block-processing-information stream St-Inf to generate the block processing information Inf. Then, the decoder 210 inputs the layered moving-picture signals L1 to Ln and the block processing information Inf to the image converter 250.

The decoder 210 does not necessarily decode all the received layered streams St1 to Stn, and the decoder 210 only decodes streams selected in accordance with the status of data reception and the data processing ability of the image expander 200. Thus, when the n layers of input streams St1 to Stn are received, the layered moving-picture signals generated by the decoder 210 of the image expander 200 are only signals selected from the n layers of moving-picture signals L1 to Ln.

The image converter 250 receives input of the layered moving-picture signals L1 to Ln and the block processing information Inf generated by the decoder 210. Then, the image converter 250 inversely converts the layered moving-picture signals L1 to Ln in accordance with the sampling patterns of the individual image blocks, and outputs reconstructed moving-picture data Dout.

Construction and Operation of Image Compressor

Next, the construction and operation of the image compressor 100 will be described in detail. First, the construction and operation of the image converter 110 of the image compressor 100 will be described in detail with reference to FIG. 2.

Figure 2:
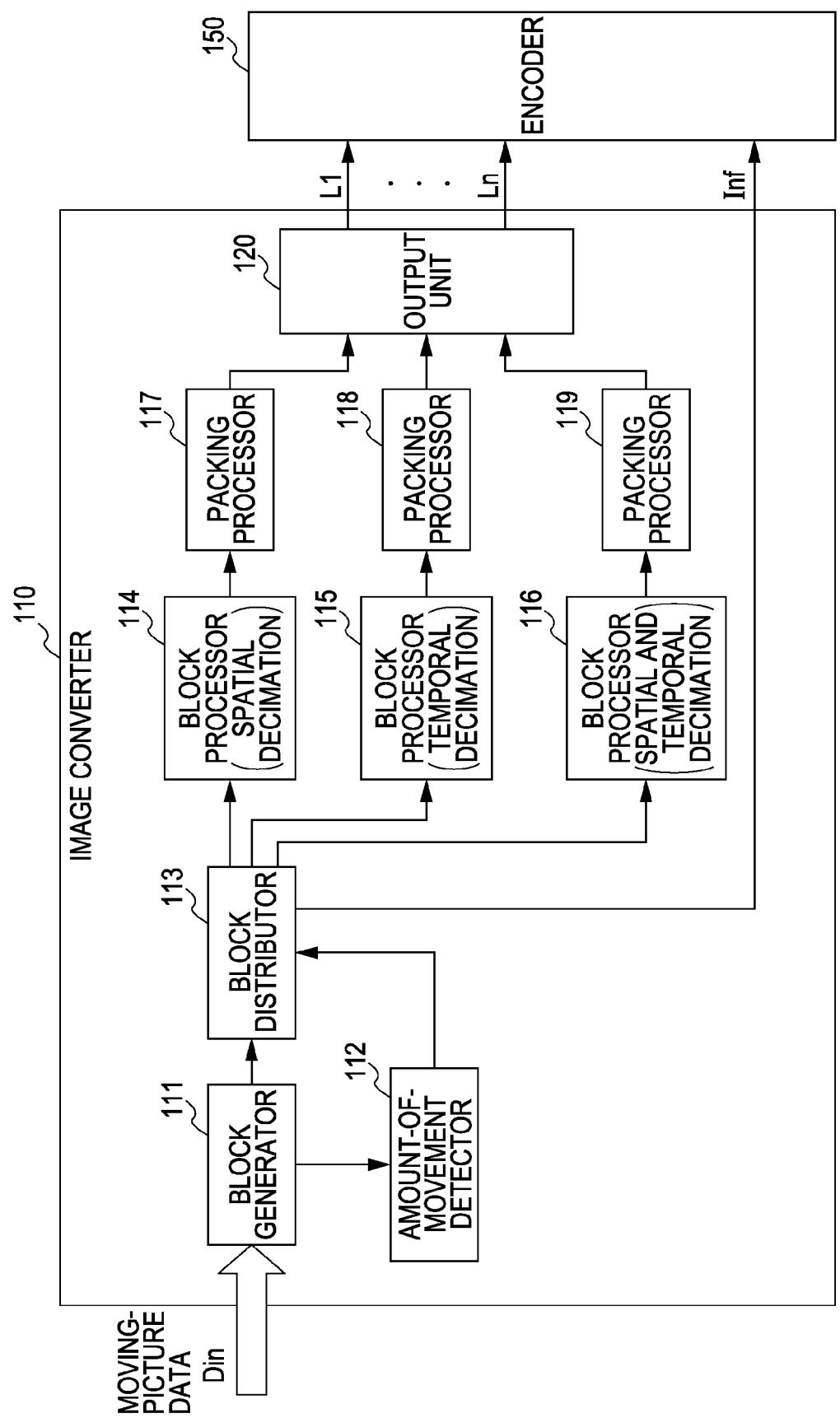
FIG. 2 is a diagram showing the construction of an image converter in the image compressor.

FIG. 2 is a block diagram of the image converter 110 of the image compressor 100. As described earlier, the image converter 110 receives input of moving-picture signals Din that are to be compressed, and converts the moving-picture signals Din into n layers of moving-picture signals L1 to Ln (where $n \geqq 2$) using different spatial and temporal sampling patterns for individual image blocks in accordance with movement of an object, the image blocks being defined by dividing moving-picture frames into units of a predetermined pixel area. The n layers of moving-picture signals L1 to Ln correspond to signals generated by a moving-picture conversion apparatus proposed in Japanese Patent Application No. 2003-412501, filed previously by the assignee of this application. By converting a moving-picture using a super-resolution effect based on human vision characteristics, the signals can be compressed in such a manner that an observer of a displayed image negligibly perceives degradation in picture quality.

The super-resolution effect is a visual effect that is achieved by such vision characteristics that an observer perceives a sum of a plurality of pictures presented within a certain period. Human vision has a function of perceiving light when the sum of optical stimulation received has reached a certain threshold (hereinafter referred to as a temporal integration function). This is known as "Bloch's law", which states that the brightness of light perceived by a human being is dependent on a sum of light received during a certain period. The period of summation by the temporal integration function varies depending on the visual environment, etc., but it is reported to be on the order of 25 to 100 ms. Bloch's law is described in detail, for example, in "Shikaku jouhou handobukku, the Vision Society of Japan, pp. 219-220".

The image converter 110 shown in FIG. 2 is configured to compress data in such a manner that an observer will not perceive degradation in picture quality, through moving-picture conversion based on the super-resolution effect caused by the temporal integration function. The construction of the image converter 110 shown in FIG. 2 is described below.

A block generator 111 accumulates frames of moving-picture data Din input to the image converter 110 in units of a predetermined number of frames n, divides frame images of the n frames into blocks of a block size corresponding to a predetermined number of pixels (4×4 pixels in this embodiment), and supplies the blocks to an amount-of-movement detector 112 and a block distributor 113 on a block-by-block basis.

The amount-of-movement detector 112 detects amounts of temporal movement in the individual blocks supplied from the block generator 111, and sends the amounts of movement detected to the block distributor 113. Furthermore, the block generator 111 detects motion vectors in individual blocks of a frame, supplied from the block generator 111, by executing block matching with blocks at corresponding pixel locations in another frame, and supplies the motion vectors detected to the block distributor 113. The motion vectors represent amounts of movement between frames with respect to a horizontal direction (X-axis direction) and with respect to a vertical direction (Y-axis direction).

The amount-of-movement detector 112 detects amounts of temporal movement (e.g., x pixels/frame) in the individual blocks by detecting motion vectors as described above, and sends the amounts of movement detected to the block distributor 113. The block distributor 113 determines manners of block processing (decimation) that are to be applied to the individual blocks according to the amounts of movement supplied from the amount-of-movement detector 112, and supplies each of the blocks supplied from the block generator 111 selectively to one of block processors 114 to 116. The scheme of distribution of blocks by the block distributor 113 is based on the principles of the super-resolution effect, as described in detail in Japanese Patent Application No. 2003-412501.

The scheme of block distribution by the block distributor 113, described in Japanese Patent Application No. 2003-412501, is described below. For example, when the amount of movement in a block per one frame interval with respect to the horizontal direction (X-axis direction) or the vertical direction (Y-axis direction), supplied from the amount-of-movement detector 112, is greater than or equal to two pixels, n blocks in the n frames, supplied from the block generator 111, and the amounts of movement supplied from the amount-of-movement detector 112 are output to the block processor 114, where spatial decimation is executed as block processing.

When the amounts of movement in the block per one frame interval with respect to the horizontal direction and with respect to the vertical direction are both less than two pixels and greater than or equal to one pixel, the block distributor 113 outputs the n blocks in the n frames, supplied from the block generator 111, and the amounts of movement supplied from the amount-of-movement detector 112 to the block processor 116, where spatial decimation and temporal decimation are executed as block processing.

When the amounts of movement in a block per one frame interval with respect to the horizontal direction and the vertical direction are both less than one pixel, the block distributor 113 supplies the n blocks in the n frames, supplied from the block generator 111, and the amounts of movement supplied from the amount-of-movement detector 112 to the block processor 115, where temporal decimation is executed as block processing.

The values of the amounts of movement per one frame interval with respect to the horizontal direction and the vertical direction, defining conditions of block distribution in the example of processing described above, are only an example of conditions for determining destinations of distribution, and destinations of distribution may be determined on the basis of other conditions.

When the amount of movement in a block is large so that the super-resolution effect will be achieved, the block processor 114 transforms the block into layers by spatial decimation with respect to the direction of movement. More specifically, the block processor 114 forms the individual layers by sampling pixels at different pixel positions from each frame image, so that each layer has a number of pixels decimated to 1/n with respect to the direction of movement and an amount of data compressed to 1/n. This operation will be described later in more detail.

When the amount of movement in a block is small so that the super-resolution effect will not be achieved, the block processor 115 transforms the block into layers by temporal decimation. More specifically, the block processor 115 forms the individual layers by sampling frames at different frame positions from each set of n frames as a unit of processing, so that each layer has a number of frames decimated to 1/n and an amount of data compressed to 1/n. This operation will be described later in more detail.

When a block has an intermediate amount of movement that is between those of the cases described above, the block processor 116 transforms the block into layers by spatial decimation and temporal decimation. More specifically, the block processor 116 forms the individual layers by sampling two frames at different frame positions from each set of n frames as a unit of processing, and then decimating the number of pixels to ½ by sampling pixels at different pixel positions from each of the sampled frames, so that each layer has an amount of data compressed to 1/n. This operation will be described later in more detail.

The packing processor 117 receives input of layer signals generated through spatial decimation by the block processor 114, and generates a packed block based on the input signals. That is, the packing processor 117 generates a packed block including decimated pixel data signals of the blocks associated with the individual frames. In the packed block, the decimated pixel data signals of the blocks associated with the individual frames are located at pixel positions different from the original pixel positions. The packing processor 117 then converts the packed block into image signals of one frame and outputs the image signals. This operation will be described later in more detail.

The packing processor 118 receives input of layer signals generated through temporal decimation by the block processor 115, and outputs the input signals without processing the input signals. The temporal decimation is a process of outputting pixel data of one block of one frame selected from n blocks at the same pixel position in n frames as a unit of decimation. The packing processor 118 outputs a block of a decimated frame without processing the block. This operation will be described later in more detail.

The packing processor 119 receives input of layer signals generated through spatial decimation and temporal decimation by the block processor 116, and generates a packed block based on the input signals. That is, the packing processor 119 generates a packed block including decimated pixel data signals of the blocks associated with the individual frames. In the packed block, the decimated pixel data signals of the blocks associated with the individual frames are located at pixel positions different from the original pixel positions. The packing processor 119 then converts the packed block into image signals of one frame and outputs the image signals. This operation will be described later in detail.

The output unit 120 selects, on a block-by-block basis, image signals supplied from a selected packing processor from packed image signals supplied from the packing processors 117 to 119, according to block processing information Inf supplied from a controller (not shown). The output unit 120 then outputs the selected image signals as a first-layer signal L1 to an n-th-layer signal Ln.

The block processing information Inf includes information representing a manner of block processing determined by the block distributor 113, i.e., information representing whether a block is processed by a block processor that executes spatial decimation, a block processor that executes temporal decimation, or a block processor that executes spatial decimation and temporal decimation, and also includes information representing a frame associated with each processed block. The block processing information Inf is output from the block distributor 113. The block processing information Inf is output on a block-by-block basis (each block is composed of 4×4 pixels in this embodiment), at an interval of n frames as a unit of decimation and packing. The block processing information Inf includes a number of bits of data representing a manner of processing of each block.

Next, basic manners of decimation by the block processors 114 to 116, also described in Japanese Patent Application No. 2003-412501, will be described with reference to FIG. 3 and subsequent figures.

The block processor 114 decimates the number of pixels (executes spatial decimation) in n (e.g., n=4) blocks at the same position in successive n frames (e.g., n blocks with an amount of movement greater than or equal to two pixels with respect to the horizontal direction or the vertical direction), supplied from the block distributor 113, in accordance with the amounts of movement also supplied from the block distributor 113.

More specifically, when the amount of movement per one frame interval with respect to the horizontal direction is greater than or equal to two pixels, assuming that a block to be processed is composed of 4×4 pixels as shown in part (a) of FIG. 3, the block processor 114 selects only one pixel among four pixels along the horizontal direction as a representative value. In the example shown in part (b) of FIG. 3, the block processor 114 uses only the pixel value of a pixel $P_{10}$ as a representative value (sampling point) among four pixels $P_{00}$ to $P_{30}$ while disregarding other pixel values. Similarly, the block processor 114 uses the pixel value of a pixel $P_{11}$ as a representative value (sampling point) among four pixels $P_{01}$ to $P_{31}$, the pixel value of a pixel $P_{12}$ as a representative value (sampling point) among four pixels $P_{02}$ to $P_{32}$, and the pixel value of a pixel $P_{13}$ as a representative value (sampling point) among four pixels $P_{03}$ to $P_{33}$.

When the amount of movement per one frame interval with respect to the vertical direction is greater than or equal to two pixels, assuming that a block is composed of 4×4 pixels as shown in part (a) of FIG. 3, the block processor 114 selects one pixel as a sampling point among four pixels along the vertical direction. In the example shown in part (c) of FIG. 3, the block processor 114 uses only the pixel value of a pixel $P_{01}$ as a sampling point among four pixels $P_{00}$ to $P_{03}$ while disregarding other pixel values. Similarly, the block processor 114 uses the pixel value of a pixel $P_{11}$ as a sampling point among four pixels $P_{10}$ to $P_{13}$, a pixel $P_{21}$ as a sampling point among four pixels $P_{20}$ to $P_{23}$, and a pixel $P_{31}$ as a sampling point among four pixels $P_{30}$ to $P_{33}$.

The block processor 114 executes spatial decimation on n (e.g., n=4) blocks at the same position in successive n frames, so that the amount of data of each block is reduced to ¼ and the amount of data of the four blocks as a whole is reduced to ¼. As will be described later, the block processor 114 in this embodiment executes spatial decimation in a plurality of manners using different sampling points to generate a plurality of layer signals. This operation will be described later in more detail.

Next, a basic example of processing executed by the block processor 115 shown in FIG. 2 will be described. The block processor 115 shown in FIG. 2 decimates the number of frames (executes temporal decimation) of n blocks (e.g., n blocks with amounts of movement less than one pixel with respect to both the horizontal direction and the vertical direction) at the same position in successive n frames, supplied from the block distributor 113.

Figure 4:
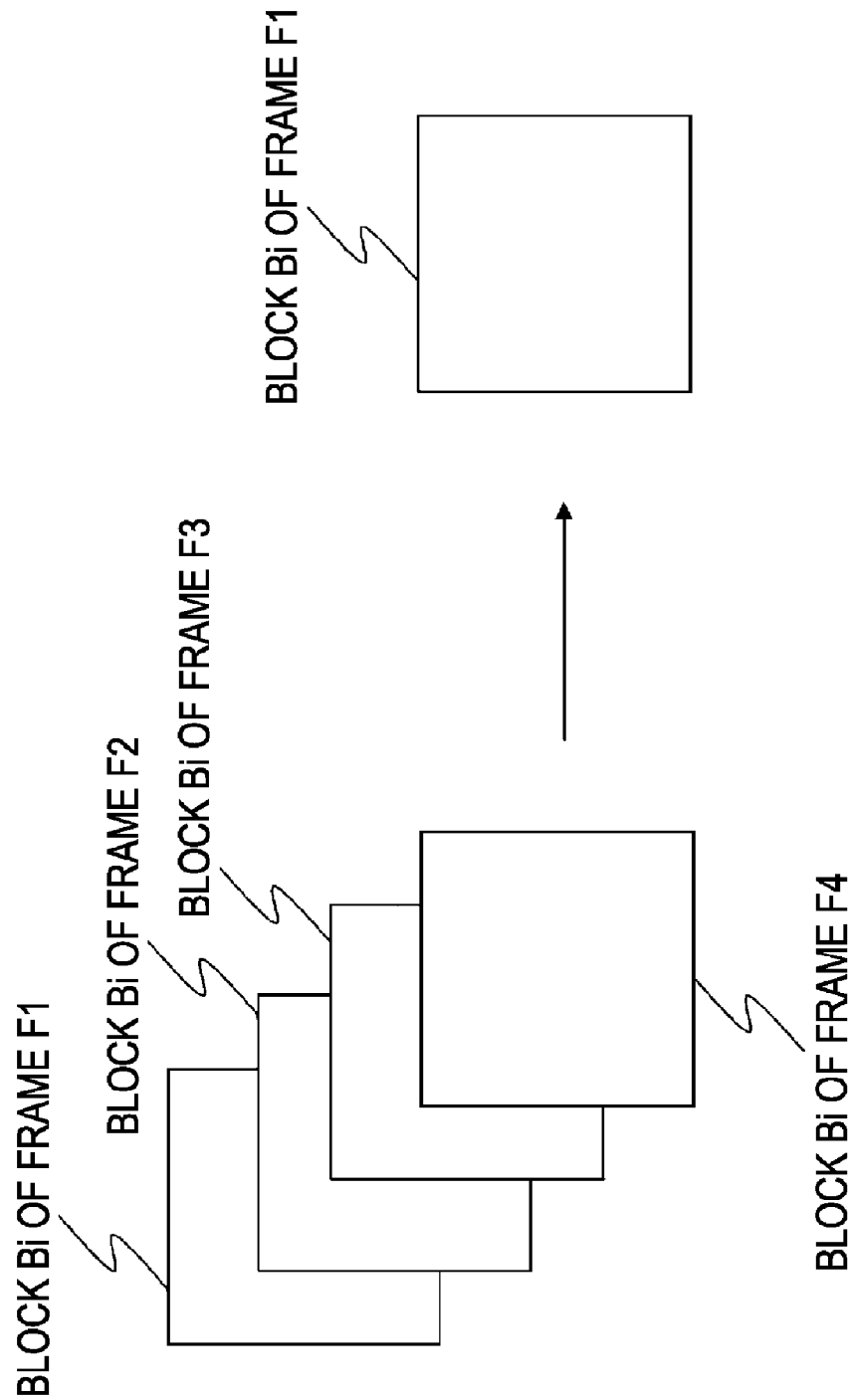
FIG. 4 is a diagram for explaining an example of processing executed by a block processor in the image converter.

More specifically, as shown in FIG. 4, the block processor 115 obtains one of four blocks Bi at the same position in successive four frames F1 to F4 (the block Bi of the frame F1 in the example shown in FIG. 4) as a sampling point while discarding blocks of the other frames, thereby decimating the number of frames in the four frame intervals. Through the temporal decimation described above, the block processor 115 generates data (one block) regarding four blocks with the amount of data reduced to ¼. As will be described later, the block processor 115 executes temporal decimation in a plurality of manners using different sampling points to generate a plurality of layer signals. This operation will be described later in detail.

The block processor 116 decimates the number of pixels (executes spatial decimation) and decimates the number of frames (executes temporal decimation) of n blocks (e.g., n blocks with amounts of movement greater than or equal to one pixel and less than two pixels with respect to both the horizontal direction and the vertical direction) at the same position in n successive frames, supplied from the block distributor 113.

When a block to be processed is composed of 4×4 pixels as shown in part (a) of FIG. 5, the block processor 116 selects only the pixel values of two pixels as representative values (sampling points) among four pixels along the horizontal direction. In the example shown in part (b) of FIG. 5, the block processor 116 selects only the pixel values of pixels $P_{00}$ and $P_{20}$ as representative values (sampling points) among four pixels $P_{00}$ to $P_{30}$ while disregarding other pixel values. Similarly, the block processor 116 selects only the pixel values of pixels $P_{01}$ and $P_{21}$ as representative values (sampling points) among four pixels $P_{01}$ to $P_{31}$, only the pixel values of pixels $P_{02}$ and $P_{22}$ as representative values (sampling points) among four pixels $P_{02}$ to $P_{32}$, and only the pixel values of pixels $P_{03}$ and $P_{23}$ as representative values (sampling points) among four pixels $P_{03}$ to $P_{33}$.

When the amount of movement per one frame interval with respect to the vertical direction is greater than or equal to one pixel and is less than two pixels, the block processor 116 selects only the pixel values of two pixels among four pixels along the vertical direction. For example, as shown in part (c) of FIG. 5, the block processor 116 uses only the pixel values of pixels $P_{00}$ and $P_{02}$ as representative values (sampling points) among four pixels $P_{00}$ to $P_{03}$ while disregarding other pixel values. Similarly, the block processor 116 uses only the pixel values of pixels $P_{10}$ and $P_{12}$ as representative values (sampling points) among four pixels $P_{10}$ to $P_{13}$, only the pixel values of pixels $P_{20}$ and $P_{22}$ as representative values (sampling points) among four pixels $P_{20}$ to $P_{23}$, and only the pixel values of pixels $P_{30}$ and $P_{32}$ as representative values (sampling points) among four pixels $P_{30}$ to $P_{33}$.

Figure 6:
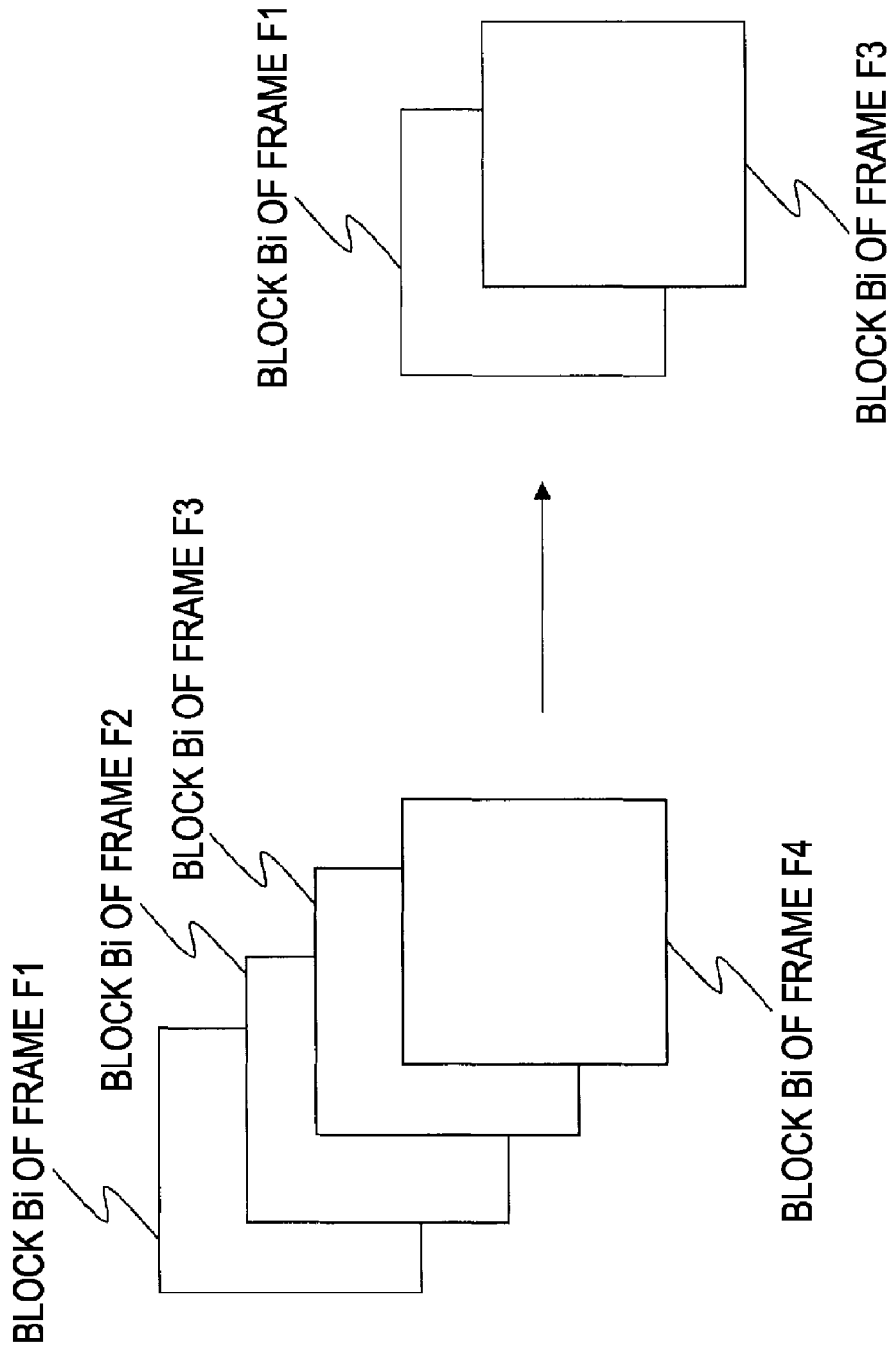
FIG. 6 is a diagram for explaining an example of processing executed by a block processor in the image converter.

Furthermore, the block processor 116 executes temporal decimation, i.e., decimates the number of frames. More specifically, the block processor 116 decimates the number of frames so that two blocks among four blocks at the same position in four successive frames F1 to F4 are selected. In the decimation of the number of frames, as shown in FIG. 6, the number of frames is decimated at intervals of two frames so that only two blocks (two blocks of frames F1 and F3 in the example shown in FIG. 6) are selected from the four blocks Bi at the same position in the four successive frames F1 to F4. The pixel data of the selected two blocks serves as sampling-point data of the four frames. In this case, eight sampling points have been selected for one block in the spatial decimation described with reference to FIG. 5, so that 16 sampling points are selected from two blocks, and pixel data at the sampling points are used as sampling-point data for the four frames.

Since the block processor 116 executes spatial decimation so that the amount of data is reduced to ½ as described with reference to FIG. 5, and executes temporal decimation so that the amount of data is reduced to ½ as described with reference to FIG. 6 on the four blocks supplied thereto, the amount of data of the four blocks is reduced to (½)×(½)=¼. As will be described later, the block processor 115 in this embodiment executes spatial decimation and temporal decimation in a plurality of manners using different sampling points to generate a plurality of layer signals. This operation will be described later in detail.

Figure 7:
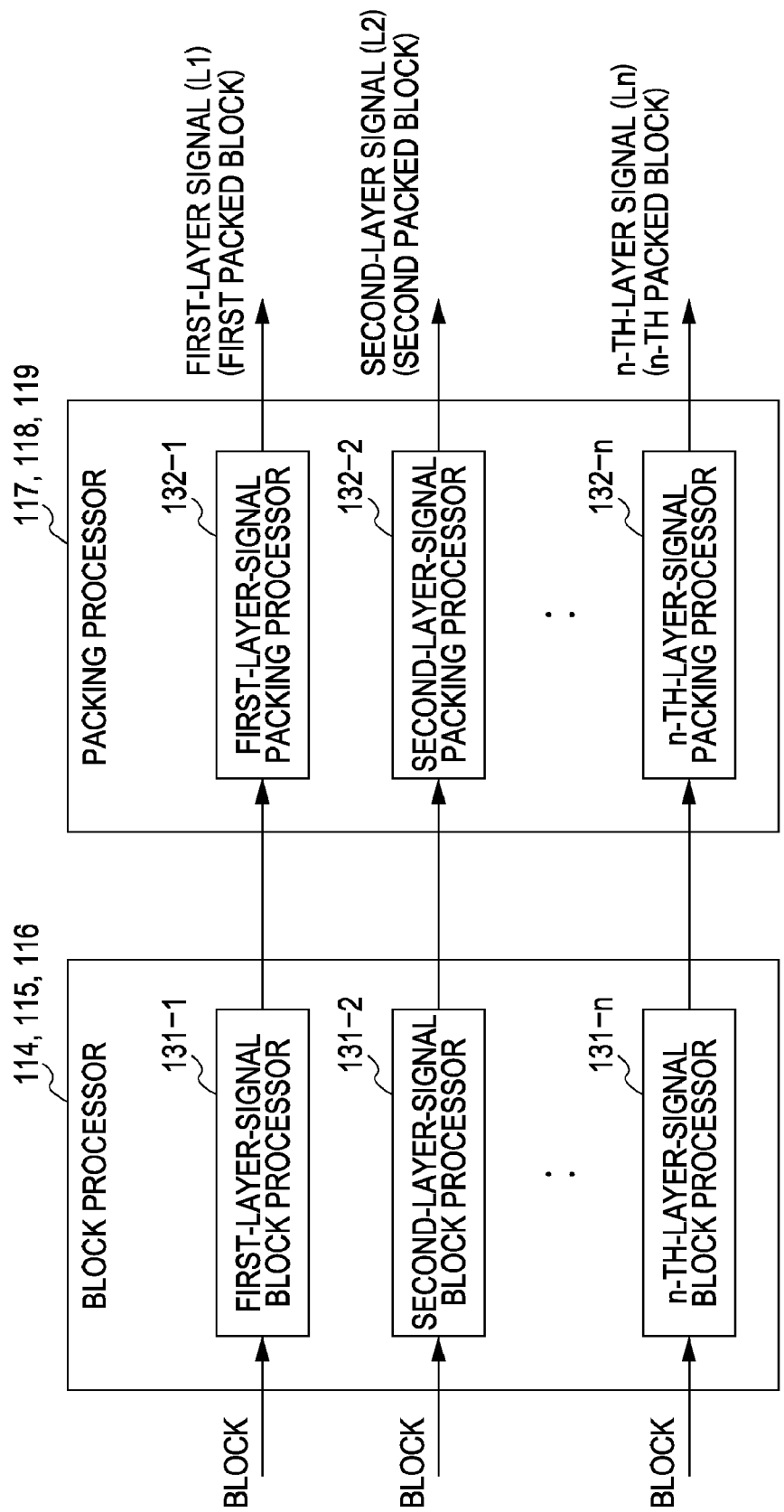
FIG. 7 is a diagram showing example constructions of block processors and packing processors in the image converter in the image compressor.

Next, the constructions and operations of the block processors 114 to 116 and the packing processors 117 to 119 in the image compressor 100 in this embodiment will be described with reference to FIG. 7 and subsequent figures. The block processors 114 to 116 are constructed substantially the same, and the packing processors 117 to 119 are constructed substantially the same, as shown in FIG. 7, and the block processors 114 to 116 and the packing processors 117 to 119 generate n layers of signals L1 to Ln. However, the individual block processors 114 to 116 execute different processes, and the packing processors 117 to 119 execute different processes.

In the block processor 114, configured to execute spatial decimation, first-layer-signal to n-th-layer-signal block processors 131-1 to 131-n execute spatial decimation in different manners to generate pieces of decimated data corresponding to a plurality of layer signals, and first-layer-signal to n-th-layer-signal packing processors 132-1 to 132-n individually pack the pieces of spatially decimated data corresponding to the plurality of layer signals to generate a plurality of packed blocks.

In the block processor 115, configured to execute temporal decimation, first-layer-signal to n-th-layer-signal block processors 131-1 to 131-n execute temporal decimation in a plurality of manners to generate pieces of decimated data corresponding to a plurality of layer signals, and first-layer-signal to n-th-layer-signal packing processors 132-1 to 132-n individually pack the pieces of temporally decimated data corresponding to the plurality of layer signals to generate a plurality of packed blocks.

In the block processor 116, configured to execute spatial and temporal decimation, first-layer-signal to n-th-layer-signal block processors 131-1 to 131-n execute spatial decimation and temporal decimation in different manners to generate pieces of decimated data corresponding to a plurality of layer signals, and first-layer-signal to n-th-layer-signal packing processors 132-1 to 132-n individually pack the pieces of spatially and temporally decimated data corresponding to the plurality of layer signals to generate a plurality of packed blocks.

The respective outputs of the first-layer-signal to n-th-layer-signal packing processors 132-1 to 132-n are input to the encoder 150 via the output unit 120 as first-layer to n-th-layer signals L1 to Ln, so that encoded stream signals St1 to Stn corresponding to the respective layer signals L1 to Ln are output.

Now, examples of processing executed by the block processors 114 to 116 and the packing processors 117 to 119 in a case where decimation and packing are executed in units of 4 frames so that first-layer to fourth-layer signals L1 to L4 are output will be described with reference to FIG. 8 and subsequent figures.

Spatial Decimation and Packing

First, processing executed by the block processor 114 configured to execute spatial decimation and processing executed by the packing processor 117 will be described with reference to FIGS. 8 to 11. In the block processor 114, the first-layer-signal to n-th-layer-signal block processors 131-1 to 131-n shown in FIG. 7 execute spatial decimation using different sampling points, and the first-layer-signal to n-th-layer-signal packing processors 132-1 to 132-n individually pack the plurality of pieces of spatially decimated data to generate layer signals L1 to Ln in the form of a plurality of packed blocks.

FIGS. 8 to 11 relate to an example of processing in which a block to be processed has a certain amount of movement with respect to the horizontal direction and in which ¼ decimation with respect to the horizontal direction is executed. When the block to be processed has a certain amount of movement with respect to the vertical direction, spatial decimation and packing are executed with respect to the vertical direction.

Figure 8:
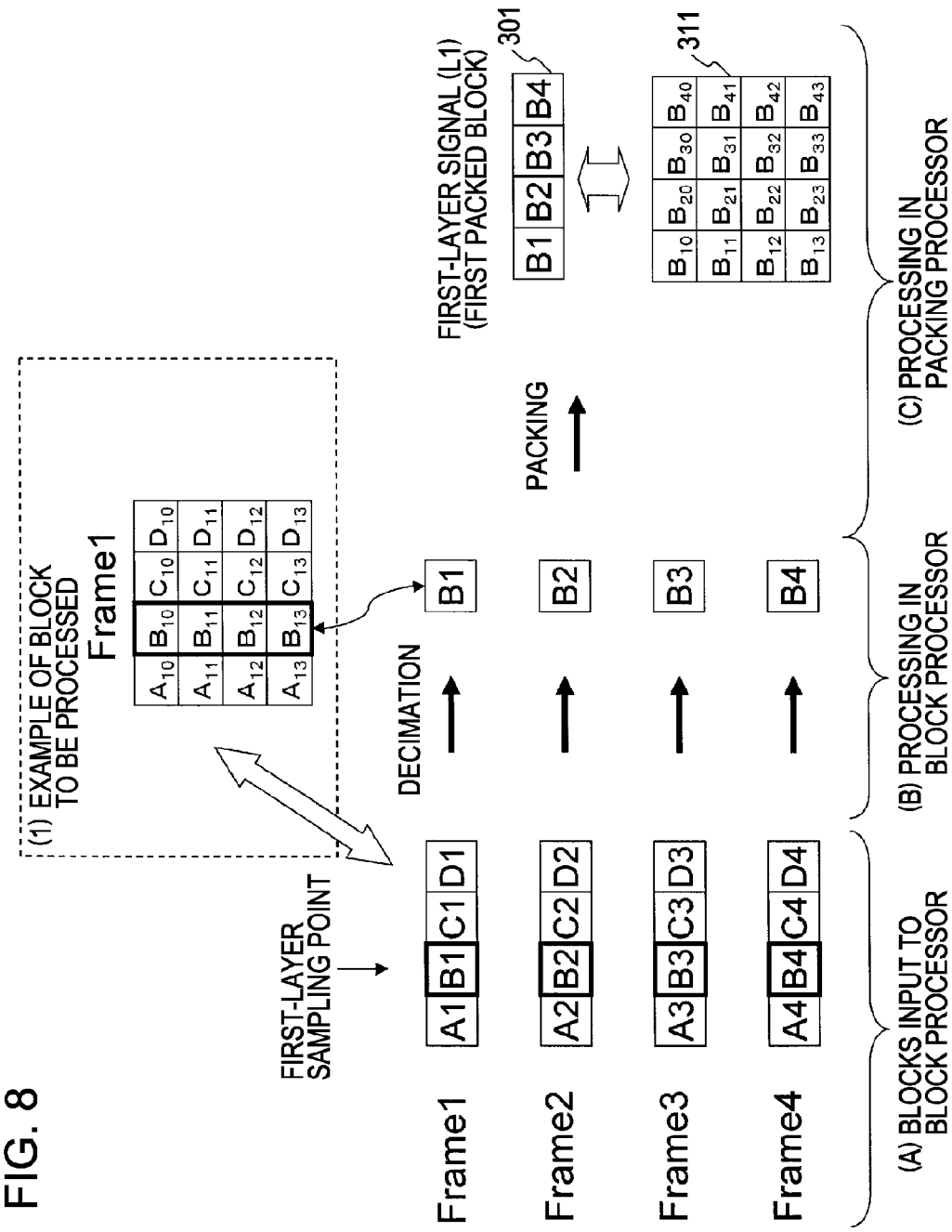
FIG. 8 is a diagram for explaining an example of processing executed by a block processor and a packing processor in the image converter in the image compressor.

FIG. 8 is a diagram for explaining spatial decimation executed by the first-layer-signal block processor 131-1 of the block processor 114 configured to execute spatial decimation, and packing executed by the first-layer-signal packing processor 132-1 of the packing processor 117. FIG. 8 shows (A) blocks input to block processor, (B) processing in block processor, and (C) processing in packing processor.

Referring to part (A), blocks input to the first-layer-signal block processor 131-1 include pixel data A1 to D1, A2 to D2, A3 to D3, and A4 to D4 of four blocks at the same position in four frames forming a unit of decimation and packing. The pixel data is shown in a simplified form. For example, when each block as a unit of processing is composed of 4×4 pixels, blocks having 4×4 pixels are set as blocks to be processed regarding frames 1 to 4, as in (1) example of block to be processed shown in FIG. 8. The same processing is executed on each horizontal line of the block, so that an example of processing of one line is shown as (A) to (C).

Referring to part (B), in the processing executed by the first-layer-signal block processor 131-1, spatial decimation is executed by sampling a pixel value at the second pixel position B from the left as a sampling point from each of the input blocks of the frames 1 to 4 and outputting only the pixel data of the sampling point. That is, the pixel B1 is sampled among the pixels A1 to D1 for the block of the frame 1, the pixel B2 is sampled among the pixels A2 to D2 for the block of the frame 2, the pixel B3 is sampled among the pixels A3 to D3 for the block of the frame 3, and the pixel B4 is sampled among the pixels A4 to D4 for the block of the frame 4.

When the processing is executed on blocks each composed of 4×4 pixels as in (1) example of block to be processed, for example, the sampled pixels for the frame 1 is four pixels B10 to B13 on the second column from the left among the 4×4=16 pixels. The sampled pixel B1 of the frame 1 shown in (B) processing in block processor in FIG. 8 corresponds to the four pixels B10 to B13. This similarly applies to the sampled pixels B2 to B4 for the other frames.

Referring to part (C), in the processing executed by the first-layer-signal packing processor 132-1, a packed block 301 is generated, in which pieces of decimated pixel data B1 to B4 for the four frames forming a unit of decimation and packing are packed. The packed block generated by ¼ spatial decimation of the blocks (each composed of 4×4 pixels) of the four frames is a packed block 311 shown in FIG. 8. That is, a block having 4×4 pixels, composed of only pixel data of the second pixels from the left of the blocks of the frames, is generated.

The packed block 301 (e.g., the packed block 311) is set as a first-layer signal L1. The first-layer signal L1 has an amount of data corresponding to ¼ of the amount of data of the original signal. The first-layer signal L1 is input to the encoder 150 (see FIG. 1) via the output unit 120 (see FIG. 2) and is encoded therein, whereby a first-layer stream signal St1 corresponding to the first-layer signal L1 is output.

Figure 9:
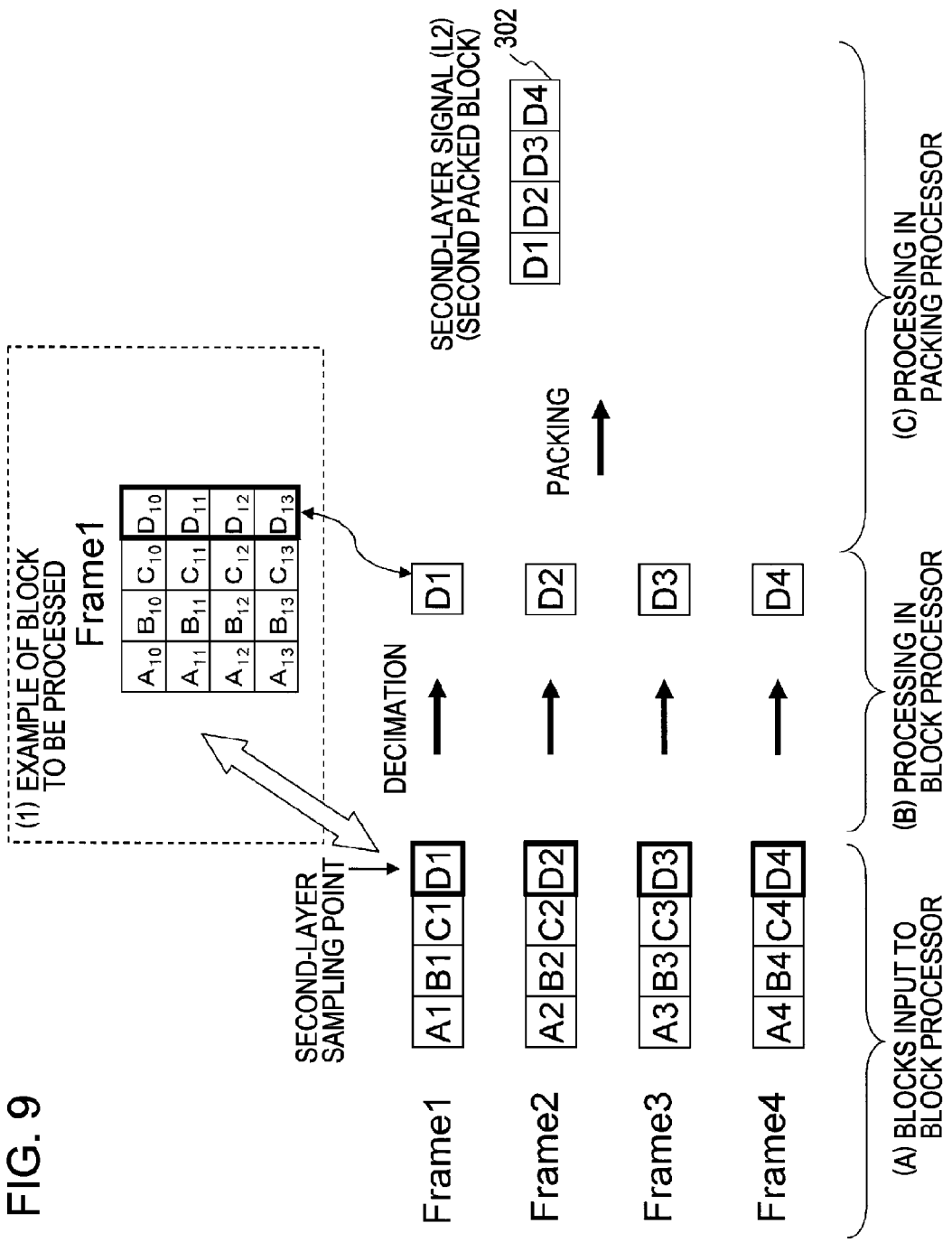
FIG. 9 is a diagram for explaining an example of processing executed by a block processor and a packing processor in the image converter in the image compressor.

FIG. 9 is a diagram for explaining spatial decimation executed by the second-layer-signal block processor 131-2 of the block processor 114 configured to execute spatial decimation, and packing executed by the second-layer-signal packing processor 132-2 of the packing processor 117.

Referring to part (A), similarly to the blocks input to the first-layer-signal block processor 131-1, described with reference to FIG. 8, the blocks input to the second-layer-signal block processor 131-2 include pixel data A1 to D1, A2 to D2, A3 to D3, and A4 to D4 of four blocks at the same position in four frames forming a unit of decimation and packing.

Referring to part (B), in the processing executed by the second-layer-signal block processor 131-2, as opposed to the processing executed by the first-layer-signal block processor 131-1 described earlier with reference to FIG. 8, spatial decimation is executed by sampling the pixel values at the fourth pixel positions D from the left as sampling points and outputting only the pixel data of the sampling points. That is, the pixel D1 is sampled among the pixels A1 to D1 for the block of the frame 1, the pixel D2 is sampled among the pixels A2 to D2 for the block of the frame 2, the pixel D3 is sampled among the pixels A3 to D3 for the block of the frame 3, and the pixel D4 is sampled among the pixels A4 to D4 for the block of the frame 4.

When the processing is executed on blocks each composed of 4×4 pixels as in (1) example of block to be processed, for example, the sampled pixels for the frame 1 are four pixels D10 to D13 on the fourth column from the left among the 4×4=16 pixels. The sampled pixel D1 for the frame 1 shown in (B) processing in block processor in FIG. 9 corresponds to the four pixels D10 to D13. This similarly applies to the sampled pixels D2 to D4 for the other frames.

Referring to part (C), in the processing executed by the packing processor 132-2, a packed block 302 is generated, in which pieces of decimated pixel data D1 to D4 of the four frames forming a unit of decimation and packing are packed. Similarly to the case described with reference to FIG. 8, when the packed block 302 is generated by spatially decimating blocks (each composed of 4×4 pixels) of the four frames by ¼, the packed block 302 is composed of data of 4×4 pixels of only the fourth pixels from the left of the blocks of the frames.

The packed block 302 is set as a second-layer signal L2. The second-layer signal L2 has an amount of data corresponding to ¼ of the amount of data of the original signal. The second-layer signal L2 is input to the encoder 150 (see FIG. 1) via the output unit 120 (see FIG. 2) and is encoded therein, whereby a second-layer stream signal St2 corresponding to the second-layer signal L2 is output.

Figure 10:
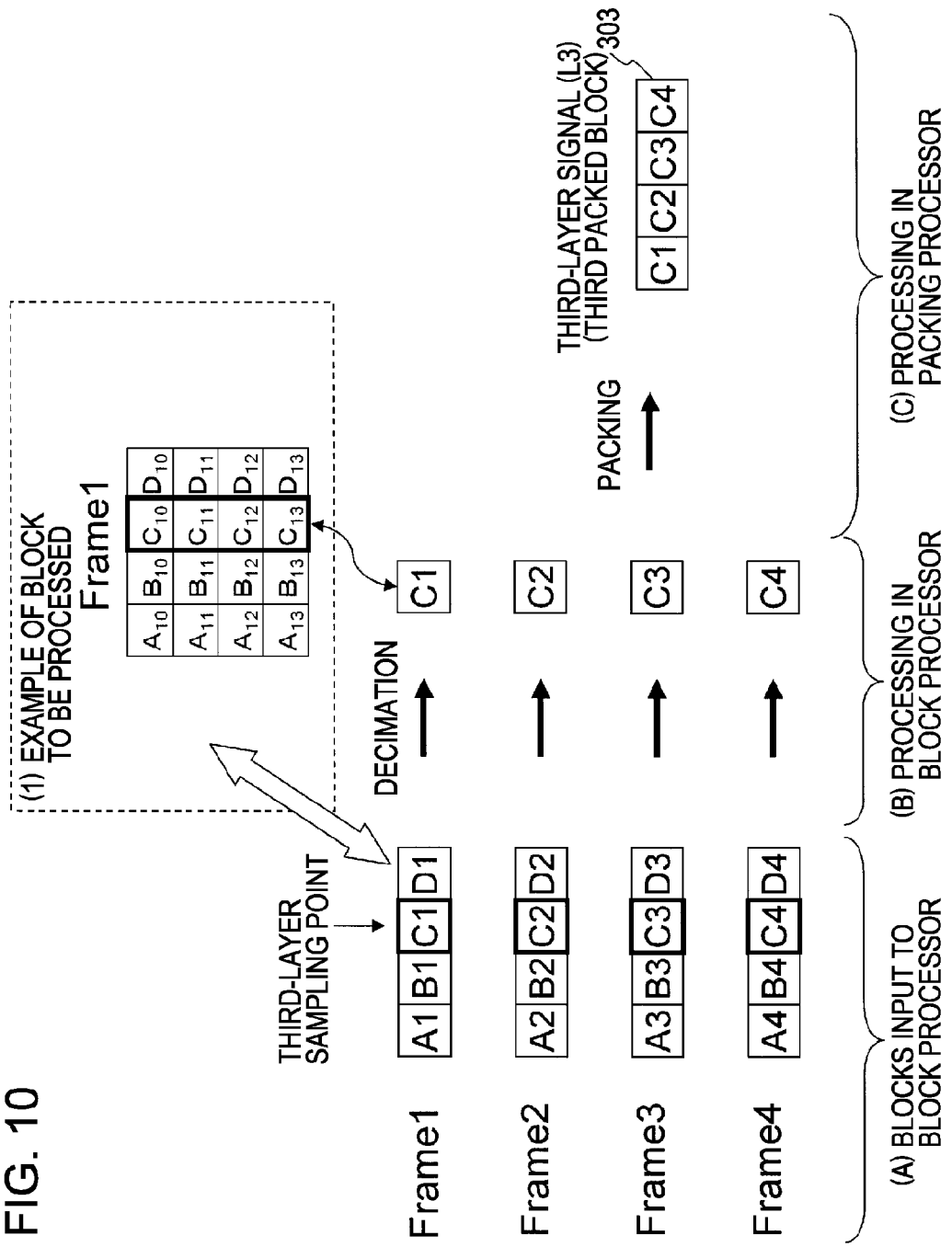
FIG. 10 is a diagram for explaining an example of processing executed by a block processor and a packing processor in the image converter in the image compressor.

FIG. 10 is a diagram for explaining spatial decimation executed by the third-layer-signal block processor 131-3 of the block processor 114 configured to execute spatial decimation, and packing executed by the third-layer-signal packing processor 132-3 of the packing processor 117.

Referring to part (A), similarly to the blocks input to the block processor 131-1, described with reference to FIG. 8, the blocks input to the block processor 131-3 include pixel data of A1 to D1, A2 to D2, A3 to D3, and A4 to D4 of four blocks at the same position in four frames forming a unit of decimation and packing.

Referring to part (B), in the processing executed by the block processor 131-3, spatial decimation is executed by sampling pixel values at the third pixel positions C from the left are as sampling points for the input blocks of the frames 1 to 4 and outputting only pixel data of the sampling points. That is, the pixel C1 is sampled among the pixels A1 to D1 for the block of the frame 1, the pixel C2 is sampled among the pixels A2 to D2 for the block of the frame 2, the pixel C3 is sampled among the pixels A3 to D3 for the block of the frame 3, and the pixel C4 is sampled among the pixels A4 to D4 for the block of the frame 4.

When the processing is executed on blocks each composed of 4×4 pixels as in (1) example of block to be processed, for example, the sampled pixels for the frame 1 are four pixels C10 to C13 on the third column from the left among the 4×4=16 pixels. The sampled pixel C1 for the frame 1 shown in (B) processing in block processor in FIG. 10 corresponds to the four pixels C10 to C13. This similarly applies to the sampled pixels C2 to C4 for the other frames.

Referring to part (C), in the processing executed by the packing processor 132-3, a packed block 303 is generated, in which pieces of decimated pixel data C1 to C4 of four frames forming a unit of decimation and packing are packed. Similarly to the case described with reference to FIG. 8, when the packed block 303 is generated by spatially decimating blocks (each composed of 4×4 pixels) of the four frames by ¼, the packed block 303 is composed of data of 4×4 pixels corresponding to the third pixels from the left of the blocks of the frames.

The packed block 303 is set as a third-layer signal L3. The third-layer signal L3 has an amount of data corresponding to ¼ of the amount of data of the original signal. The third-layer signal L3 is input to the encoder 150 (see FIG. 1) via the output unit 120 (see FIG. 2) and is encoded therein, whereby a third-layer stream signal St3 corresponding to the third-layer signal L3 is output.

Figure 11:
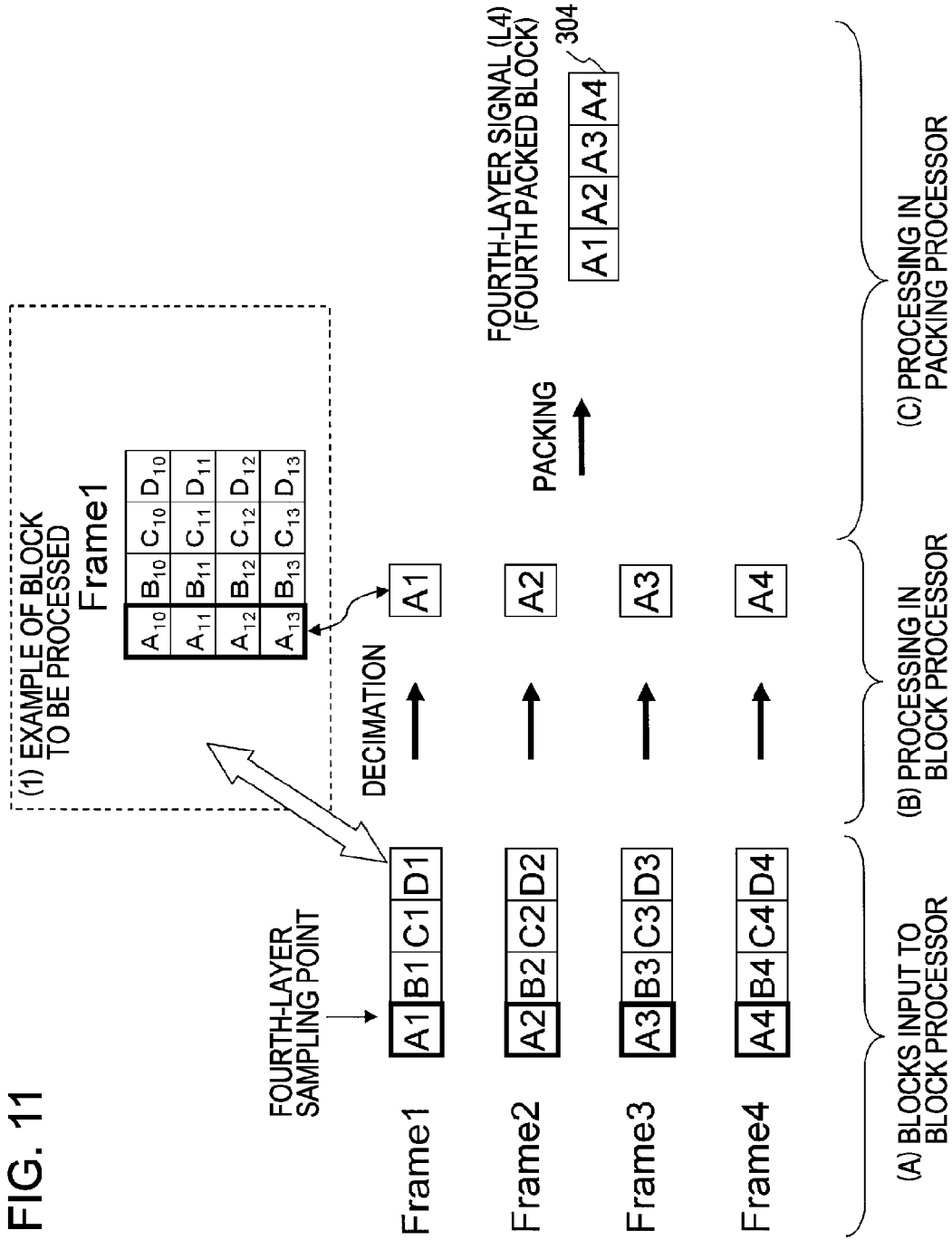
FIG. 11 is a diagram for explaining an example of processing executed by a block processor and a packing processor in the image converter in the image compressor.

FIG. 11 is a diagram for explaining spatial decimation executed by the fourth-layer-signal block processor 131-4 of the block processor 114 configured to execute spatial decimation, and packing executed by the fourth-layer-signal packing processor 132-4 of the packing processor 117.

Referring to part (A), similarly to the blocks input to the block processor 131-1 described with reference to FIG. 8, the blocks input to the block processor 131-4 include pixel data A1 to D1, A2 to D2, A3 to D3, and A4 to D4 of four blocks at the same position in four frames forming a unit of decimation and packing.

Referring to part (B), in the processing executed by the block processor 131-4, spatial decimation is executed by sampling pixel values at the first pixel positions A from the left as sampling points of the input blocks of the frames 1 to 4 and outputting only pixel data of the sampled pixels. That is, the pixel A1 is sampled among the pixels A1 to D1 for the block of the frame 1, the pixel A2 is sampled among the pixels A2 to D2 for the block of the frame 2, the pixel A3 is sampled among the pixels A3 to D3 for the block of the frame 3, and the pixel A4 is sampled among the pixels A4 to D4 for the block of the frame 4.

When the processing is executed on blocks each composed of 4×4 pixels as in (1) example of block to be processed, for example, the sampled pixels for the frame 1 are four pixels A10 to A13 on the first column from the left among the 4×4=16 pixels. The sampled pixel A1 for the frame 1 shown in (B) processing in block processor in FIG. 11 corresponds to the four pixels A10 to A13. This similarly applies to the sampled pixels A2 to A4 for the other frames.

Referring to part (C), in the processing executed by the packing processor 132-4, a packed block 304 is generated, in which pieces of decimated pixel data A1 to A4 of four frames forming a unit of decimation and packing are packed. Similarly to the case described with reference to FIG. 8, when the packed block 304 is generated by spatially decimating blocks (each composed of 4×4 pixels) of four frames by ¼, the packed block 304 is composed of data of 4×4 pixels corresponding to the first pixels from the left of the blocks of the frames.

The packed block 304 is set as a fourth-layer signal L4. The fourth-layer signal L4 is input to the encoder 150 (see FIG. 1)

via the output unit 120 (see FIG. 2) and is encoded therein, whereby a fourth-layer stream signal St4 corresponding to the fourth-layer signal L4 is output.

As described above, in the block processor 114 and the packing processor 117 shown in FIG. 2, the block processor 114 being configured to execute spatial decimation, spatial decimation and packing are executed using different sampling points so that a plurality of layer signals L1 to Ln composed of different signal components is generated.

Temporal Decimation and Packing

Next, processing executed by the block processor 115 and the packing processor 118 shown in FIG. 2, the block processor 115 being configured to execute temporal decimation, will be described with reference to FIGS. 12 to 15. In the block processor 115, first to n-th-layer-signal block processors 131-1 to 131-n execute temporal decimation using different frames as sampling frames, and first to n-th-layer-signal packing processors 132-1 to 132-n individually pack the plurality of pieces of temporally decimated data to generate layer signals L1 to Ln in the form of a plurality of packed blocks.

Similarly to the case described earlier with reference to FIGS. 8 to 11, FIGS. 12 to 15 relate to an example of processing where ¼ decimation is executed.

Figure 12:
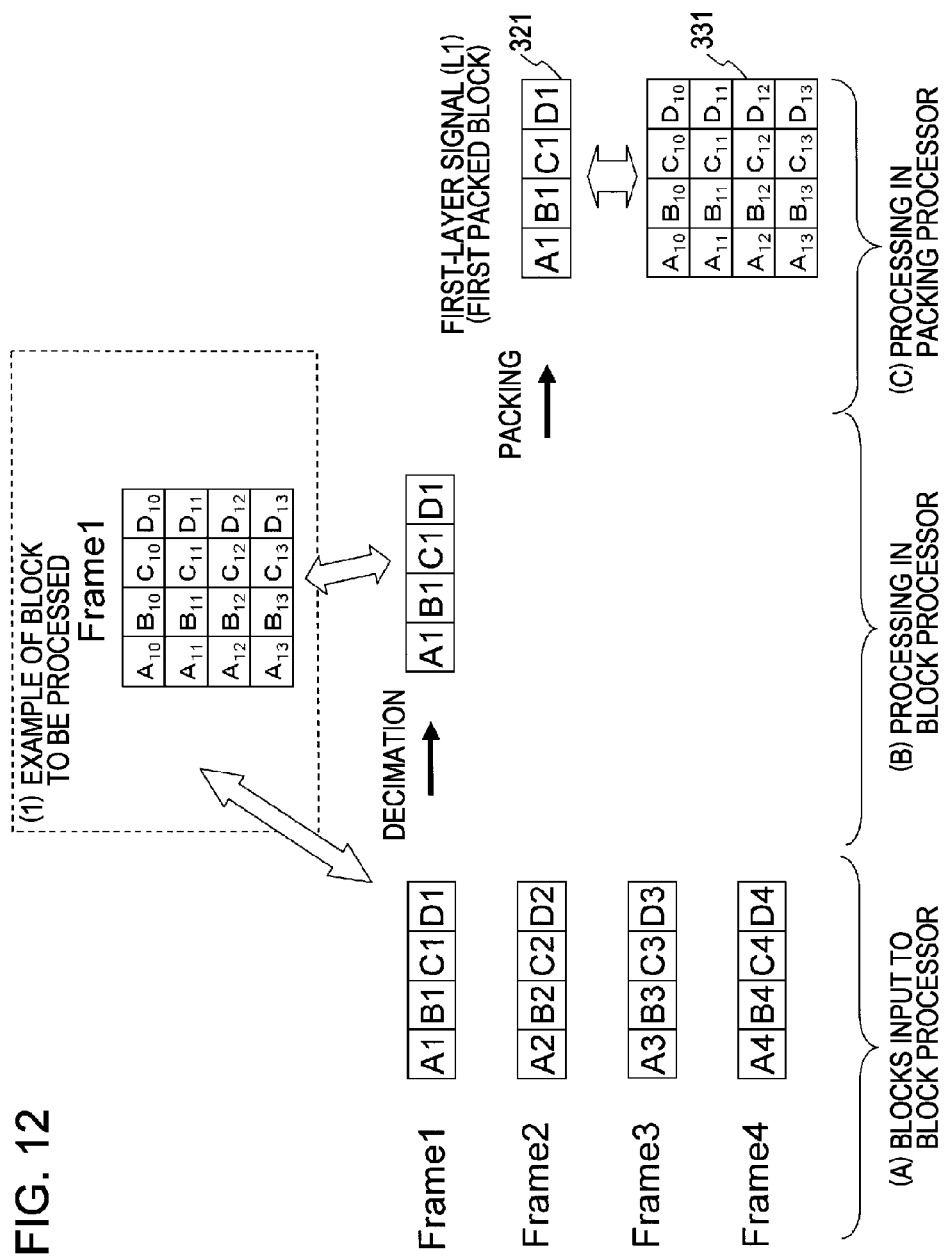
FIG. 12 is a diagram for explaining an example of processing executed by a block processor and a packing processor in the image converter in the image compressor.

FIG. 12 is a diagram for explaining temporal decimation executed by the first-layer-signal block processor 131-1 of the block processor 115 configured to execute temporal decimation, and packing executed by the first-layer-signal packing processor 132-1 of the packing processor 118. FIG. 12 shows (A) blocks input to block processor, (B) processing in block processor, and (C) processing in packing processor.

Referring to part (A), similarly to the example of spatial decimation described earlier, the blocks input to the block processor 131-1 include pixel data A1 to D1, A2 to D2, A3 to D3, and A4 to D4 of four blocks at the same position in four frames forming a unit of decimation and packing.

Referring to part (B), in the processing executed by the block processor 131-1, a block of one frame is sampled from input blocks of frames 1 to 4. The block processor 131-1 executes temporal decimation by sampling the block of the frame 1 as a sampling point and outputting only pixel data of the sampled pixels. That is, the block processor 131-1 samples the pixels A1 to D1 of the block of the frame 1.

When the processing is executed on block each composed of 4×4 pixels as in (1) example of block to be processed, the 4×4=16 pixels of the frame 1 are sampled, and the pixels of the other frames 2 to 4 are not included in output data.

Referring to part (C), in the processing executed by the packing processor 132-1, a packed block 321 is generated, in which pieces of decimated pixel data A1 to D1 for four frames forming a unit of decimation and packing are packed. That is, the output of the block processor 131-1 is used directly as a packed block. The packed block generated by temporally decimating blocks (each composed of 4×4 pixels) of four frames by ¼ is a packed block 331 shown in FIG. 12. That is, the packed block is composed of only pixel data of the block of the frame 1.

The packed block 321 (e.g., the packed block 331) is set as a first-layer signal L1. The first-layer signal L1 has an amount of data corresponding to ¼ of the amount of data of the original signal. The first-layer signal L1 is input to the encoder 150 (see FIG. 1) via the output unit 120 (see FIG. 2) and is encoded therein, whereby a first-layer stream signal St1 corresponding to the first-layer signal L1 is output.

Figure 13:
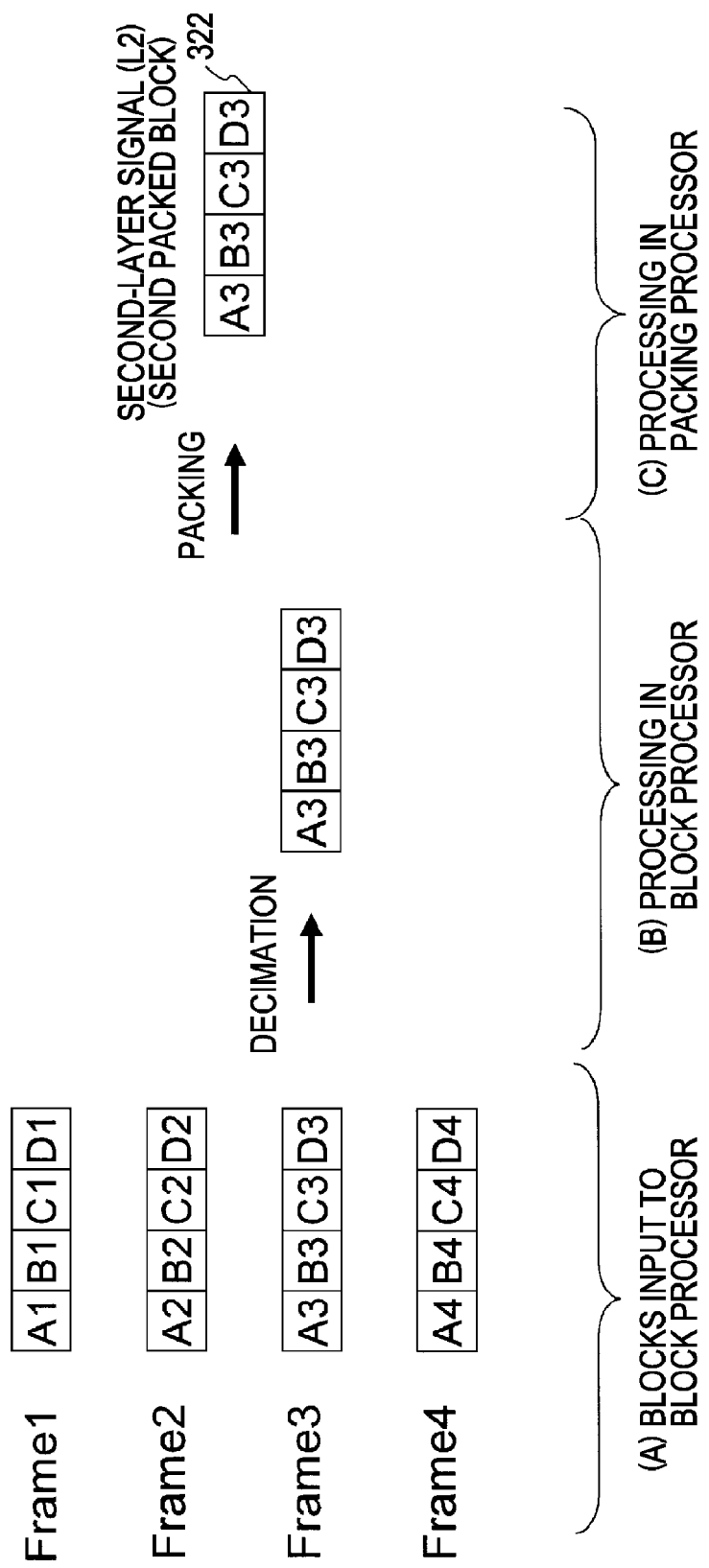
FIG. 13 is a diagram for explaining an example of processing executed by a block processor and a packing processor in the image converter in the image compressor.

FIG. 13 is a diagram for explaining temporal decimation executed by the second-layer-signal block processor 131-2 of the block processor 115 configured to execute temporal decimation, and packing executed by the second-layer-signal packing processor 132-2 of the packing processor 118.

Referring to part (A), similarly to the blocks input to the block processor 131-1 described with reference to FIG. 8, the blocks input to the block processor 131-2 include pixel data A1 to D1, A2 to D2, A3 to D3, and A4 to D4 of four blocks at the same position in four frames forming a unit of decimation and packing.

Referring to part (B), in the processing executed by the block processor 131-2, a block of one frame is sampled from input blocks of frames 1 to 4. The block processor 131-2 executes temporal decimation by sampling the block of the frame 3 as a sampling point and outputting only pixel data of the sampled pixels. That is, the block processor 131-2 samples the pixels A3 to D3 of the block of the frame 3.

Referring to part (C), in the processing executed by the packing processor 132-2, a packed block 322 is generated, in which pieces of decimated pixel data A3 to D3 for four frames forming a unit of decimation and packing are packed. That is, the output of the block processor 131-2 is used directly as a packed block. When the packed block 322 is generated by temporally decimating blocks (each composed of 4×4 pixels) of four frames by ¼ similarly to the case described with reference to FIG. 12, the packed block 322 is composed of only pixel data of the block of the frame 3.

The packed block 322 is set as a second-layer signal L2. The second-layer signal L2 has an amount of data corresponding to ¼ of the amount of data of the original signal. The second-layer signal L2 is input to the encoder 150 (see FIG. 1) via the output unit 120 (see FIG. 2) and is encoded therein, whereby a second-layer stream signal St2 corresponding to the second-layer signal L2 is output.

Figure 14:
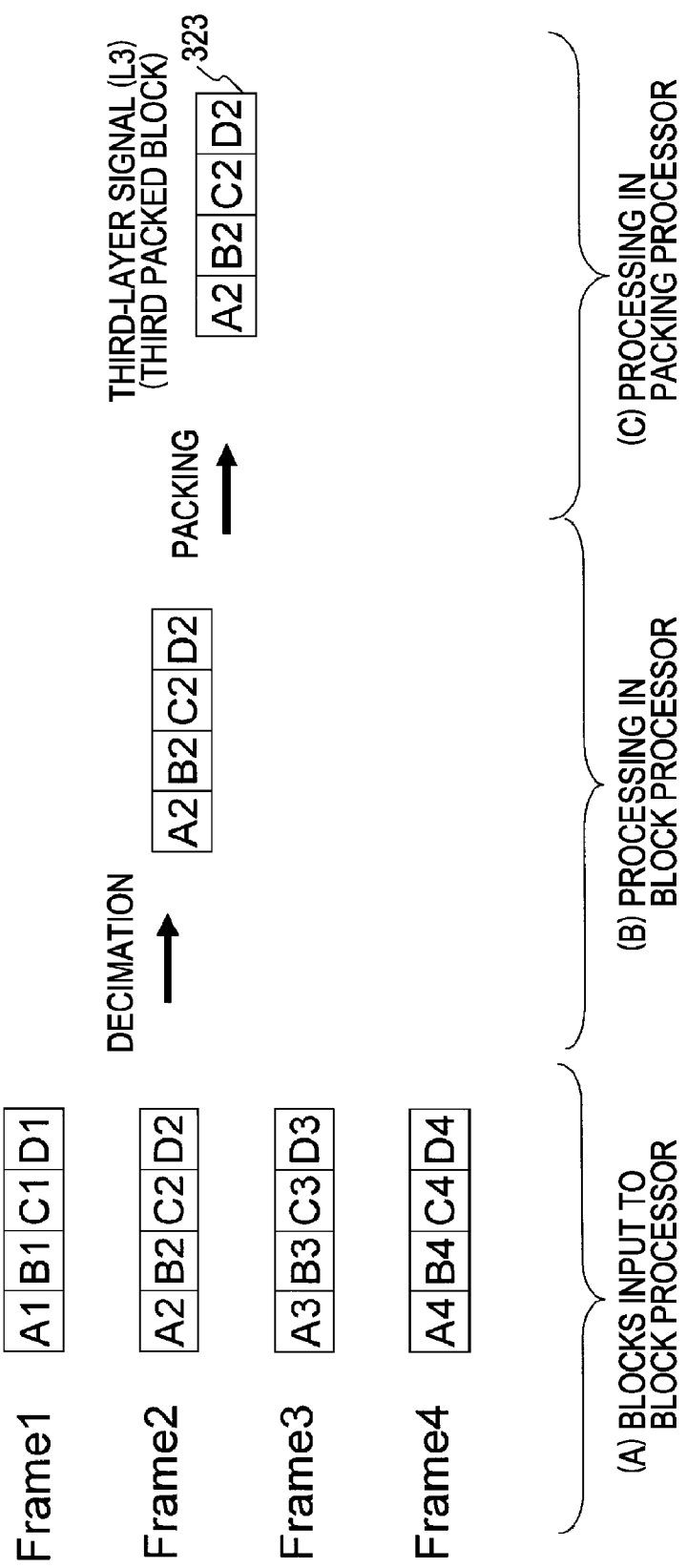
FIG. 14 is a diagram for explaining an example of processing executed by a block processor and a packing processor in the image converter in the image compressor.

FIG. 14 is a diagram for explaining temporal decimation executed by the third-layer-signal block processor 131-3 of the block processor 115 configured to execute temporal decimation, and packing executed by the third-layer-signal packing processor 132-3 of the packing processor 118.

Referring to part (A), similarly to the blocks input to the block processor 131-3 described with reference to FIG. 8, the blocks input to the block processor 131-3 include pixel data A1 to D1, A2 to D2, A3 to D3, and A4 to D4 of four blocks at the same position in four frames forming a unit of decimation and packing.

Referring to part (B), in the processing executed by the block processor 131-3, a block of one frame is sampled from input blocks of frames 1 to 4. The block processor 131-3 executes temporal decimation by sampling the block of the frame 2 as a sampling point and outputting only pixel data of the sampled pixels. That is, the block processor 131-3 samples the pixels A2 to D2 of the block of the frame 3.

Referring to part (C), in the processing executed by the packing processor 132-3, a packed block 323 is generated, in which pieces of decimated pixel data A2 to D2 for four frames forming a unit of decimation and packing are packed. That is, the output of the block processor 131-3 is used directly as a packed block. When the packed block 323 is generated by temporally decimating blocks (each composed of 4×4 pixels) of four frames by ¼ similarly to the case described with reference to FIG. 12, the packed block 323 is composed of only pixel data of the block of the frame 2.

The packed block 323 is set as a third-layer signal L3. The third-layer signal L3 has an amount of data corresponding to ¼ of the amount of data of the original signal. The third-layer signal L3 is input to the encoder 150 (see FIG. 1) via the output unit 120 (see FIG. 2) and is encoded therein, whereby a third-layer stream signal St3 corresponding to the third-layer signal L3 is output.

Figure 15:
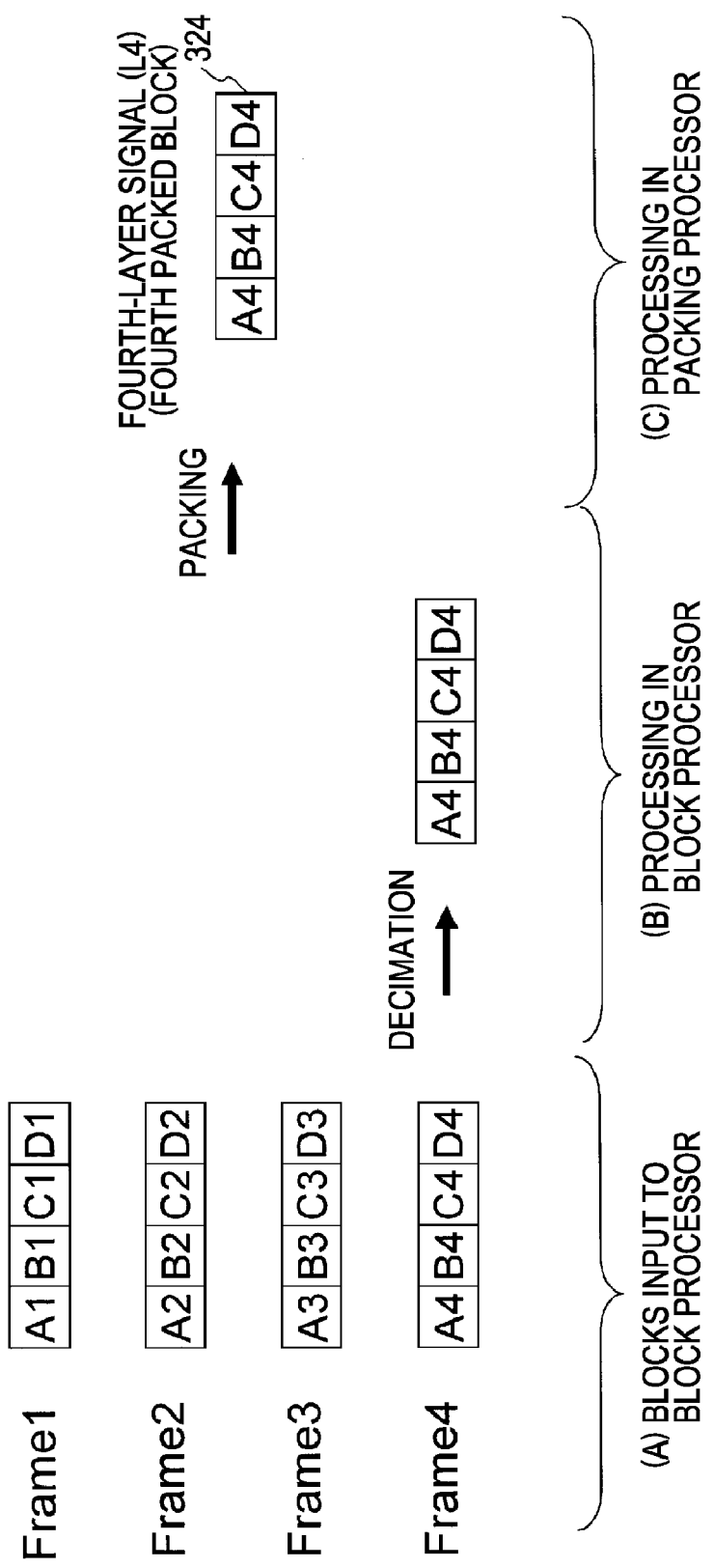
FIG. 15 is a diagram for explaining an example of processing executed by a block processor and a packing processor in the image converter in the image compressor.

FIG. 15 is a diagram for explaining temporal decimation executed by the fourth-layer-signal block processor 131-4 of the block processor 115 configured to execute temporal decimation, and packing executed by the fourth-layer-signal packing processor 132-4 of the packing processor 118.

Referring to part (A), similarly to the blocks input to the block processor 131-4 described with reference to FIG. 8, the blocks input to the block processor 131-4 include pixel data A1 to D1, A2 to D2, A3 to D3, and A4 to D4 of four blocks at the same position in four frames forming a unit of decimation and packing.

Referring to part (B), in the processing executed by the block processor 131-4, a block of one frame is sampled from input blocks of frames 1 to 4. The block processor 131-4 executes temporal decimation by sampling the block of the frame 4 as a sampling point and outputting only pixel data of the sampled pixels. That is, the block processor 131-4 samples the pixels A4 to D4 of the block of the frame 4.

Referring to part (C), in the processing executed by the packing processor 132-4, a packed block 324 is generated, in which pieces of decimated pixel data A4 to D4 for four frames forming a unit of decimation and packing are packed. That is, the output of the block processor 131-4 is used directly as a packed block. When the packed block 324 is generated by temporally decimating blocks (each composed of 4×4 pixels) of four frames by ¼ similarly to the case described with reference to FIG. 12, the packed block 324 is composed of only pixel data of the block of the frame 4.

The packed block 324 is set as a fourth-layer signal L4. The fourth-layer signal L4 has an amount of data corresponding to ¼ of the amount of data of the original signal. The fourth-layer signal L4 is input to the encoder 150 (see FIG. 1) via the output unit 120 (see FIG. 2) and is encoded therein, whereby a fourth-layer stream signal St4 corresponding to the fourth-layer signal L4 is output.

As described above, in the block processor 115 and the packing processor 118 shown in FIG. 2, the block processor 115 being configured to execute temporal decimation, temporal decimation and packing are executed using different frames as sampling points, so that a plurality of layer signals L1 to Ln composed of different signal components is generated.

Spatial and Temporal Decimation and Packing

Next, processing executed by the block processor 116 and the packing processor 119 shown in FIG. 2, the block processor 116 being configured to execute spatial decimation and temporal decimation, will be described with reference to FIGS. 16 to 19. In the block processor 116, the first-layer-signal to n-th-layer-signal block processors 131-1 to 131-$n$, shown in FIG. 7, execute spatial and temporal decimation by sampling frames at different sampling points. Furthermore, the first-layer-signal to n-th-layer signal packing processors 132-1 to 132-$n$ individually pack pieces of spatially and temporally decimated data to generate layer signals L1 to Ln as a plurality of packed blocks.

FIGS. 16 to 19 also relate to an example of processing in which ¼ decimation is executed, similarly to the case described earlier with reference to FIGS. 8 to 11.

Figure 16:
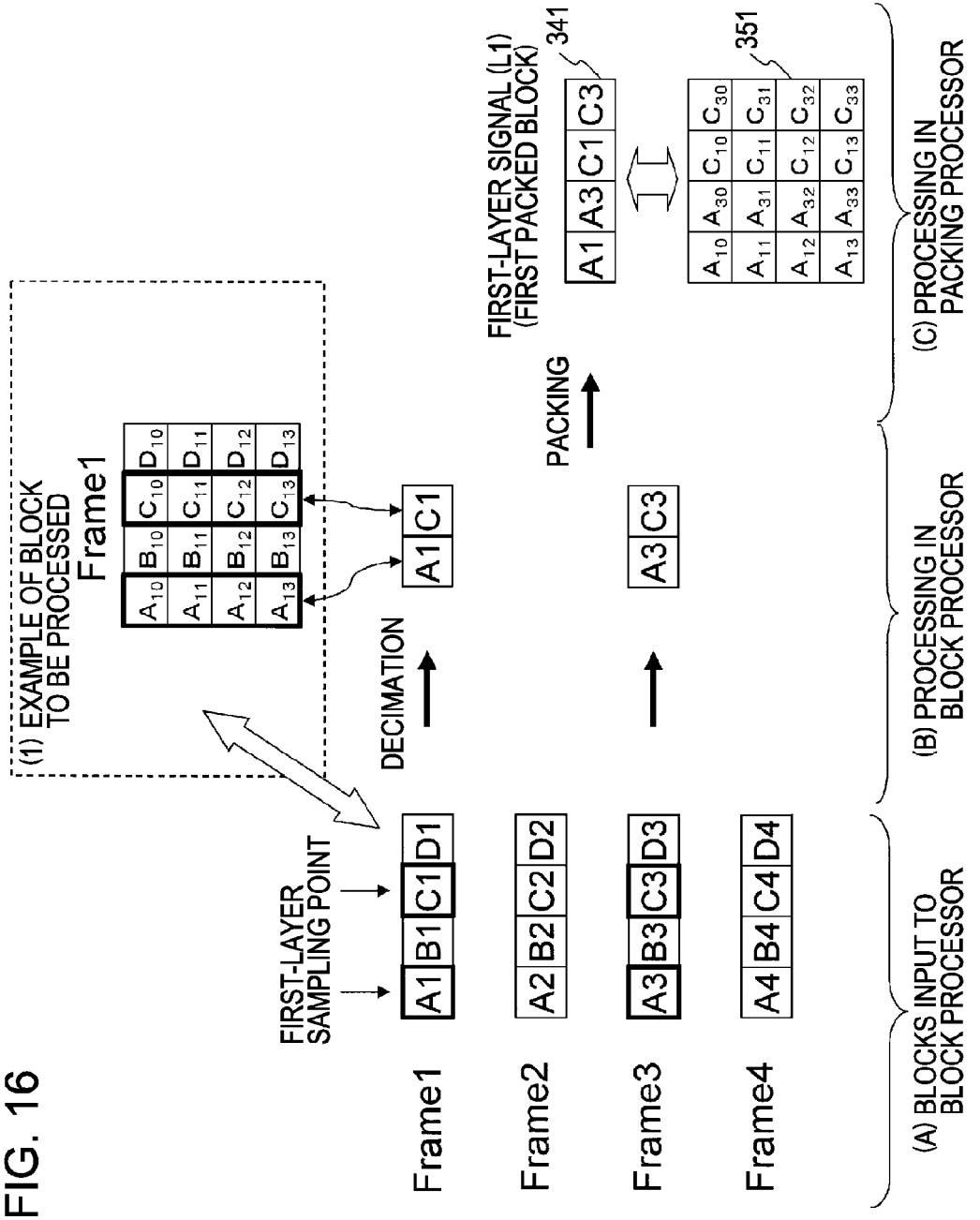
FIG. 16 is a diagram for explaining an example of processing executed by a block processor and a packing processor in the image converter in the image compressor.

FIG. 16 is a diagram for explaining spatial and temporal decimation executed by the first-layer-signal block processor 131-1 of the block processor 116 configured to execute spatial and temporal decimation, and packing executed by the first-layer-signal packing processor 132-1 of the packing processor 119. FIG. 16 shows (A) blocks input to block processor, (B) processing in block processor, and (C) processing in packing processor.

Referring to part (A), blocks input to the block processor 131-1 include pixel data A1 to D1, A2 to D2, A3 to D3, and A4 to D4 of four blocks at the same position in four frames forming a unit of decimation and packing, similarly to the example of spatial decimation described earlier.

Referring to part (B), in the processing executed by the block processor 131-1, spatial and temporal decimation is executed so that the first and third frames are sampled from the input blocks of the individual frames 1 to 4, data of the first and third pixels from the left in the individual sampled frames are sampled, and the sampled pixel data is output. That is, the pixels A1 and C1 are sampled among the pixels A1 to D1 in the block of the frame 1, and the pixels A3 and C3 are sampled among the pixels A3 to D3 in the block of the frame 3.

When the processing is executed on blocks each composed of 4×4 pixels as in (1) example of block to be processed, eight pixels A00 to A13 and C00 to C13 are sampled from the block associated with the frame 1 among 4×4=16 pixels. The pixels A1 and C1 in part (B) showing processing in block processor correspond to these pixels. Similarly, eight pixels are sampled from sampling points in the frame 3. The pixels A3 and C3 in part (B) showing processing in block processor correspond to these pixels.

Referring next to part (C), in the processing executed by the packing processor 132-1, a packed block 341 is generated, in which pieces of decimated pixel data A1, C1, A3, and C3 corresponding to the four frames forming a unit of decimation and packing are packed. A packed block 351 shown in FIG. 16 is an example of packed block generated by ½ spatial decimation and ½ temporal decimation of blocks each composed of 4×4 pixels. That is, a block composed of 4×4 pixels corresponding to eight pixels in the frame 1 and eight pixels in the frame 3 is generated.

The packed block 341 (e.g., the packed block 351) is set as a first-layer signal L1. The first-layer signal L1 has an amount of data corresponding to ¼ of the amount of data of the original signal. The first-layer signal L1 is input to the encoder 150 (see FIG. 1) via the output unit 120 (see FIG. 2) and is encoded therein, whereby a first-layer stream signal St1 corresponding to the first-layer signal L1 is output.

Figure 17:
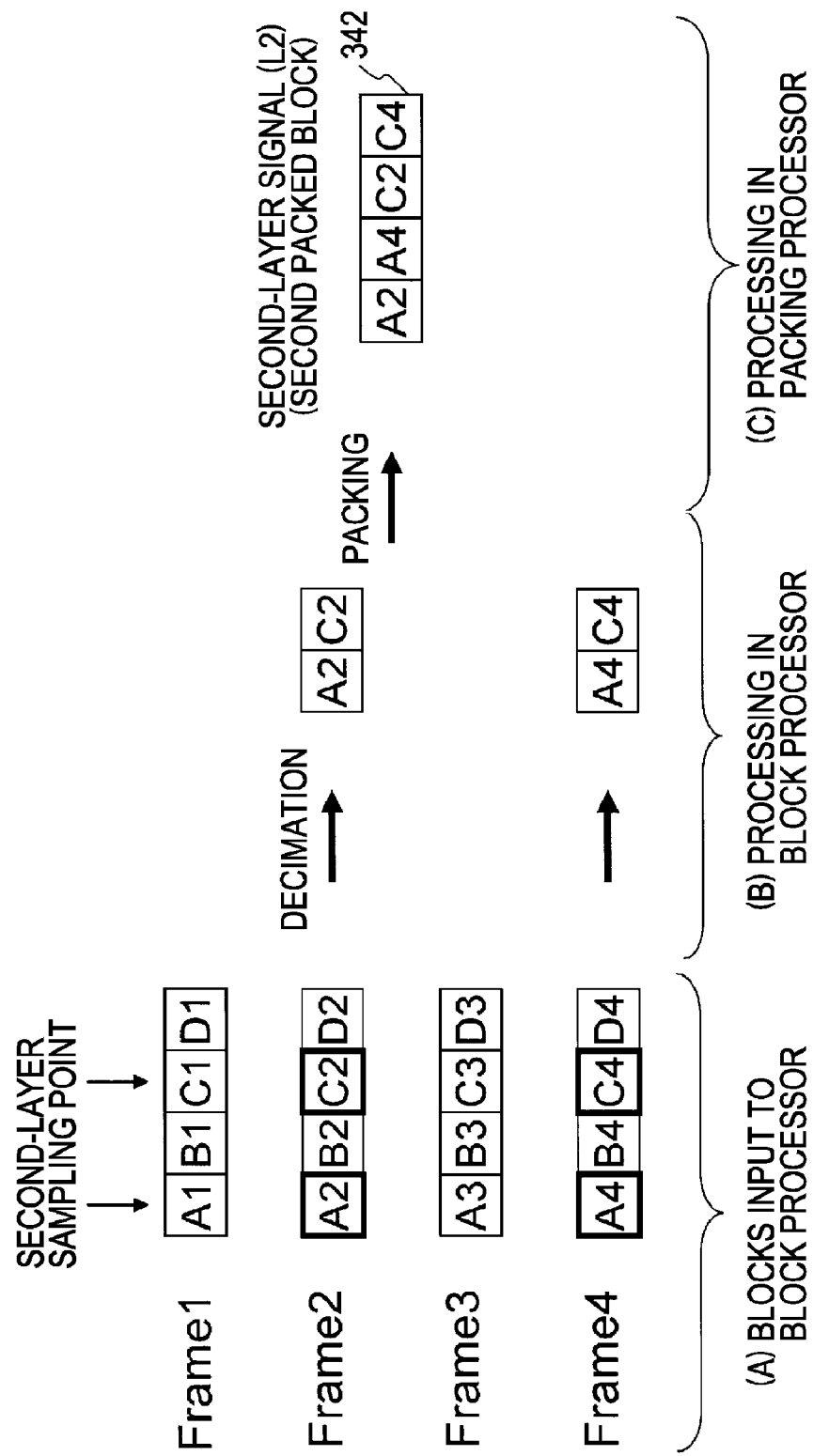
FIG. 17 is a diagram for explaining an example of processing executed by a block processor and a packing processor in the image converter in the image compressor.

FIG. 17 is a diagram for explaining spatial and temporal decimation executed by the second-layer-signal block processor 131-2 of the block processor 116 configured to execute spatial and temporal decimation, and packing executed by the second-layer-signal packing processor 132-2 of the packing processor 119.

Referring to part (A), blocks input to the block processor 131-2 include pixel data A1 to D1, A2 to D2, A3 to D3, and A4 to D4 of four blocks at the same position in four frames forming a unit of decimation and packing, similarly to the blocks input to the block processor 131-1 described with reference to FIG. 8.

Referring to part (B), in the processing executed by the block processor 131-2, spatial and temporal decimation is executed so that the second and fourth frames are sampled from the input blocks of the individual frames 1 to 4, data of the first and third pixels from the left in the individual sampled frames are sampled, and the sampled pixel data is output. That is, the pixels A2 and C2 are sampled among the pixels A2 to D2 in the block of the frame 2, and the pixels A4 and C4 are sampled among the pixels A4 to D4 in the block of the frame 3.

Referring next to part (C), in the processing executed by the packing processor 132-2, a packed block 342 is generated, in which pieces of decimated pixel data A2, C2, A4, and C4 corresponding to the four frames forming a unit of decimation and packing are packed.

The packed block 342 is set as a second-layer signal L2. The second-layer signal L2 has an amount of data corresponding to ¼ of the amount of data of the original signal. The second-layer signal L2 is input to the encoder 150 (see FIG. 1) via the output unit 120 (see FIG. 2) and is encoded therein, whereby a second-layer stream signal St2 corresponding to the second-layer signal L2 is output.

Figure 18:
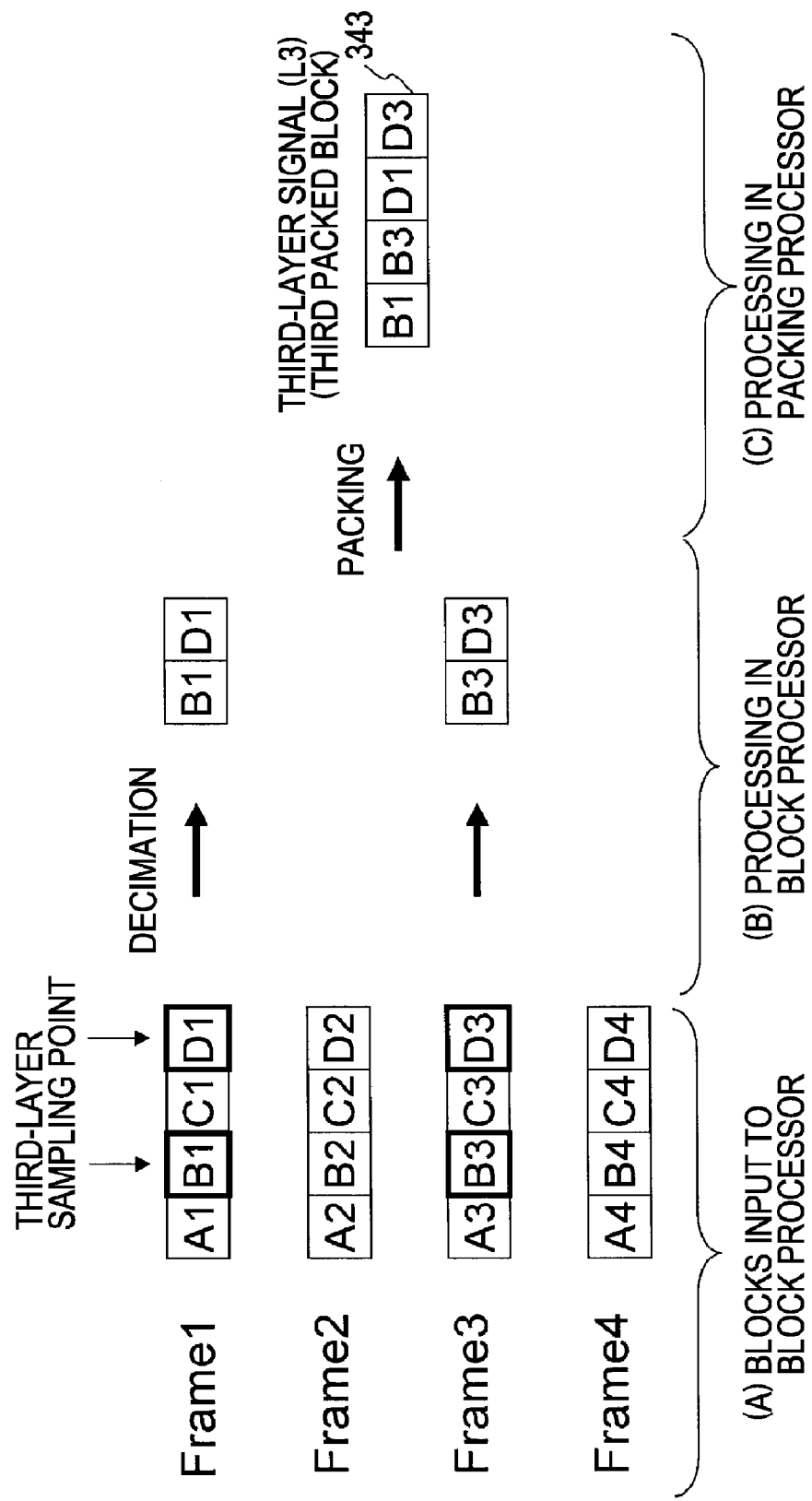
FIG. 18 is a diagram for explaining an example of processing executed by a block processor and a packing processor in the image converter in the image compressor.

FIG. 18 is a diagram for explaining spatial and temporal decimation executed by the third-layer-signal block processor 131-3 of the block processor 116 configured to execute spatial and temporal decimation, and packing executed by the third-layer-signal packing processor 132-3 of the packing processor 119.

Referring to part (A), blocks input to the block processor 131-3 include pixel data A1 to D1, A2 to D2, A3 to D3, and A4 to D4 of four blocks at the same position in four frames forming a unit of decimation and packing, similarly to the blocks input to the block processor 131-1 described with reference to FIG. 8.

Referring to part (B), in the processing executed by the block processor 131-3, spatial and temporal decimation is executed so that the first and third frames are sampled from the input blocks of the individual frames 1 to 4, data of the second and fourth pixels from the left in the individual sampled frames are sampled, and the sampled pixel data is output. That is, the pixels B1 and D1 are sampled among the pixels A1 to D1 in the block of the frame 1, and the pixels B3 and D3 are sampled among the pixels A3 to D3 in the block of the frame 3.

Referring next to part (C), in the processing executed by the packing processor 132-3, a packed block 343 is generated, in which pieces of decimated pixel data B1, D1, B3, and D3 corresponding to the four frames forming a unit of decimation and packing are packed.

The packed block 343 is set as a third-layer signal L3. The third-layer signal L3 has an amount of data corresponding to ¼ of the amount of data of the original signal. The third-layer signal L3 is input to the encoder 150 (see FIG. 1) via the output unit 120 (see FIG. 2) and is encoded therein, whereby a third-layer stream signal St3 corresponding to the third-layer signal L3 is output.

Figure 19:
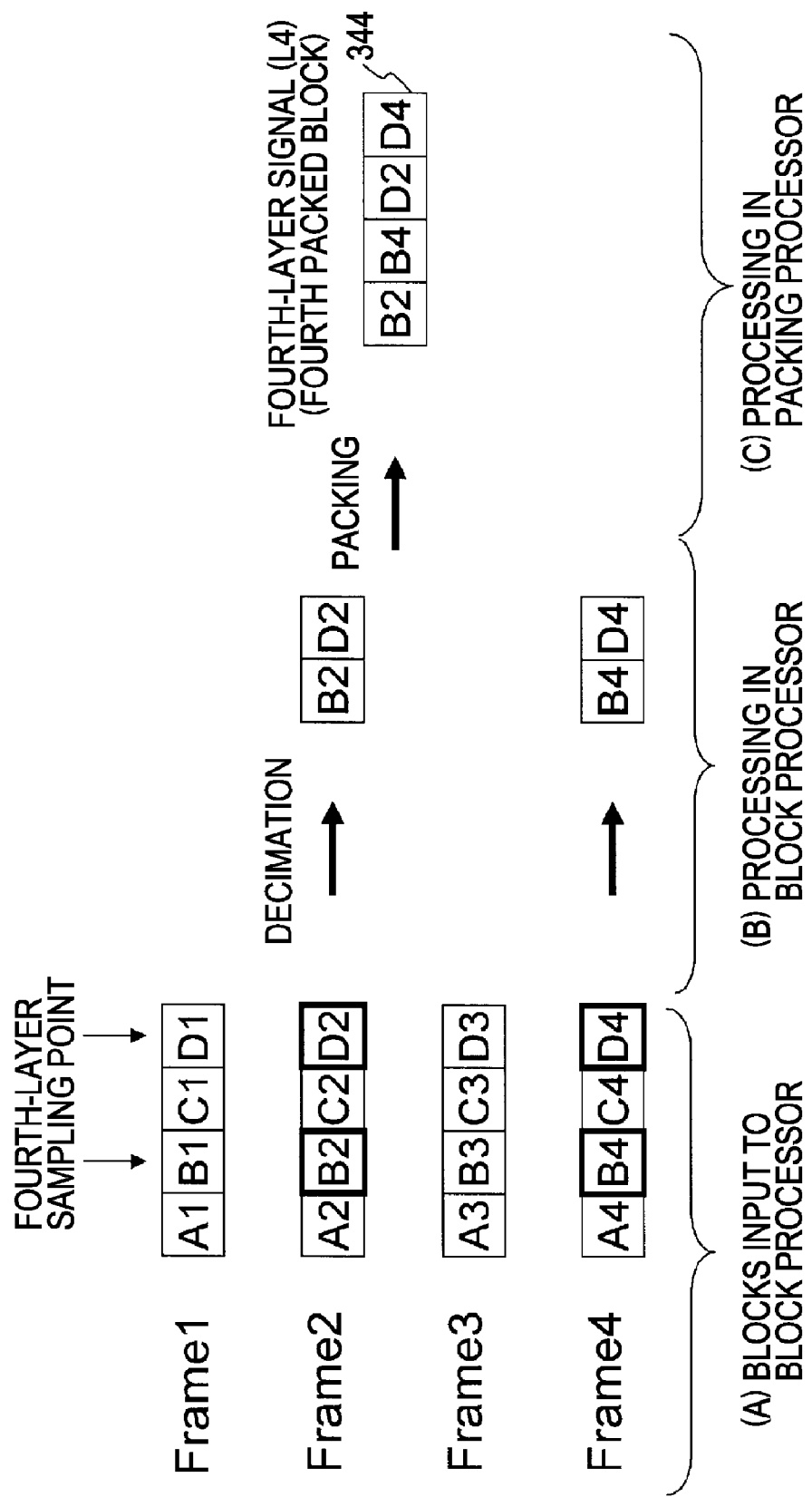
FIG. 19 is a diagram for explaining an example of processing executed by a block processor and a packing processor in the image converter in the image compressor.

FIG. 19 is a diagram for explaining spatial and temporal decimation executed by the fourth-layer-signal block processor 131-4 of the block processor 116 configured to execute spatial and temporal decimation, and packing executed by the fourth-layer-signal packing processor 132-4 of the packing processor 119.

Referring to part (A), blocks input to the block processor 131-4 include pixel data A1 to D1, A2 to D2, A3 to D3, and A4 to D4 of four blocks at the same position in four frames forming a unit of decimation and packing, similarly to the blocks input to the block processor 131-1 described with reference to FIG. 8.

Referring to part (B), in the processing executed by the block processor 131-4, spatial and temporal decimation is executed so that the second and fourth frames are sampled from the input blocks of the individual frames 1 to 4, data of the second and fourth pixels from the left in the individual sampled frames are sampled, and the sampled pixel data is output. That is, the pixels B2 and D2 are sampled among the pixels A2 to D2 in the block of the frame 2, and the pixels B4 and D4 are sampled among the pixels A4 to D4 in the block of the frame 4.

Referring next to part (C), in the processing executed by the packing processor 132-4, a packed block 344 is generated, in which pieces of decimated pixel data B2, D2, B4, and D4 corresponding to the four frames forming a unit of decimation and packing are packed.

The packed block 344 is set as a fourth-layer signal L4. The fourth-layer signal L4 has an amount of data corresponding to ¼ of the amount of data of the original signal. The fourth-layer signal L4 is input to the encoder 150 (see FIG. 1) via the output unit 120 (see FIG. 2) and is encoded therein, whereby a fourth-layer stream signal St4 corresponding to the fourth-layer signal L4 is output.

As described above, in the block processor 116 and the packing processor 119 shown in FIG. 2, the block processor 116 being configured to execute spatial decimation and temporal decimation, spatial and temporal decimation and packing are executed by sampling frames at different sampling points, thereby generating a plurality of layer signals L1 to Ln composed of different signal components.

As described above, the block processors 114 to 116 and the packing processors 117 to 119 shown in FIG. 2 execute spatial decimation, temporal decimation, or spatial and temporal decimation on blocks distributed by the block distributor 113 on the basis of amounts of movement in the blocks. Furthermore, layer signals L1 to Ln in the form of a plurality of packed blocks composed of data sampled from different sampling points are generated, and the layer signals L1 to Ln are output to the encoder 150 via the output unit 120.

Figure 20:
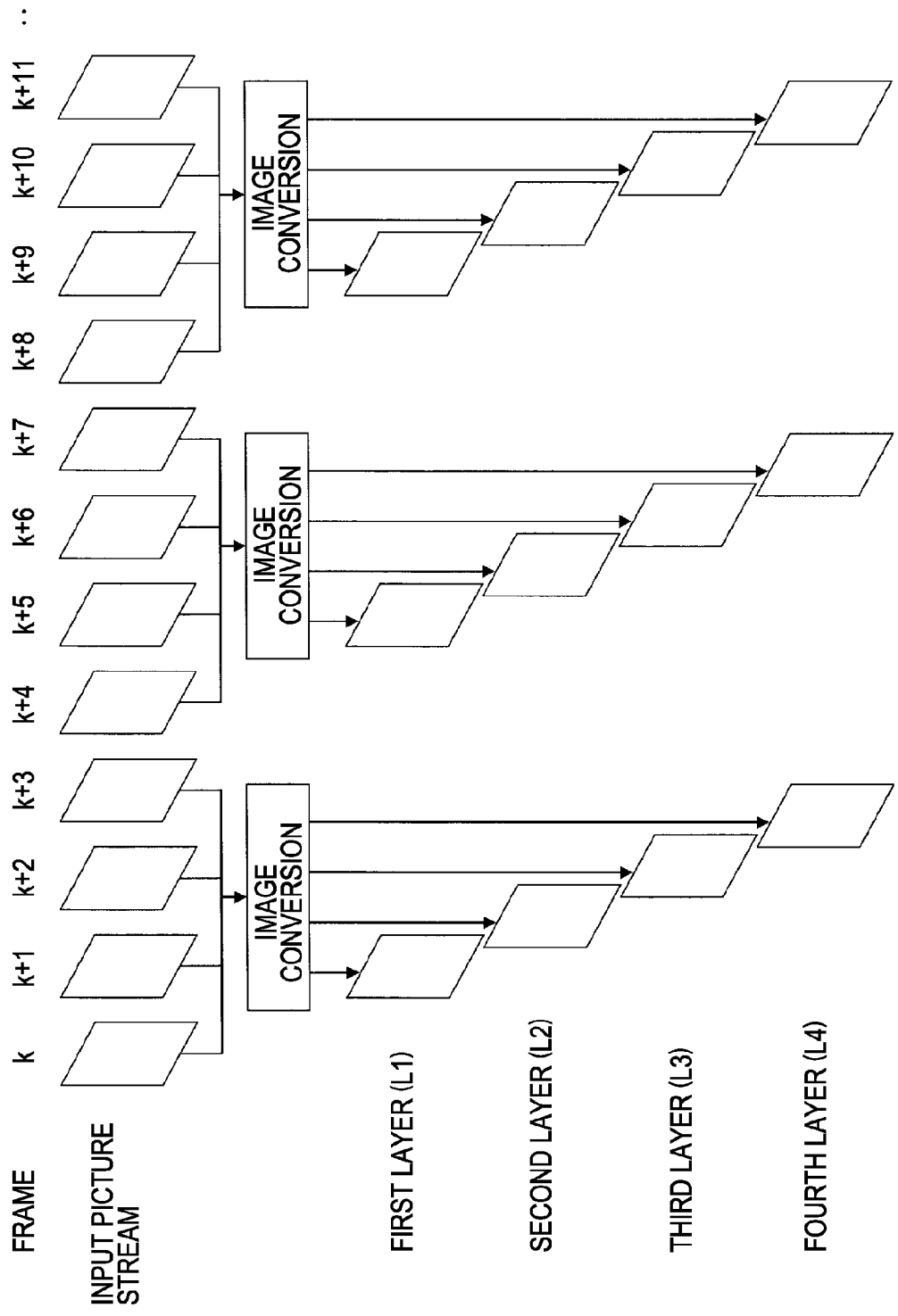
FIG. 20 is a diagram for explaining relationship between input picture frames and output signals in the image compressor.

For example, when processing is executed in units of 4 frames, layer signals are configured as shown in FIG. 20. Referring to FIG. 20, four layer signals L1 to L4 are generated for blocks of four frames corresponding to four input streams of frames k to (k+3). Similarly, four layer signals L1 to L4 are generated for blocks of four frames corresponding to four input streams of frames (k+4) to (k+7). Similarly, four layer signals L1 to L4 are generated for each subsequent set of four frames, the layer signals L1 to L4 are input to the encoder 150 via the output unit 120, and stream signals St1 to St4 composed of four different pieces of data are output.

In the image compressor 100, the output unit 120 selects picture signals from a packing processor selected on a block-by-block basis according to block processing information supplied from a controller (not shown) so that the first-layer signal L1 to n-th-layer signal Ln in the form of packed blocks generated through the processing by the packing processors 117 to 119 described above are supplied to the encoder 150.

Figure 21:
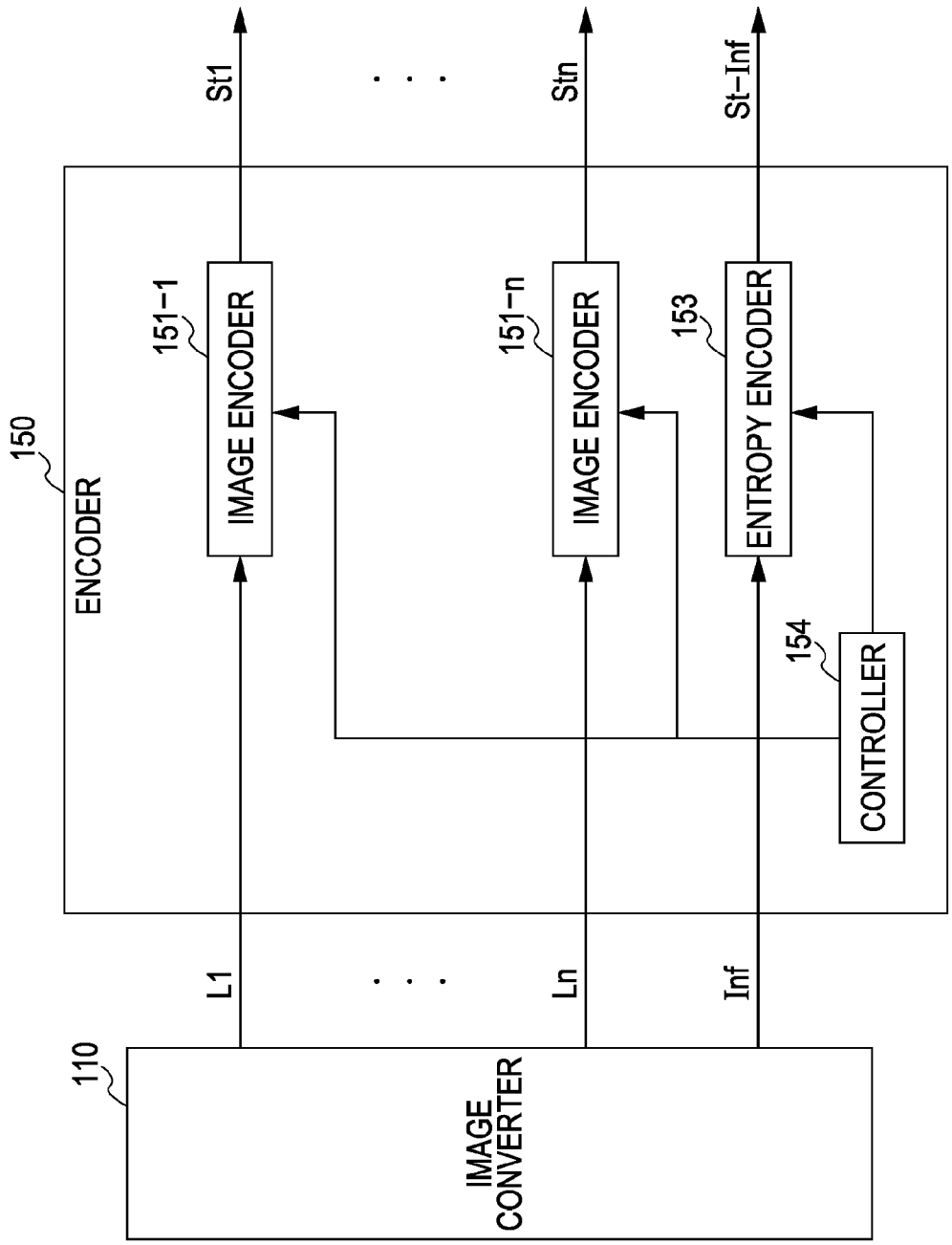
FIG. 21 is a diagram showing an example construction of an encoder in the image compressor.

Next, the construction and operation of the encoder 150 will be described with reference to FIG. 21. The encoder 150 includes image encoders 151-1 to 151-$n$ individually associated with layer signals L1 to Ln output from the image converter 110. The image encoders 151-1 to 151-$n$ individually encode the layer signals L1 to Ln in accordance with encoding-bitrate information supplied from a controller 154 to generate stream signals St1 to Stn corresponding to the individual layer signals L1 to Ln, and outputs the stream signals St1 to Stn.

For example, the image encoder 151-1 encodes the first-layer signal L1 in accordance with a bitrate for the first layer, supplied from the controller 154, thereby generating and outputting a first-layer stream St1. Similarly, the image encoder 151-$n$ encodes the n-th layer signal Ln in accordance with a bitrate for the n-th layer, supplied from the controller 154, thereby generating and outputting an n-th layer stream Stn. The controller 154 may set the same bitrate as the bitrates for the first to n-th layers, or exercise stepwise bitrate control so that a maximum bitrate is set for the first layer and a minimum bitrate is set for the n-th layer. When the same bitrate is set for all the layers, it is possible to use an arbitrary layer as a base layer at a receiving end. The image encoder 151-1 to 151-$n$ may employ various encoding schemes, such as MPEG (Moving Picture Experts Group), which is suitable for compressing moving pictures, or JPEG (Joint Photographic Experts Group), which is suitable for compressing still pictures.

An entropy encoder 153 executes lossless encoding on block processing information Inf supplied from the image converter 110, thereby outputting a block-processing-information stream St-Inf. The scheme of entropy encoding may be any lossless encoding scheme.

The block processing information Inf represents a manner of block processing determined by the block distributor 113, i.e., whether processing is executed by a block processor that executes spatial decimation, a block processor that executes temporal decimation, or a block processor that executes spatial and temporal decimation. The block processing information Inf is output from the block distributor 113. The block processing information Inf is output on a block-by-block basis (each block is composed of 4×4 pixels in this embodiment) at intervals of n frames forming a unit of decimation and packing. The block processing information Inf is composed of several bits of data representing a manner of processing of each block.

The controller 154 controls the number of layers of data to be transmitted in accordance with the bandwidth of a transmission path or the status of occurrence of transmission error so that stable decoding can be achieved at a receiving end. For example, when it is known that the transmission path or reception bandwidth is narrow depending on applications, the controller 154 exercises control so that only the first-layer stream is transmitted, thereby decreasing the transmission bitrate. As another example, the controller 154 monitors errors on the transmission path, and exercises control so that the number of layers of data transmitted is reduced and the transmission bitrate is decreased when the error occurrence rate increases.

Construction and Operation of Image Expander

Figure 22:
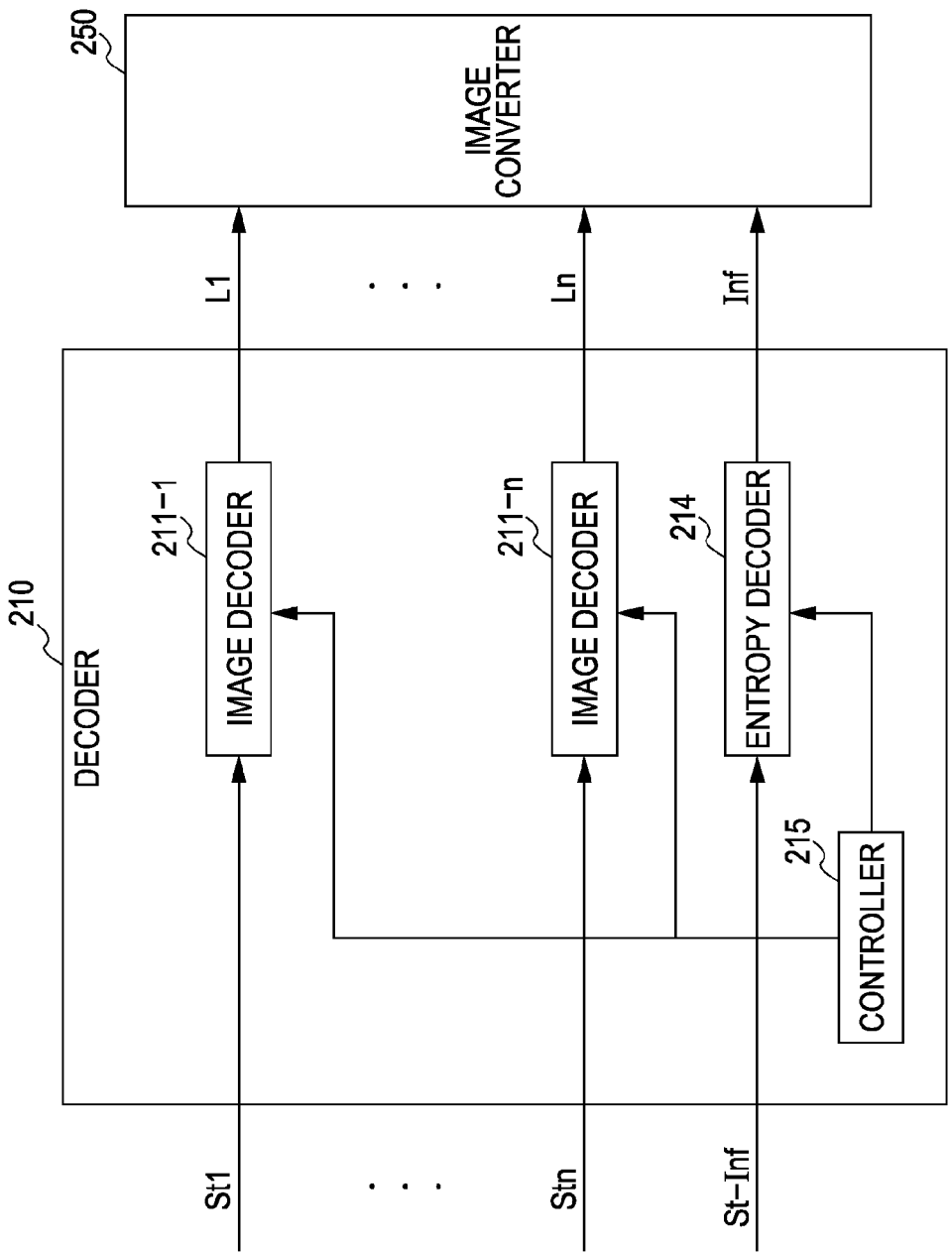
FIG. 22 is a diagram showing an example construction of a decoder in the image expander.

Next, the construction and operation of the image expander 200 will be described in detail. First, the construction and operation of the decoder 210 (see FIG. 1) of the image expander 200 will be described in detail with reference to FIG. 22.

The decoder 210 includes image decoders 211-1 to 211-n that decode individual layers of streams St1 to Stn composed of layer signals transmitted from the encoder 150 of the image compressor 100. The image decoders 211-1 to 211-n execute decoding under the control of a controller 215, and outputs layer signals L1 to Ln corresponding to individual layers of image signals to the image converter 250.

For example, the image decoder 211-1 decodes the first-layer stream St1 to output a first-layer signal L1. Similarly, the image decoder 211-n decodes the n-th layer stream Stn to output an n-th layer signal Ln. An entropy decoder executes lossless decoding of the block-processing-information stream to output block processing information Inf.

In the decoder 210, the controller 215 restricts streams received in accordance with the status of data reception by the decoder 210, the processing ability of the image expander 200, and so forth, thereby controlling the number of layers of data for which decoding and image conversion are executed. For example, when reception errors increase, the controller 215 assumes that reception quality is degraded. Then, the controller 215 requests a transmitting end to reduce the transmission bitrate so that the number of streams received is reduced. Also, the controller 215 exercises control so that the number of streams received is reduced when, for example, power consumption of the decoder 210 and the image converter 250 is to be reduced in accordance a request from an application.

Figure 23:
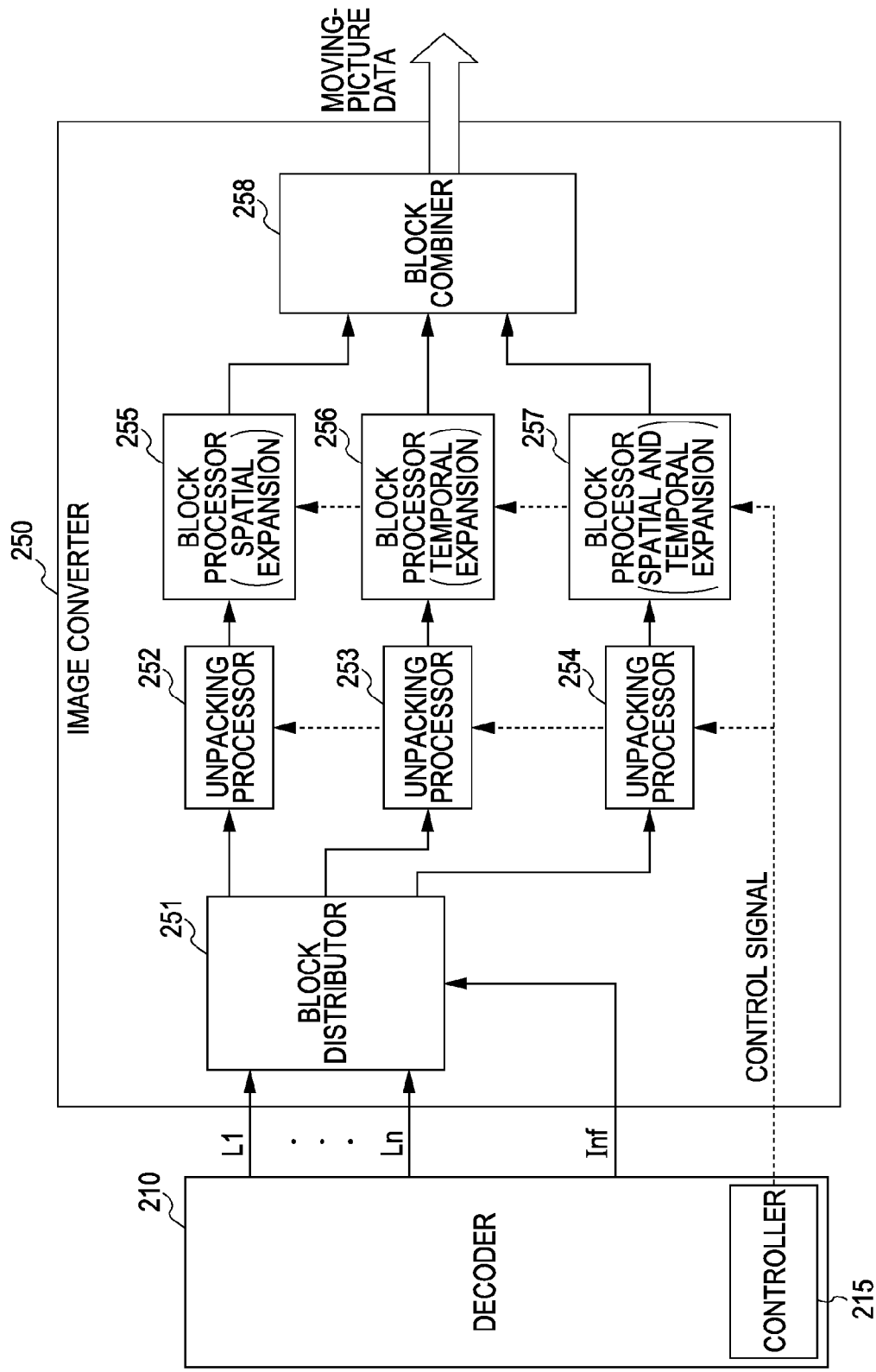
FIG. 23 is a diagram showing the construction of an image converter in the image expander.

Next, the construction and operation of the image converter 250 of the image expander 200 will be described with reference to FIG. 23 and subsequent figures. FIG. 23 is a block diagram of the image converter 250 of the image expander 200. As described earlier, the image converter 250 receives input of moving-picture layer signals L1 to Ln generated by the decoder 210 and block processing information Inf, inversely converts the layer signals L1 to Ln in accordance with sampling patterns of individual blocks defied by dividing moving-picture frames into units of a predetermined pixel area, and outputs reconstructed moving-picture data Dout.

A block distributor 251 selects manners of unpacking that are to be applied individually to the first-layer to n-th layer signals L1 to Ln input from the decoder 210 according to the block processing information Inf input from the decoder 210, and distributes the layer signals L1 to Ln one of unpacking processors 252 to 254 selected.

As described earlier, the block processing information Inf represents a manner of block processing determined by the block distributor 113 of the image compressor 100, i.e., whether processing is executed by a block processor that executes spatial decimation, a block processor that executes temporal decimation, and a block processor that spatial and temporal decimation. The block processing information Inf is composed of several bits of data representing a manner of processing of each block. The block distributor 251 distributes the layer signals L1 to Ln according to the block processing information Inf in the following manner.

(1) A layer signal in the form of a packed block generated through spatial decimation is distributed to the unpacking processor 252.

(2) A layer signal in the form of a packed block generated through temporal decimation is distributed to the unpacking processor 253.

(3) A layer signal in the form of a packed block generated through spatial and temporal decimation is distributed to the unpacking processor 254.

The unpacking processor 252 receives input of packed blocks generated through spatial decimation by the block processor 114 and packing by the packing processor 117 in the image converter 110, and unpacks the input packed blocks. That is, the unpacking processor 252 generates decimated signals corresponding to each frame from the layer signal in the form of a packed block packed into one frame on a layer-by-layer basis, and outputs the decimated signals to a block processor 255. This operation will be described later in detail.

The unpacking processor 253 receives input of packed blocks generated through temporal decimation by the block processor 115 and packing by the packing processor 118 in the image converter 110, and unpacks the input packed blocks. That is, the unpacking processor 253 outputs layer signals in the form of the input packed blocks to a block processor 256 without processing the layer signals. This operation will be described later in detail.

The unpacking processor 254 receives input of packed blocks generated through spatial and temporal decimation by the block processor 116 and packing by the packing processor 119 in the image converter 110, and unpacks the input packed blocks. That is, the unpacking processor 254 generates decimated signals corresponding to each frame from the layer signal in the form of a packed block packed into one frame on a layer-by-layer basis, and outputs the decimated signals to a block processor 257. This operation will be described later in detail.

The block processors 255 to 257 receive input of unpacked decimated signals corresponding to frames in the individual layers, and execute pixel expansion to reconstruct blocks associated with the individual frames.

The block processor 255 spatially expands the decimated pixel signals in each sampled frame obtained by spatial decimation, supplied from the unpacking processor 252, with respect to the direction of movement in each block, thereby reconstructing blocks associated with individual frames. More specifically, the pixel values at sampling points in individual frames are copied to pixel positions in a direction parallel to the direction of movement of each block.

As will be described later in detail, the expansion through copying of pixels by the block processor 255 is executed in different manners in accordance with the number of layers for which unpacking and block processing are executed. More specifically, copying is executed so that the number of pixels in a block after copying is n/Lm times the number of pixels before copying, where n denotes the number of layers of layer signals generated by the image compressor 100 and input to the image expander 200, and Lm denotes the number of layers for which unpacking and block processing are executed by the image expander 200. The amount of data is expanded by n/Lm through the copying. That is, as the number of layers Lm for which unpacking and block processing are executed by the image expander 200 increases, the ratio of expansion in each block decreases, so that error caused by the pixel expansion decreases. This operation will be described later in more detail.

The block processor 256 temporally expands decimated pixel signals in each sampled frame obtained by temporal decimation, supplied from the unpacking processor 253. More specifically, the block processor 256 copies all the pixels of the sampled frame to a temporally adjacent block. The expansion through copying of pixels by the block processor 256 is also executed in different manners in accordance with the number of layers for which unpacking and block processing are executed by the image expander 200.

More specifically, copying is executed so that the number of pixels in a block after copying is n/Lm times the number of pixels before copying, where n denotes the number of layers of layer signals generated by the image compressor 100 and input to the image expander 200, and Lm denotes the number of layers for which unpacking and block processing are executed by the image expander 200. The amount of data is expanded by n/Lm through the copying. That is, as the number of layers Lm for which unpacking and block processing are executed by the image expander 200 increases, the ratio of expansion in each block decreases, so that error caused by the pixel expansion decreases. This operation will be described later in more detail.

The block processor 257 executes temporal expansion and spatial expansion with respect to the direction of movement on decimated signals corresponding to two frames supplied from the unpacking processor 254. The expansion through copying of pixels by the block processor 257 is also executed in different manners in accordance with the number of layers for which unpacking and block processing are to be executed.

More specifically, when the number of layers Lm that are processed is less than or equal to n/2, the pixels in the two sampled frames are copied to temporally preceding and succeeding frames so that the number of frames is increased by n/2Lm, and the sampled pixels in the individual frames are copied to adjacent pixel positions so that the number of pixels is doubled with respect to the direction of movement, so that the amount of data is increased by n/Lm. On the other hand, when the number of layers Lm that are processed is greater than n/2, the sampled pixels in the individual frames are copied to adjacent pixel positions so that the number of pixels is increased by n/Lm with respect to the direction of movement, so that the amount of data is increased by n/Lm. This operation will be described later in detail.

A block combiner 258 selects, on a frame-by-frame basis, image signals of blocks corresponding to divided areas of individual frames, supplied from the block processors 255 to 257, on the basis of the block processing information Inf supplied from the decoder 210 via the block distributor 251 and the unpacking processors 252 to 254, and combines the blocks, thereby generating and outputting image signals Dout of individual frames.

In the decoder 210, the controller 215 controls processing executed by the unpacking processors 252 to 254 and the block processors 255 to 257 in accordance with the number of layers that are processed, the number of layers being determined in accordance with the bandwidth of a transmission path, the processing ability of the image expander 200, and so forth. That is, the controller 215 exercises control according to control signals shown in FIG. 23 so that block reconstruction is executed in accordance with the number of layers Lm that are processed, the number of layers Lm being set in the image expander 200.

Now, examples of processing executed by the unpacking processors 252 to 254 and the block processors 255 to 257 in a case where block image data associated with frames is generated on the basis of input of layer signals L1 to L4 in the formed of packed blocks generated by executing decimation and packing in units of four frames.

Block Reconstruction using Layer Signals (Packed Blocks) Obtained through Spatial Decimation First, processing executed by the unpacking processor 252 and the block processor 255 for reconstructing blocks from layer signals (packed blocks) obtained through spatial decimation will be described with reference to FIGS. 24 to 26.

Figure 24:
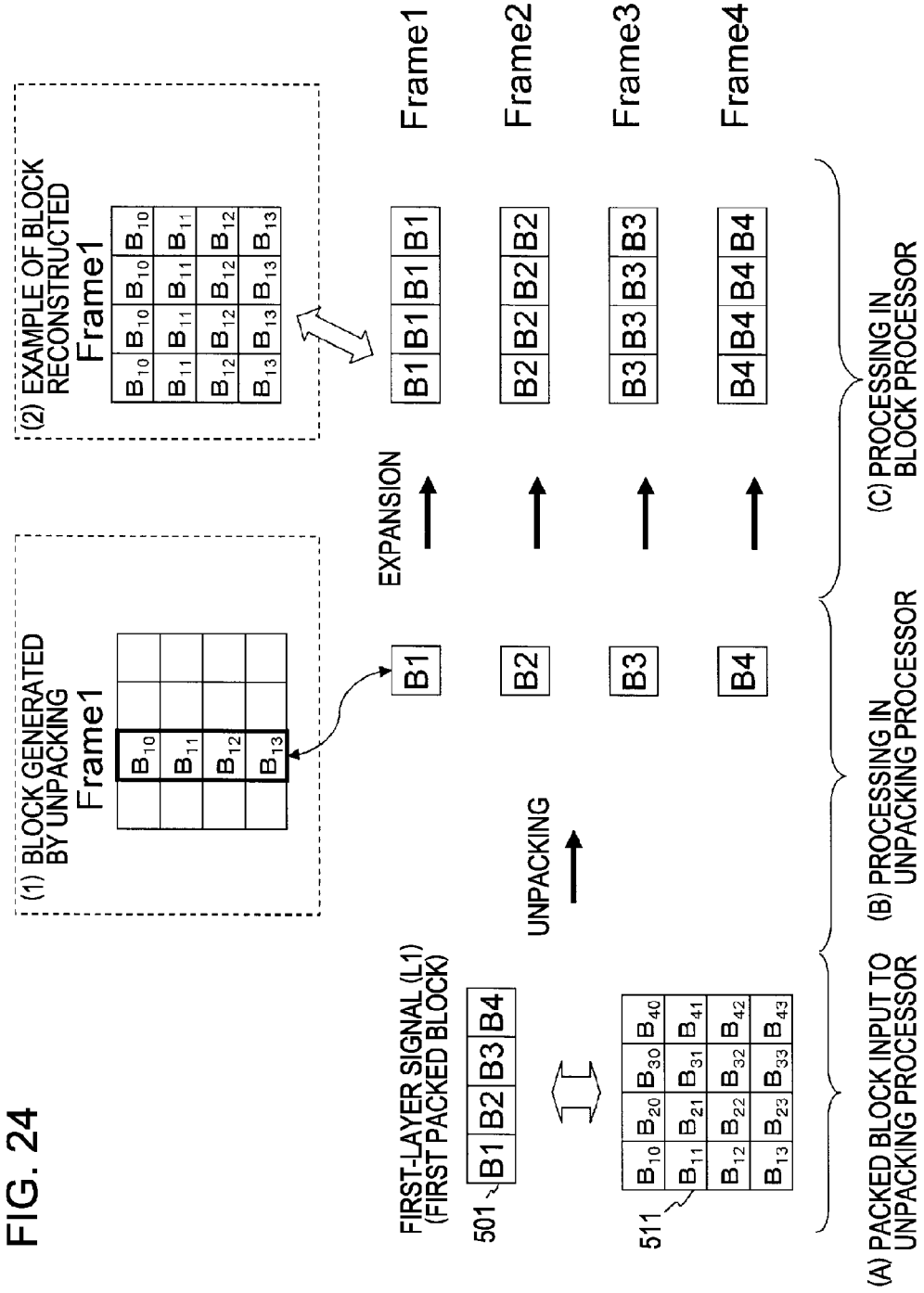
FIG. 24 is a diagram for explaining an example of processing executed by an unpacking processor and a block processor in the image converter in the image expander.
Figure 25:
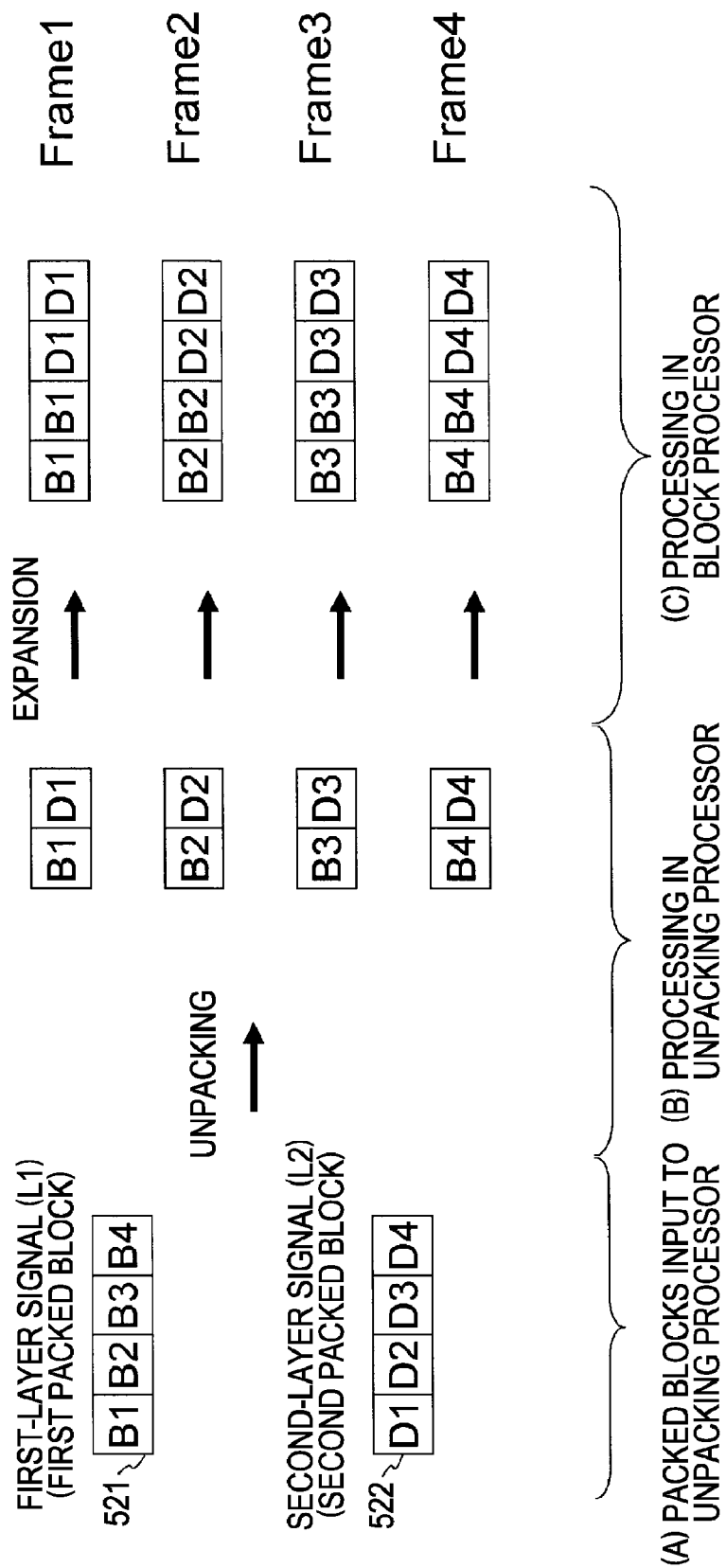
FIG. 25 is a diagram for explaining an example of processing executed by an unpacking processor and a block processor in the image converter in the image expander.
Figure 26:
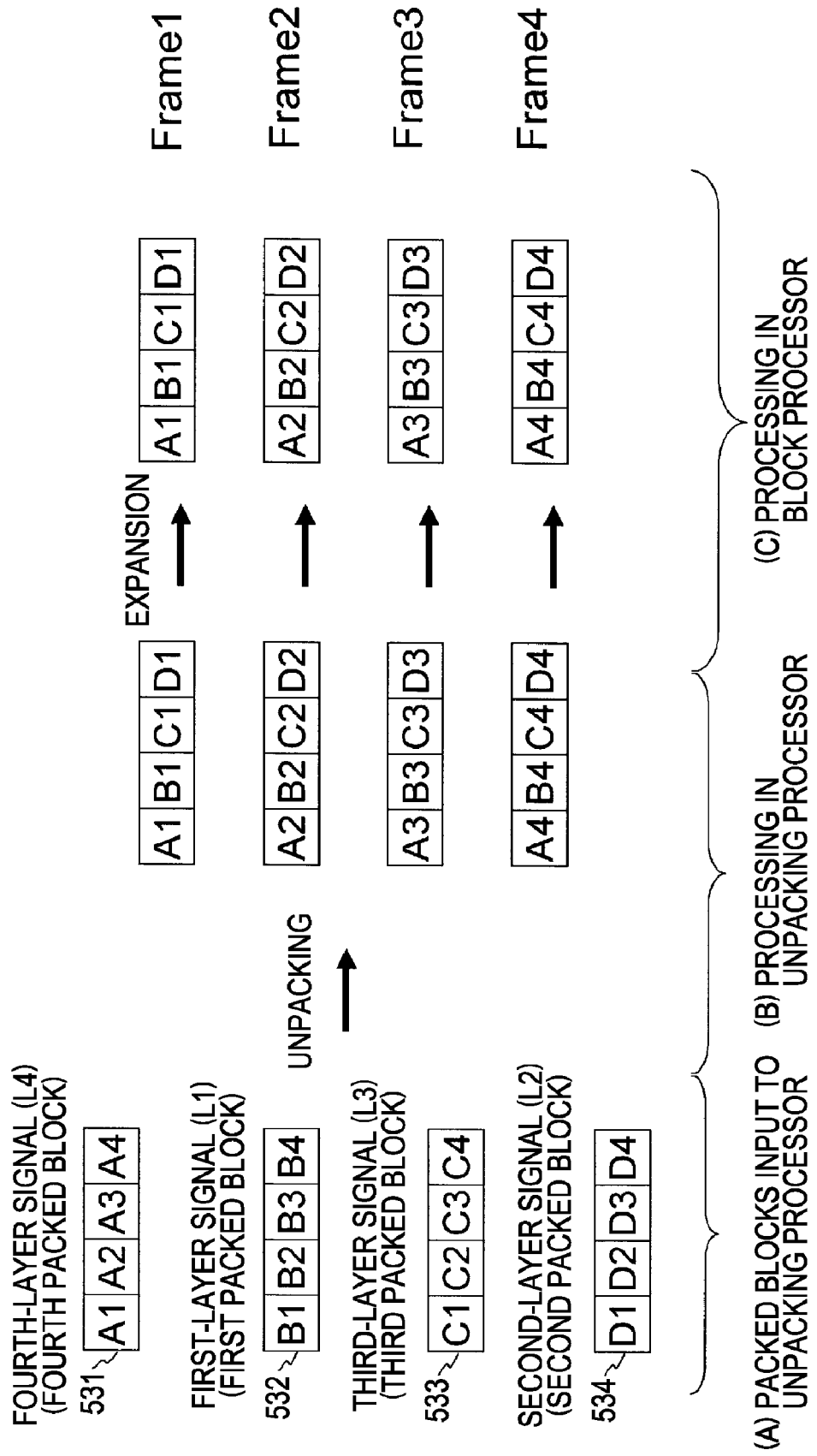
FIG. 26 is a diagram for explaining an example of processing executed by an unpacking processor and a block processor in the image converter in the image expander.

FIGS. 24 to 26 relate to an example of processing of packed blocks generated through ¼ horizontal decimation. When a block to be processed has an amount of movement with respect to the vertical direction, the processing is executed with respect to the vertical direction instead of the horizontal direction.

FIG. 24 shows an example of processing for reconstructing blocks using layer signals (packed blocks) generated through spatial decimation. In this example, only the first-layer signal L1 is processed. The processing involves unpacking by the unpacking processor 252 and block reconstruction by the block processor 256 shown in FIG. 23. FIG. 24 shows (A) packed block (layer signal) input to unpacking processor, (B) processing in unpacking processor, and (C) processing in block processor.

Referring to part (A), the packed block (layer signal) input to the unpacking processor 252 includes only the first-layer signal L1 in this example of processing. The input packed block is a packed block 501 composed of pixel data B1, B2, B3, and B4 as shown in FIG. 24, i.e., the first-layer signal L1 corresponding to the packed block 301 described earlier with reference to FIG. 8. For example, the packed block 501 is generated by collecting pixel data of the second pixels from the left in blocks composed of 4×4 pixels in four frames, and is composed of pixel data of a packed block 511 shown in FIG. 24.

Referring to part (B), in the processing executed by the unpacking processor 252, the packed block 501 is unpacked into pixel data of individual frames 1 to 4 to generate four blocks composed of decimated data of the individual frames. In this case, blocks composed of sampled pixels that are defined as sapling points in the spatial decimation described earlier with reference to FIG. 8 and that can be obtained from the packed block 501 is reconstructed.

For example, as shown in (1) block generated by unpacking in FIG. 24, a block of the frame 1 is generated by setting sampled pixels associated with the frame 1 and available from the packed block 501, i.e., only the sampled pixels B1 (B10 to B13) that are second from the left. Similarly, for the other frames 2 to 4, blocks composed of only the sampled pixels B2, B3, and B4 that are second from the left are generated.

Referring to part (C), in the processing executed by the block processor 255, using the block generated by the unpacking processor 252, the pixel values of the sampled pixels in the block are copied to positions where pixel values are not defined, thereby generating blocks of individual frames. For example, regarding the block of the frame 1, a block is generated by unpacking as shown in (1) block generated by unpacking in FIG. 24, and the pixel values set in the block, i.e., the pixel values of the sampled pixels on the second column from the left, are copied to areas where pixel values are not defined, i.e., to the first, third, and fourth columns of the block from the left. Through the processing described above, a block is reconstructed as shown in (2) example of block reconstructed in FIG. 24. The blocks of the frames 2 to 4 are also reconstructed in similar manners.

In the example of processing shown in FIG. 24, only the first-layer signal L1 is used for reconstruction, and the other layer signals L2 and higher-layer signals are not used for reconstruction. The processing is controlled by the controller 215 of the decoder 210. The controller 215 determines the number of layers to be processed in accordance with the bandwidth of a transmission path, the processing ability of the image expander 200, and so forth, and controls processing in the unpacking processors 252 to 254 and the block processors 255 to 257 according to the number of layers to be processed.

In this example, the number of layers to be processed in the image expander 200 is Lm=1, and the number of layers generated by processing in the image compressor 100 is n=4. The block processor 255 executes copying so that the number of pixels in a block after copying is n/Lm=4 times as large as the number of pixels before copying, so that moving-picture data Dout having the same number of pixels in each frame as the original signal is output.

FIG. 25 shows an example of processing for reconstruction using layer signals (packed blocks) based on spatial decimation, in which a first-layer signal L1 and a second-layer signal L2 are used for reconstruction. The processing involves unpacking and block reconstruction by the unpacking processor 252 and the block processor 255 shown in FIG. 23.

In this example of processing, referring to part (A), the packed blocks (layer signals) input to the unpacking processor 252 include a packed block 521 (a first-layer signal L1) composed of pieces of pixel data B1, B2, B3, and B4, and a packed block 522 (a second-layer signal L2) composed of pieces of pixel data D1, D2, D3, and D4. The first-layer signal L1 and the second-layer signal L2 correspond to the packed blocks 301 and 302 described earlier with reference to FIGS. 8 and 9. For example, the packed block 521 is generated by packing pixel data of the second pixels from the left in blocks (each composed of 4×4 pixels) of four frames, and the packed block 522 is generated by packing pixel data of the fourth pixels from the left in blocks (each composed of 4×4 pixels) of four frames.

Referring to part (B), in the processing executed by the unpacking processor 252, the packed blocks 521 and 522 are unpacked into pixel data of the individual frames 1 to 4 to generate four blocks composed of pieces of pixel data for individual frames. In this case, blocks of individual frames composed of the pixels used as sampling points in the spatial decimation described earlier with reference to FIG. 8 and available from the packed block 521 and the pixels used as sampling points in the spatial decimation described with reference to FIG. 9 and available from the packed block 522 are reconstructed.

For example, regarding the block of the frame 1, a block is generated by setting only the sampled pixels associated with the frame 1 and available from the packed block 521, i.e., the sampled pixels B1 (B10 to B13) that are second from the left, and the sampled pixels associated with the frame 1 and available from the packed block 522, i.e., the sampled pixels D1 (D10 to D13) that are fourth from the left. Similarly, for the other frames 2 to 4, blocks composed of only the sampled pixels B2, D2, B3, D3, B4, and D4 that are second and fourth from the left and included in the packed blocks 521 and 522 are generated.

Referring to part (C), in the processing executed by the block processor 255, using the blocks generated by the unpacking processor 252, the pixel values of the sampled pixels in the block are copied to positions where pixel values are not defined, thereby generating blocks of individual frames. For example, regarding the block of the frame 1, a block having the second and fourth pixels B1 and D1 from the left is generated by unpacking, and the pixel values of the sampled pixels B1 and D1 in the block are copied to areas where pixel values are not defined, i.e., to the first and third columns in the block from the left. Through the processing described above, a block is reconstructed. Blocks of the other frames 2 to 4 are also reconstructed in similar manners.

In this example, the number of layers to be processed in the image expander 200 is Lm=2, and the number of layers generated by processing in the image compressor 100 is n=4. The block processor 255 executes copying so that the number of pixels in a block after copying is n/Lm=2 times as large as the number of pixels before copying, so that moving-picture data Dout having the same number of pixels in each frame as the original signal is output.

FIG. 26 shows an example of processing for reconstruction using layer signals (packed blocks) based on spatial decimation, in which a first-layer signal L1 to a fourth-layer signal L4 are used for reconstruction. The processing involves unpacking and block reconstruction by the unpacking processor 252 and the block processor 255 shown in FIG. 23.

In this example of processing, referring to part (A), the packed blocks (layer signals) input to the unpacking processor 252 include a packed block 531 (a fourth-layer signal L4) composed of pieces of pixel data A1, A2, A3, and A4, a packed block 532 (a first-layer signal L1) composed of pieces of pixel data B1, B2, B3, and B4, a packed block 533 (a third-layer signal L3) composed of pieces of pixel data C1, C2, C3, and C4, and a packed block 534 (a second-layer signal L2) composed of pieces of pixel data D1, D2, D3, and D4. The first-layer signal L1 to the fourth-layer signal L4 correspond to the packed blocks 301 to 304 described earlier with reference to FIGS. 8 to 11.

Referring to part (B), in the processing executed by the unpacking processor 252, the packed blocks 531 to 5342 are unpacked into pixel data of the individual frames 1 to 4 to generate four blocks composed of pieces of pixel data for individual frames. In this case, the same number of pixels as the number of pixels in the blocks of the original image is set as sampled pixels in the four layer signals (packed blocks 531 to 534), so that the same blocks as the blocks of the original image can be reconstructed by reconstructing the blocks of the individual frames composed of the sampled pixels.

Referring to part (C), in this case, the block processor 255 need not copy pixel values, and the blocks generated by the unpacking processor 252 are directly output as reconstructed blocks of the individual frames.

In this example, the number of layers to be processed in the image expander 200 is Lm=4, and the number of layers generated by processing in the image compressor 100 is n=4. The block processor 255 executes copying so that the number of pixels in a block after copying is n/Lm=1 times as large as the number of pixels before copying, i.e., the block processor 255 does not execute copying, and moving-picture data Dout having the same number of pixels in each frame as the original signal is output.

Block Reconstruction using Layer Signals (Packed Blocks) Obtained through Temporal Decimation Now, processing executed by the unpacking processor 253 and the block processor 256 for reconstructing blocks using layer signals (packed blocks) obtained through temporal decimation will be described with reference to FIGS. 27 to 29.

Figure 27:
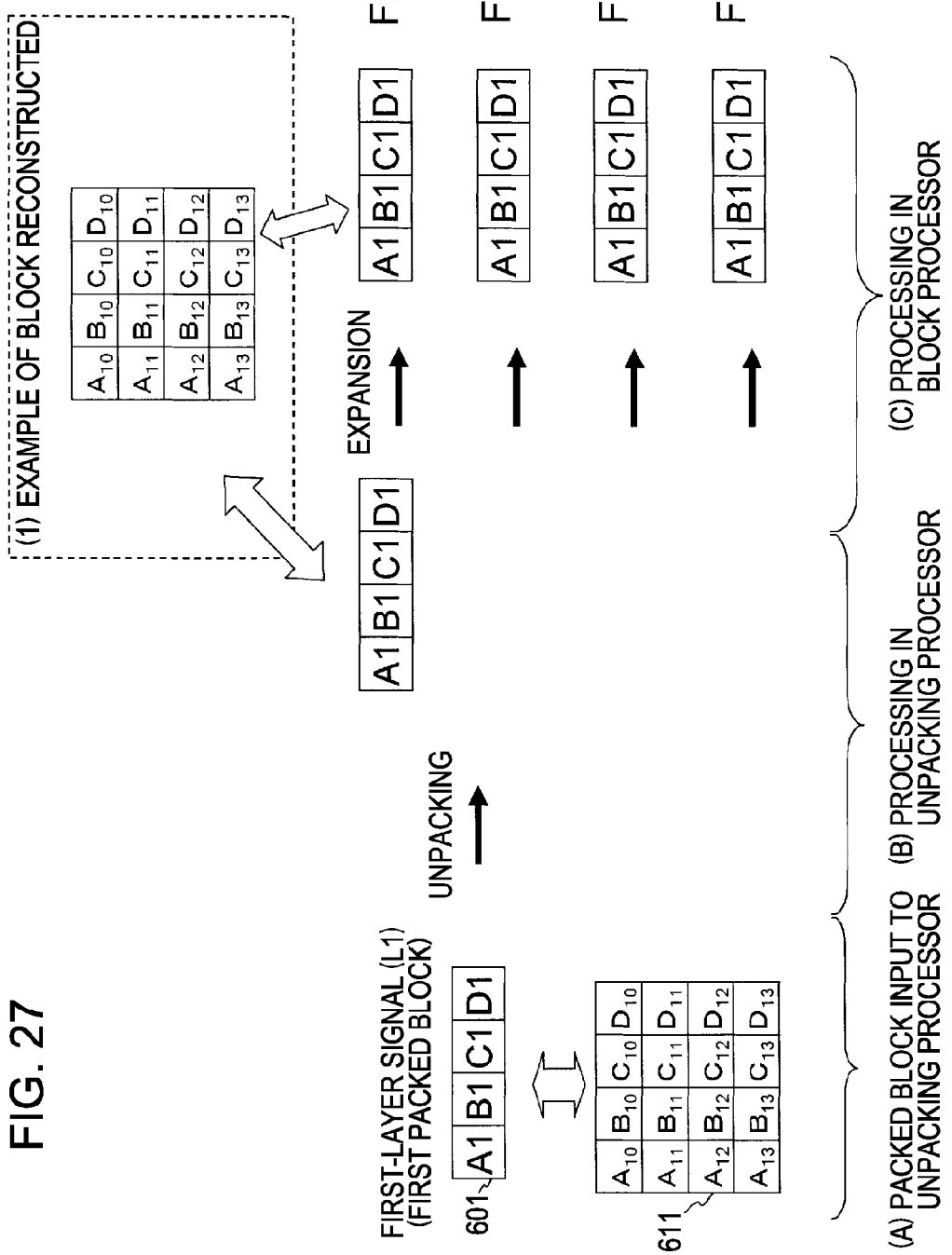
FIG. 27 is a diagram for explaining an example of processing executed by an unpacking processor and a block processor in the image converter in the image expander.
Figure 28:
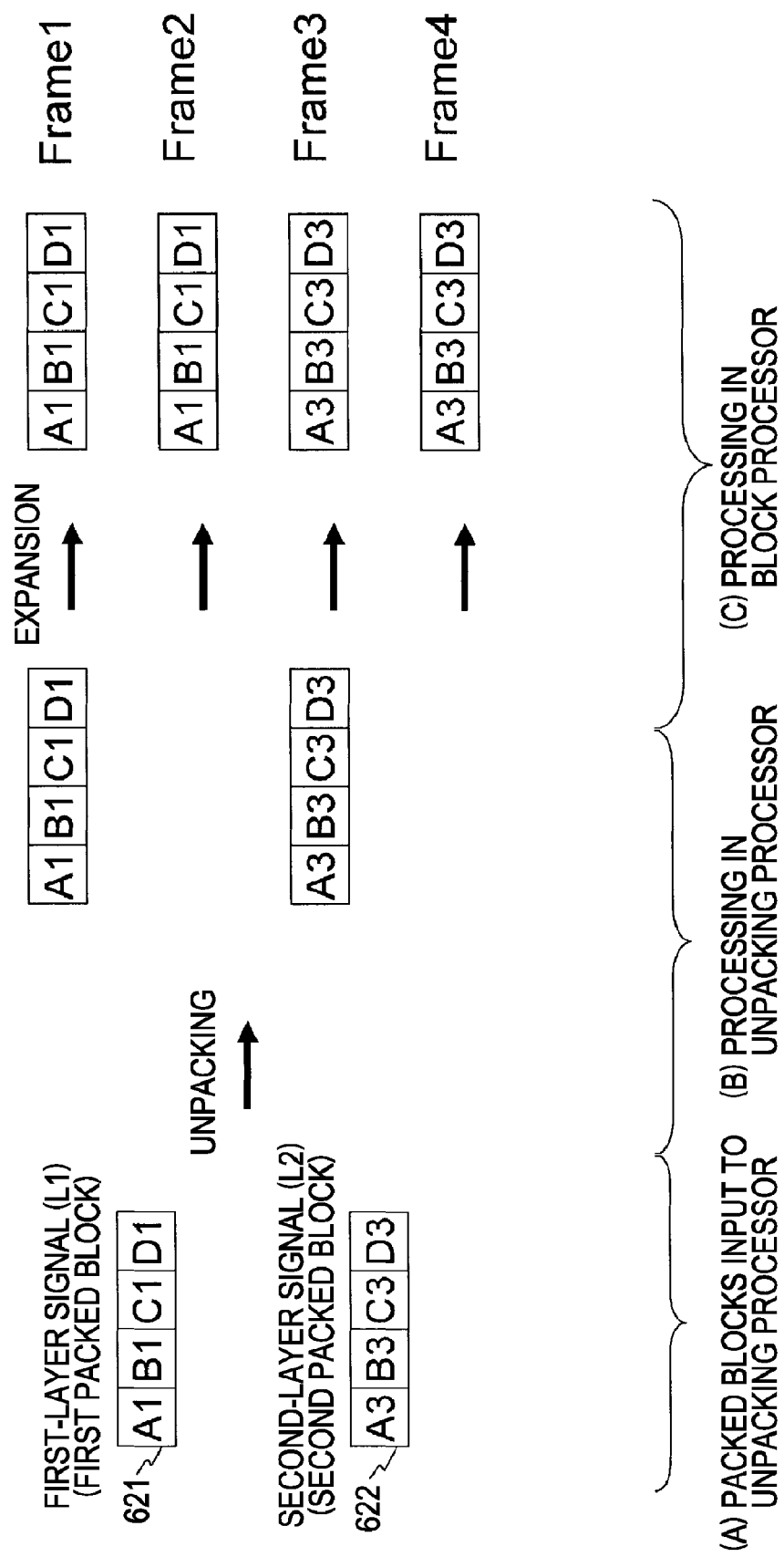
FIG. 28 is a diagram for explaining an example of processing executed by an unpacking processor and a block processor in the image converter in the image expander.
Figure 29:
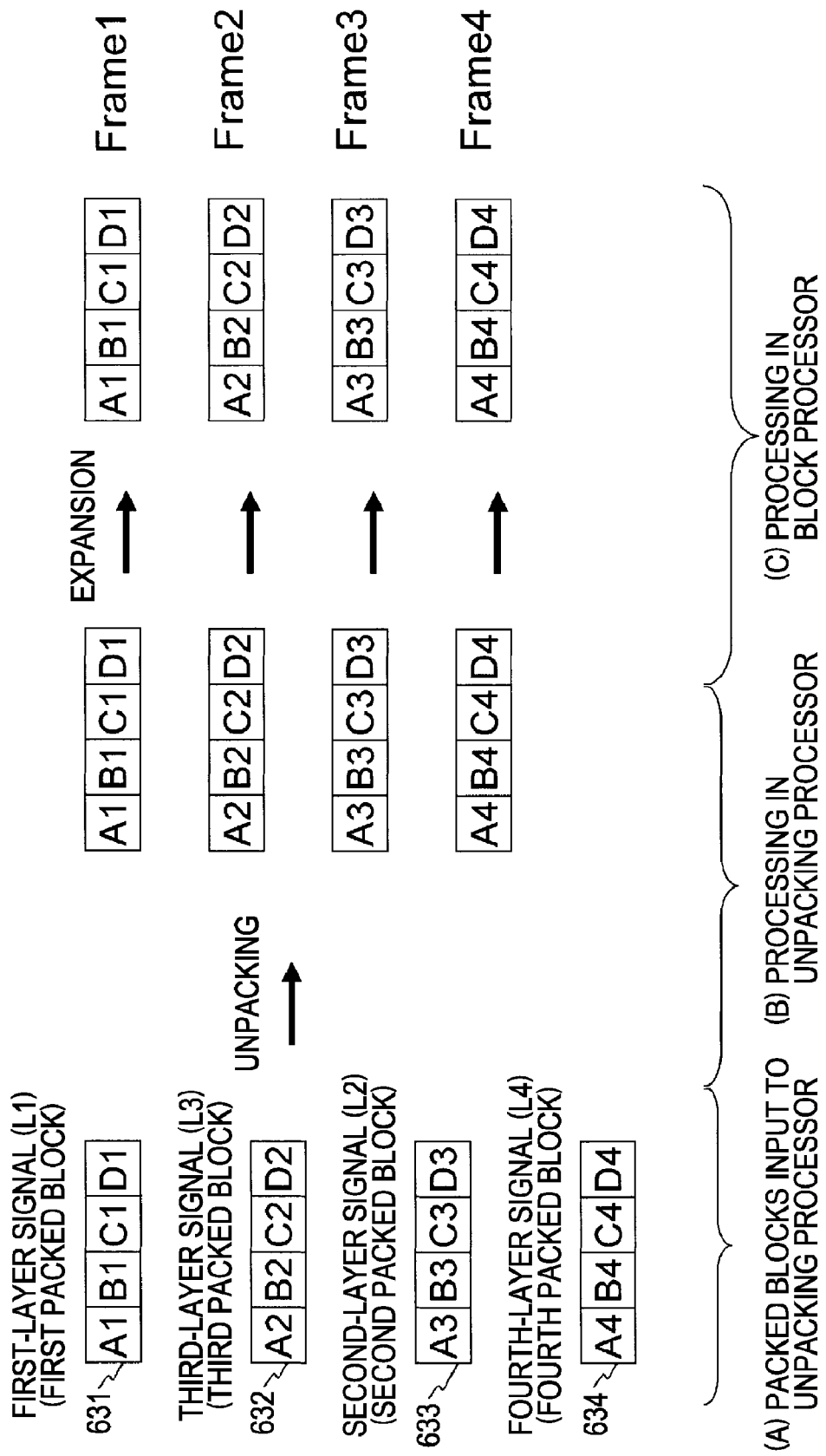
FIG. 29 is a diagram for explaining an example of processing executed by an unpacking processor and a block processor in the image converter in the image expander.

FIGS. 27 to 29 relate to an example of processing executed on packed blocks generated through ¼ temporal decimation.

FIG. 27 shows an example of processing for reconstructing blocks using a layer signal (packed block) obtained through temporal decimation, in which only a first-layer signal L1 is used for reconstruction. The processing involves unpacking and block reconstruction by the unpacking processor 253 and the block processor 256 shown in FIG. 27. FIG. 27 shows (A) packed block (layer signal) input to unpacking processor, (B) processing in unpacking processor, and (C) processing in block processor.

Referring to part (A), in this example of processing, the packed block (layer signal) input to the unpacking processor 253 is only a first-layer signal L1, i.e., a packed block 601 composed of pieces of pixel data A1, B1, C1, and D1. The first-layer signal L1 corresponds to the packed block 331 described earlier with reference to FIG. 12. For example, the packed block 601 is obtained by sampling pixel data of the block (composed of 4×4 pixels) of the frame 1 among four frames, as in (1) example of block to be processed.

Referring to part (B), in the processing executed by the unpacking processor 253, the input packed block 601 is unpacked into pixel data for the individual frames 1 to 4, thereby generating four blocks composed of pieces of decimated data for the individual frames. In this case, the input packed block 601 is itself the block of the frame 1, and does not include pixel data for the other frames 2 to 4. Thus, unpacking for distributing pixels to individual frames is not needed, and the input packed block 601 is output to the block processor 256 without particular processing.

Referring to part (C), in the processing executed by the block processor 256, using the block input from the unpacking processor 253, the pixel values of the sampled pixels in the block are copied to positions where pixel values are not defined, thereby generating blocks of the individual frames. In this case, the pixel values of the block of the frame 1, input from the block processor 253, are copied as pixel data for the frames 2 to 4, thereby reconstructing blocks of the individual frames.

In the example of processing shown in FIG. 27, only the first-layer signal L1 is used for reconstruction, and the layer signal L2 and higher-layer signals are not used for reconstruction. The processing is controlled by the controller 215 of the decoder 210. The controller 215 determines the number of layers to be processed in accordance with the bandwidth of a transmission path, the processing ability of the image expander 200, and so forth, and controls processing in the unpacking processors 252 to 254 and the block processors 255 to 257 according to the number of layers to be processed.

In this example, the number of layers to be processed in the image expander 200 is Lm=1, and the number of layers generated by processing in the image compressor 100 is n=4. The block processor 256 executes copying so that the number of pixels in a block after copying is n/Lm=4 times as large as the number of pixels before copying, so that moving-picture data Dout having the same number of pixels in each frame as the original signal is output.

FIG. 28 shows an example of processing for reconstructing blocks using layer signals (packed blocks) obtained through temporal decimation, in which a first-layer signal L1 and a second-layer signal L2 are used for reconstruction. The processing involves unpacking and block reconstruction by the unpacking processor 253 and the block processor 256 shown in FIG. 23.

Referring to part (A), in this example of processing, the packed blocks (layer signals) input to the unpacking processor 253 include a packed block 621 (first-layer signal L1) composed of pieces of pixel data A1, B1, C1, and D1, and a packed block 622 (second-layer signal L2) composed of pieces of pixel data A3, B3, C3, and D3. The first-layer signal L1 and the second-layer signal L2 correspond to the packed blocks 321 and 322 described earlier with reference to FIGS. 12 and 13.

Referring to part (B), in the processing executed by the unpacking processor 253, the packed blocks 621 and 622 are unpacked into pixel data for the individual frames 1 to 4, thereby generating four blocks composed of pieces of decimated data for the individual frames. In this case, the input packed block 621 is itself the block of the frame 1, and the input packed block 622 is itself the block of the frame 3, and pixel data for the other frames 2 and 4 are not included. Thus, unpacking for distributing pixels to individual frames is not needed, and the input packed blocks 621 and 622 are output to the block processor 256 without particular processing.

Referring to part (C), in the processing executed by the block processor 256, using the blocks input from the unpacking processor 253, the pixel values of the sampled pixels in the blocks are copied to positions where pixel values are not defined, thereby generating blocks of the individual frames. In this case, the pixel values of the block of the frame 1, input from the block processor 253, are copied as pixel data for the frame 2, and the pixel values of the block of the frame 3, input from the unpacking processor 252, are copied as pixel data for the frame 4, thereby reconstructing blocks of the individual frames.

In this example, the number of layers to be processed in the image expander 200 is Lm=2, and the number of layers generated by processing in the image compressor 100 is n=4. The block processor 256 executes copying so that the number of pixels in a block after copying is n/Lm=2 times as large as the number of pixels before copying, so that moving-picture data Dout having the same number of pixels in each frame as the original signal is output.

FIG. 29 shows an example of processing for reconstructing blocks using layer signals (packed blocks) obtained through temporal decimation, in which a first-layer signal L1 to a fourth-layer signal L4 are used for reconstruction. The processing involves unpacking and block reconstruction by the unpacking processor 253 and the block processor 256 shown in FIG. 23.

Referring to part (A), in this example of processing, the packed blocks (layer signals) input to the unpacking processor 253 include a packed block 631 (first-layer signal L1) composed of pieces of pixel data A1, B1, C1, and D1, a packed block 632 (third-layer signal L3) composed of pieces of pixel data A2, B2, C2, and D2, a packed block 633 (second-layer signal L2) composed of pieces of pixel data A3, B3, C3, and D3, and a packed block 634 (fourth-layer signal L4) composed of pieces of pixel data A4, B4, C4, and D4. The first-layer signal L1 to the fourth-layer signal L4 correspond to the packed blocks 321 to 324 described earlier with reference to FIGS. 12 to 15.

Referring to part (B), in the processing executed by the unpacking processor 253, the packed blocks 631 to 634 are unpacked into pixel data for the individual frames 1 to 4, thereby generating four blocks composed of pieces of decimated data for the individual frames. In this case, the input packed blocks 631 to 634 are themselves the blocks of the individual frames 1 to 4. Thus, unpacking for distributing pixels to individual frames is not needed, and the input packed blocks 631 to 634 are output to the block processor 256 without particular processing.

Referring to part (C), in the processing executed by the block processor 256, using the blocks input from the unpacking processor 253, the pixel values of the sampled pixels in the blocks are copied to positions where pixel values are not defined, thereby generating blocks of the individual frames. In this case, the blocks of the frames 1 to 4, input from the block processor 253, do not include pixels where pixel values are not defined. Thus, the blocks are output as reconstructed blocks of the frames without copying pixel values.

In this example, the number of layers to be processed in the image expander 200 is Lm=4, and the number of layers generated by processing in the image compressor 100 is n=4. The block processor 256 executes copying so that the number of pixels in a block after copying is n/Lm=1 times as large as the number of pixels before copying, i.e., the block processor 256 does not execute copying, and moving-picture data Dout having the same number of pixels in each frame as the original signal is output.

Block Reconstruction using Layer Signals (Packed Blocks) Obtained through Spatial and Temporal Decimation Now, processing executed by the unpacking processor 254 and the block processor 257 for reconstructing blocks using layer signals (packed blocks) obtained through spatial and temporal decimation will be described with reference to FIGS. 30 to 32.

Figure 30:
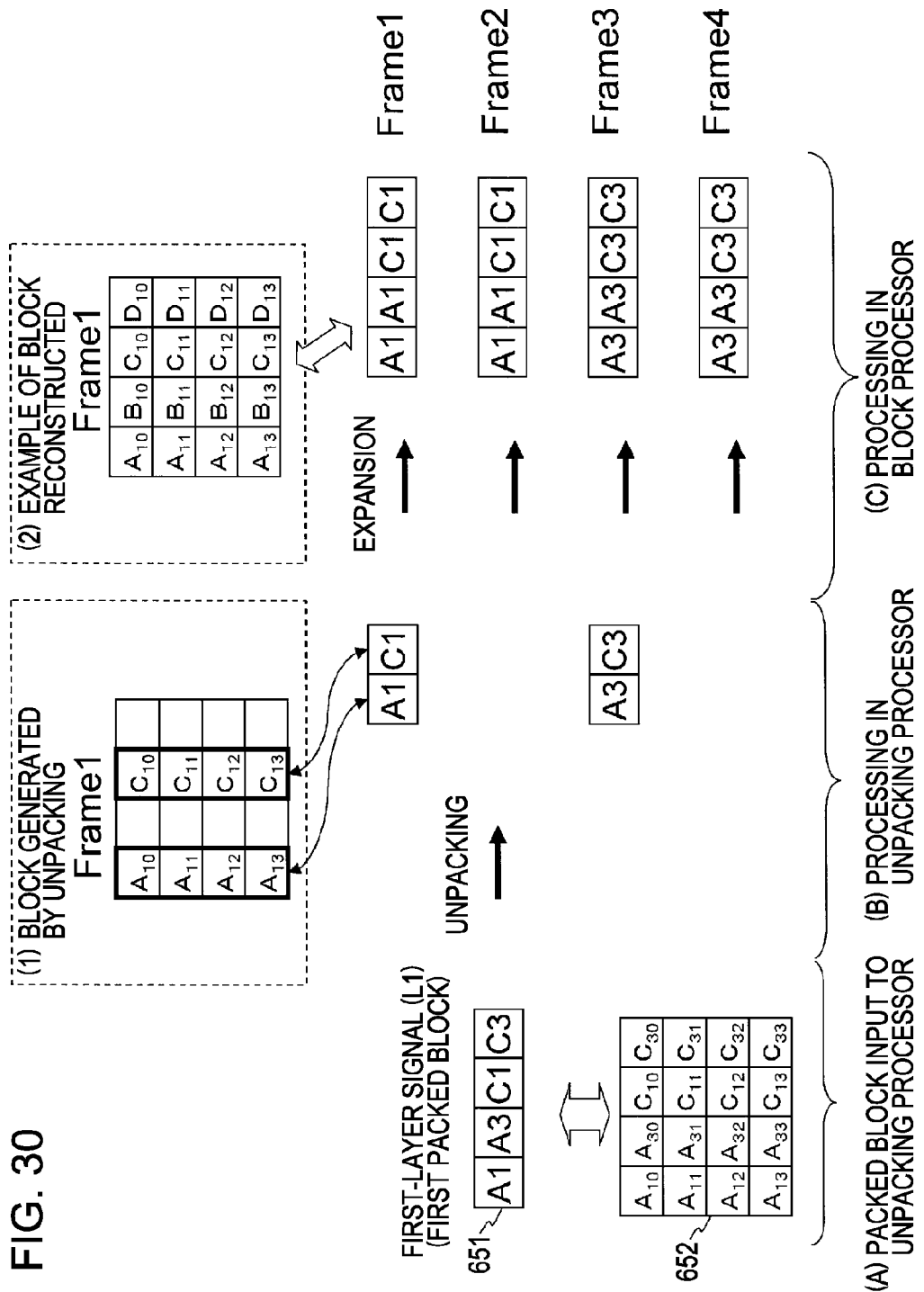
FIG. 30 is a diagram for explaining an example of processing executed by an unpacking processor and a block processor in the image converter in the image expander.
Figure 31:
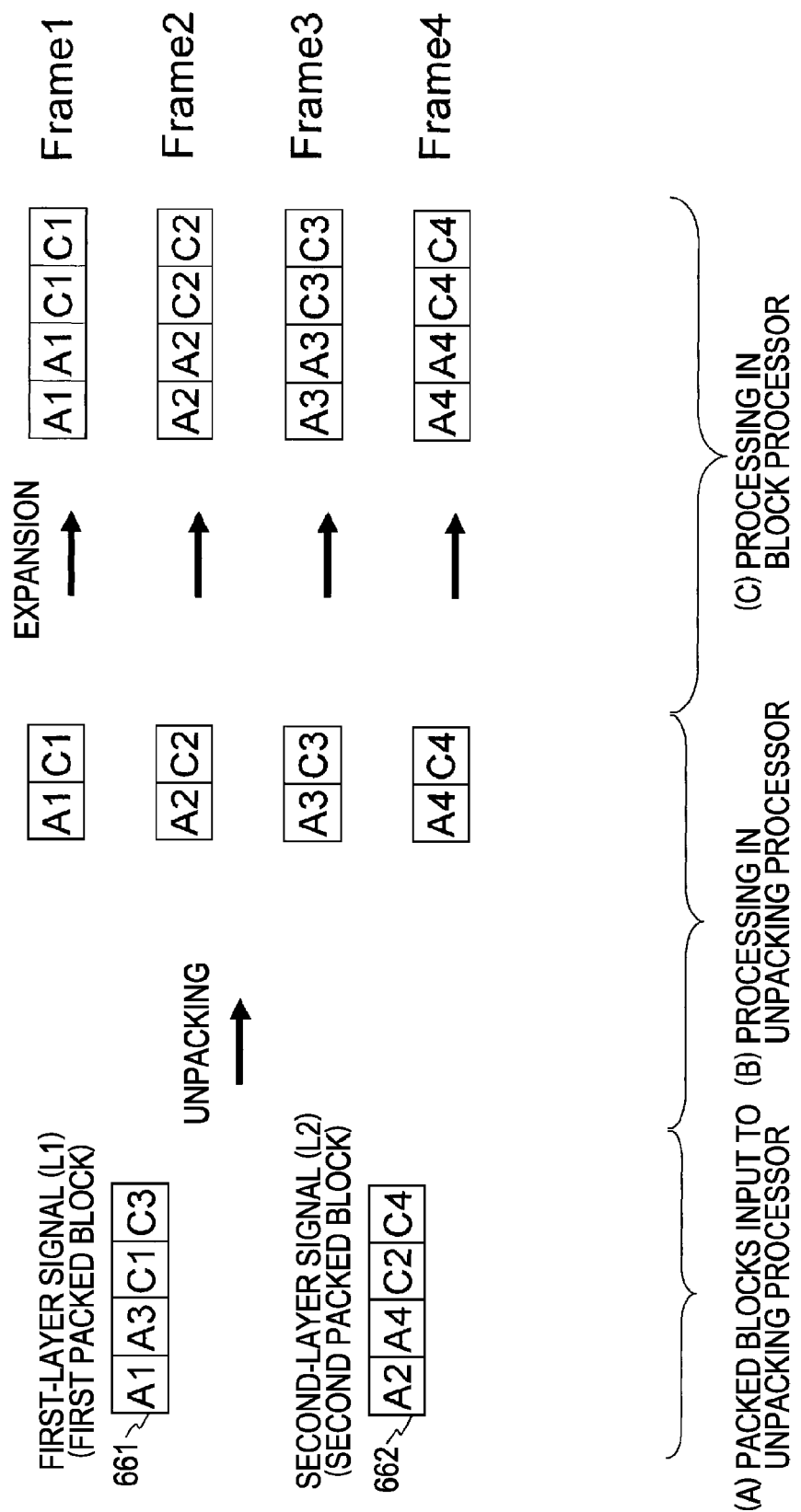
FIG. 31 is a diagram for explaining an example of processing executed by an unpacking processor and a block processor in the image converter in the image expander.
Figure 32:
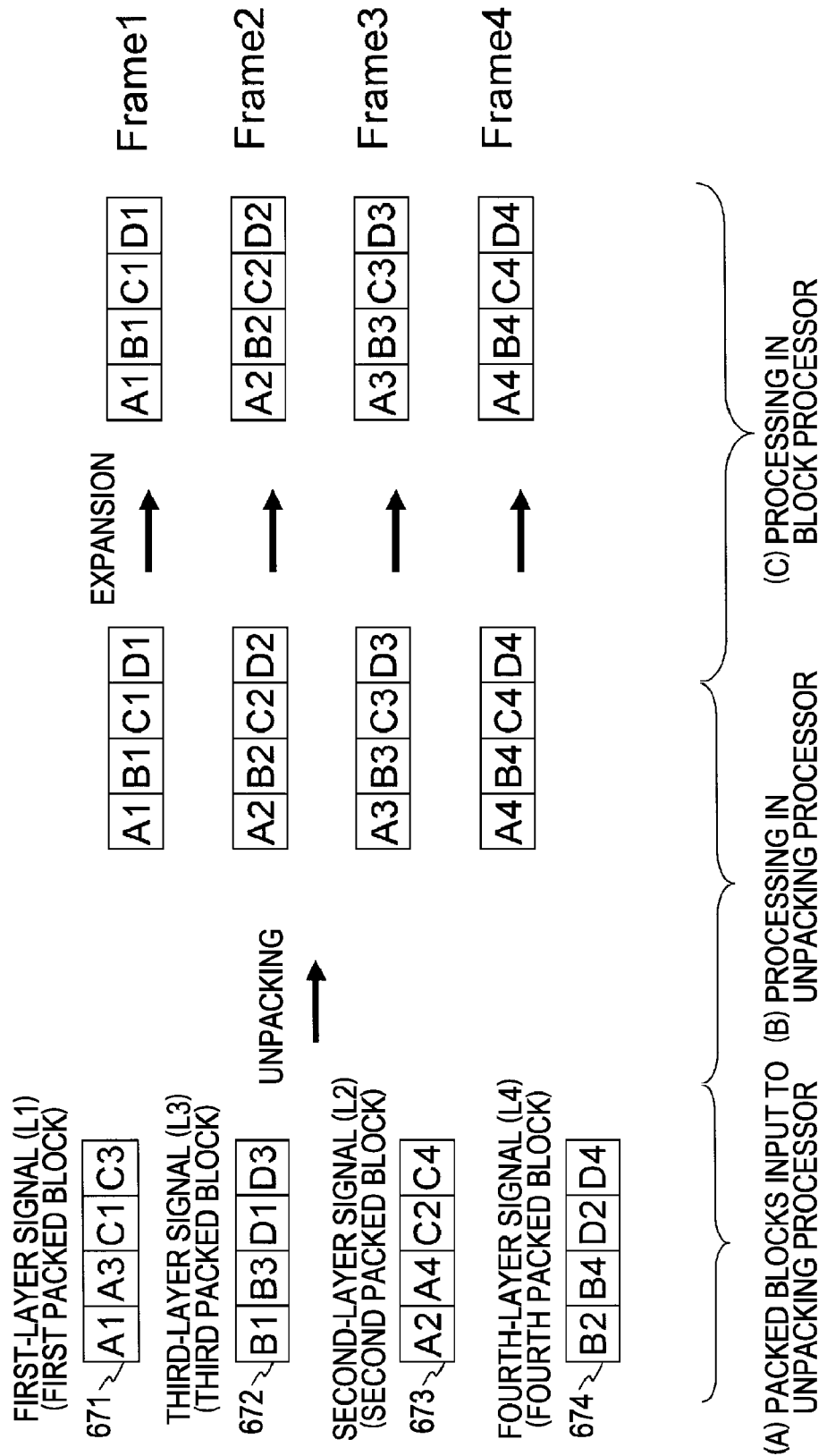
FIG. 32 is a diagram for explaining an example of processing executed by an unpacking processor and a block processor in the image converter in the image expander.

FIGS. 30 to 32 relates to an example of processing executed on packed blocks having amounts of movement with respect to the horizontal direction and obtained through ½ spatial decimation and ½ temporal decimation. When blocks to be processed have amounts of movement with respect to the vertical direction, the processing is executed with respect to the vertical direction.

FIG. 30 shows an example of processing for reconstructing blocks using a layer signal (packed block) obtained through spatial and temporal decimation, in which only a first-layer signal L1 is used for reconstruction. The processing involves unpacking and block reconstruction by the unpacking processor 254 and the block processor 257 shown in FIG. 30. FIG. 30 shows (A) packed block (layer signal) input to unpacking processor, (B) processing in unpacking processor, and (C) processing in block processor.

Referring to part (A), in this example of processing, the packed block (layer signal) input to the unpacking processor 254 is only a first-layer signal L1, i.e., a packed block 651 composed of pieces of pixel data A1, A3, C1, and C3. The first-layer signal L1 corresponds to the packed block 341 described earlier with reference to FIG. 16. For example, the packed block 651 is generated by sampling pixel data of the first and third pixels from the left in frames 1 and 3 among blocks (each composed of 4×4 pixels) of four frames. For example, when the packed block 651 is composed of 4×4 pixels, the packed block 651 is composed of pixel data shown as a packed block 652.

Referring to part (B), in the processing executed by the unpacking processor 254, the input packed block 651 is unpacked into pixel data of the individual frames 1 to 4, thereby generating four blocks composed of decimated pixel data of the individual frames. In this case, the input packed block 651 is composed only of pixel data of the frames 1 and 3. For example, an unpacked block associated with the frame 1 is composed only of pixel data of the first and third pixels from the left, as indicated in (1) block generated by unpacking in FIG. 30. Similarly, an unpacked block is also generated for the frame 3.

Referring to part (C), in the processing executed by the block processor 257, using the blocks input from the unpacking processor 254, the pixel values of the sampled pixels in the block are copied to positions where pixel values are not defined, thereby generating blocks of the individual frames. In this case, first, the pixels A1 and C1 of the block of the frame 1, input from the unpacking processor 253, are copied to the second and fourth columns of the frame 1 from the left, and the pixels A3 and C3 of the block of the frame 3, input from the unpacking processor 253, are copied to the second and fourth columns of the frame 3 from the left. Then, the block of the frame 2 is generated by copying all the pixels of the block of the frame 1, and the block of the frame 4 is generated by copying all the pixels of the block of the frame 3. Through the processing described above, the blocks of the individual frames are reconstructed.

In the example of processing shown in FIG. 30, only the first-layer signal L1 is used for reconstruction, and the second layer signal L2 and higher-layer signals are not used for reconstruction. The processing is controlled by the controller 215 of the decoder 210. The controller 215 determines the number of layers to be processed in accordance with the bandwidth of a transmission path, the processing ability of the image expander 200, and so forth, and controls processing in the unpacking processors 252 to 254 and the block processors 255 to 257 according to the number of layers to be processed.

In this example, the number of layers to be processed in the image expander 200 is Lm=1, and the number of layers generated by processing in the image compressor 100 is n=4. The block processor 257 executes copying so that the number of pixels in a block after copying is n/Lm=4 times as large as the number of pixels before copying, so that moving-picture data Dout having the same number of pixels in each frame as the original signal is output.

FIG. 31 shows an example of processing for reconstructing blocks using layer signals (packed blocks) obtained through spatial and temporal decimation, in which a first-layer signal L1 and a second-layer signal L2 are used for reconstruction. The processing involves unpacking and block reconstruction by the unpacking processor 254 and the block processor 257 shown in FIG. 23.

Referring to part (A), in this example of processing, the packed blocks (layer signals) input to the unpacking processor 254 include a packed block 661 (first-layer signal L1) composed of pieces of pixel data A1, A3, C1, and C3, and a packed block 662 (second-layer signal L2) composed of pieces of pixel data A2, A4, C2, and C4. The first-layer signal L1 and the second-layer signal L2 correspond to the packed blocks 341 and 342 described earlier with reference to FIGS. 16 and 17.

Referring to part (B), in the processing executed by the unpacking processor 254, the input packed blocks 661 and 662 are unpacked into pixel data of the individual frames 1 to 4, thereby generating four blocks composed of decimated pixel data of the individual frames. In this case, the blocks of the frames 1 to 3 are generated from the input packed block 661 and the blocks of the frames 2 and 4 are generated from the input packed block 662 so that these blocks are composed only of the pixel values of the first and third pixels from the left.

Referring to part (C), in the processing executed by the block processor 257, using the blocks input from the unpacking processor 254, the pixel values of the sampled pixels in the block are copied to positions where pixel values are not defined, thereby generating blocks of the individual frames. In this case, the pixels A and C of the blocks of the individual frames 1 to 4 are copied to the second and fourth columns of the frames, thereby reconstructing the blocks of the individual frames.

In this example, the number of layers to be processed in the image expander 200 is Lm=2, and the number of layers generated by processing in the image compressor 100 is n=4. The block processor 257 executes copying so that the number of pixels in a block after copying is n/Lm=2 times as large as the number of pixels before copying, so that moving-picture data Dout having the same number of pixels in each frame as the original signal is output.

FIG. 32 shows an example of processing for reconstructing blocks using layer signals (packed blocks) obtained through spatial and temporal decimation, in which a first-layer signal L1 to a fourth-layer signal L4 are used for reconstruction. The processing involves unpacking and block reconstruction by the unpacking processor 254 and the block processor 257 shown in FIG. 23.

Referring to part (A), in this example of processing, the packed blocks (layer signals) input to the unpacking processor 254 include a packed block 671 (first-layer signal L1) composed of pieces of pixel data A1, A3, C1, and C3, a packed block 672 (second-layer signal L2) composed of pieces of pixel data B1, B3, D1, and D3, a packed block 673 (second-layer signal L2) composed of pieces of pixel data A2, A4, C2, and C4, and a packed block 674 (fourth-layer signal L4) composed of pieces of pixel data B2, B4, D2, and D4. The first-layer signal L1 to the fourth-layer signal L4 correspond to the packed blocks 341 to 344 described earlier with reference to FIGS. 16 to 19.

Referring to part (B), in the processing executed by the unpacking processor 254, the input packed blocks 671 to 674 are unpacked into pixel data of the individual frames 1 to 4, thereby generating four blocks composed of decimated pixel data of the individual frames. In this case, four blocks in which the pixel values of all the four frames are set are generated.

Referring to part (C), in the processing executed by the block processor 257, using the blocks input from the unpacking processor 254, the pixel values of the sampled pixels in the block are copied to positions where pixel values are not defined, thereby generating blocks of the individual frames. In this case, the blocks of the frames 1 to 4, input from the unpacking processor 254, do not include pixels where pixel values are not defined. Thus, the blocks are output as reconstructed blocks of the individual frames without copying pixel values.

In this example, the number of layers to be processed in the image expander 200 is Lm=4, and the number of layers generated by processing in the image compressor 100 is n=4. The block processor 257 executes copying so that the number of pixels in a block after copying is n/Lm=1 times as large as the number of pixels before copying, i.e., the block processor 257 does not execute copying, and moving-picture data Dout having the same number of pixels in each frame as the original signal is output.

As described above, the unpacking processors 252 to 254 and the block processors 255 to 257 shown in FIG. 23 executes unpacking and block processing corresponding to spatial decimation, temporal decimation, or spatial and temporal decimation on blocks that are distributed by the block distributor 251 according to amounts of movement in the blocks, thereby reconstructing blocks of individual frames, and outputs the blocks to a block combiner 258.

The block combiner 258 selects and combines, on a frame-by-frame basis, image signals of individual blocks corresponding to divided areas of individual frames, supplied from the block processors 255 to 257, according to block processing information Inf supplied from the decoder 210 via the block distributor 251 and the unpacking processors 252 to 254, thereby generating and outputting image signals Dout of the individual frames.

Figure 33:
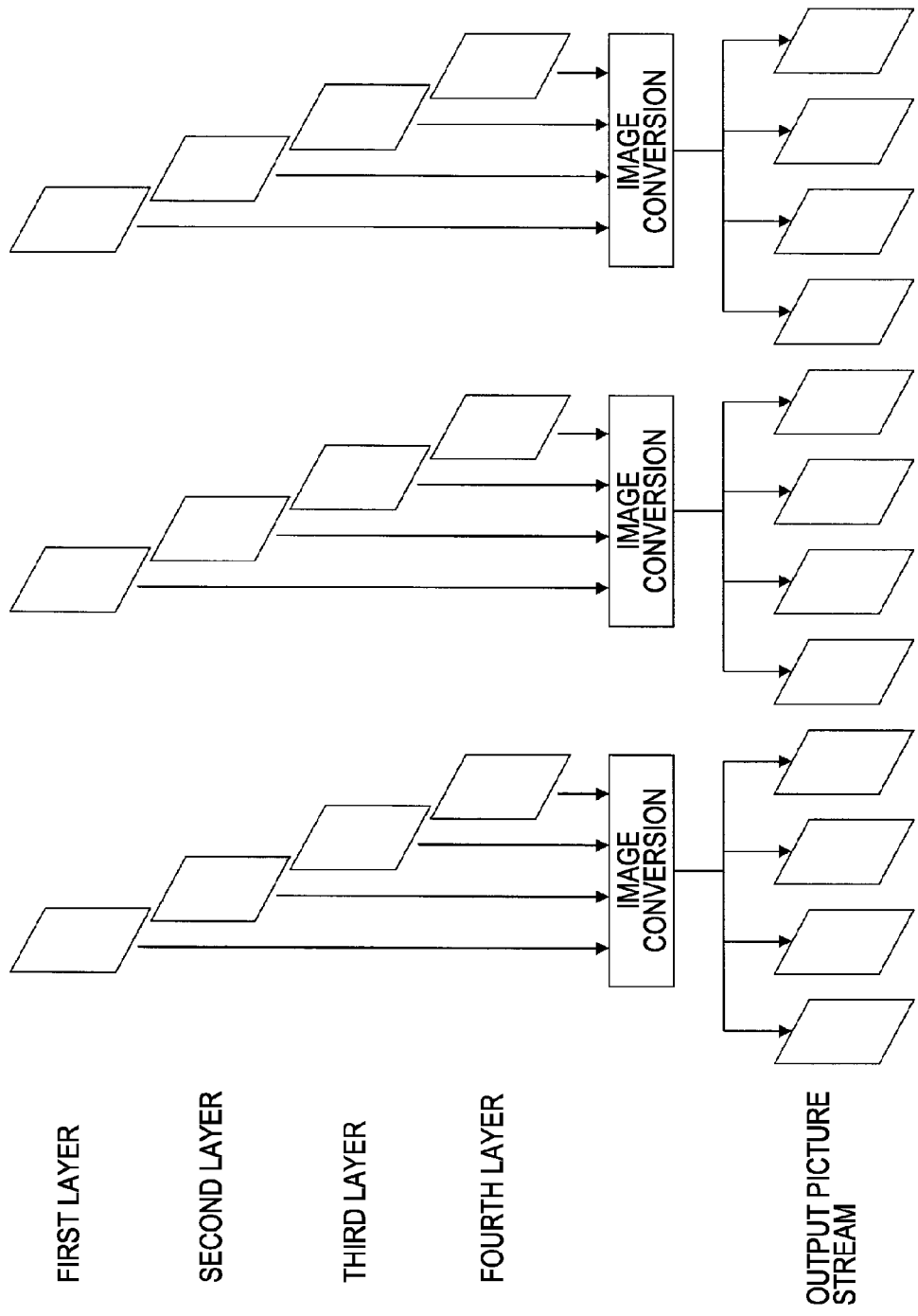
FIG. 33 is a diagram for explaining relationship between input signals and output picture frames in the image expander.

For example, when processing is executed in units of four frames, an output picture stream generated from layer signals is configured as shown in FIG. 33. The output picture stream is generated by executing image conversion including the unpacking and block processing described above on the basis of first-layer to fourth-layer signals.

As described above, in the image expander 200, the image converter 250 executes fourfold data expansion when only a first-layer signal is received for reconstruction, executes twofold data expansion when first-layer and second-layer signals are received for reconstruction, and does not execute data expansion when all the layer signals are received for reconstruction. As will be understood from the examples of processing described above, the amounts of information of the individual layer signals L1 to Ln generated by the image compressor 100 are equivalent, so that it is possible to choose an arbitrary layer as a base layer or an enhancement layer.

According to this embodiment, when the bandwidth of a transmission path is narrow or when the reception quality is degraded, it is possible to decrease the transmission bitrate by transmitting only a base-layer stream from the encoder 150 of the image compressor 100 shown in FIG. 1. Also, when the processing ability of the decoder 210 or the image converter 250 of the image expander 200 at a receiving end is not sufficient, it is possible to reduce the load of signal processing or power consumption by receiving and decoding only a base-layer stream among streams that are transmitted. Furthermore, since it is possible to choose an arbitrary layer as a base layer as described above, at the time of reception, it is possible to select a layer in which error is absent as a base layer through dynamic switching.

As described above, according to this embodiment, by executing compression using human vision characteristics, high-quality display can be achieved even when only a base layer is decoded. Furthermore, by receiving and decoding enhancement layers selectively, it is possible, for example, to improve picture quality is slow playback mode or to improve picture quality at boundaries of moving objects. Furthermore, since the amounts of information of individual layers are equivalent, it is possible to choose an arbitrary layer as a base layer.

Other Embodiments

The embodiment has been described above in the context of examples of processing where individual layer signals L1 to Ln are generated using pixel values in blocks and encoded stream signals St1 to Stn based on the layer signals L1 to Ln are generated and output. In an alternative scheme, for example, an encoded stream signal St1 based on pixel values is generated and output only for a single base layer, and stream signals St2 to St2 corresponding to layer signals L2 to Ln of enhancement layers may be generated and output by calculating differences between the differences between the layer signals of the base layer L1 and the enhancement layers L2 to Ln and generating encoded data based on the difference values.

Figure 34:
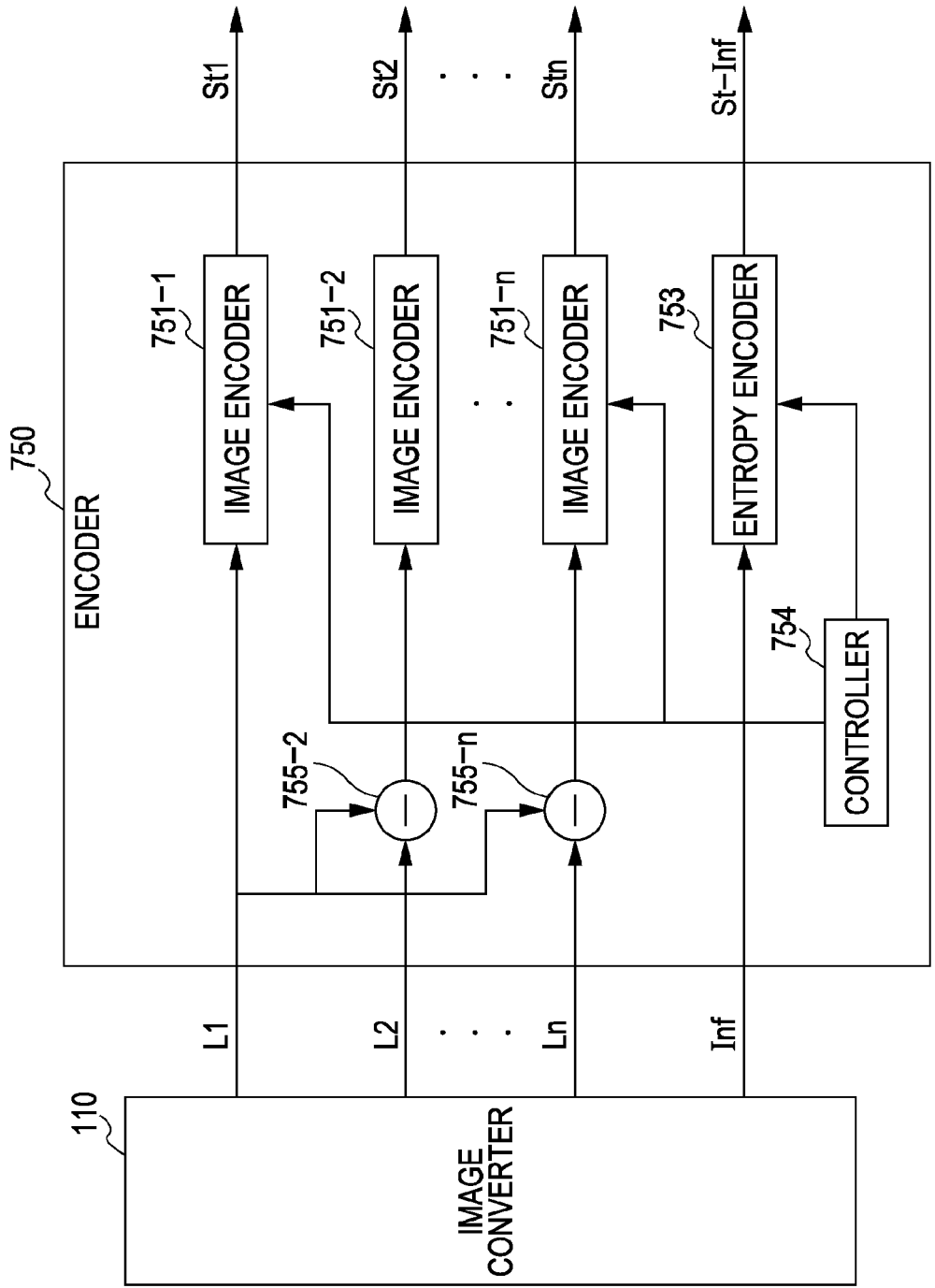
FIG. 34 is a diagram showing an example construction of the encoder in the image compressor.

FIG. 34 shows an example construction of an encoder 750 in an image compressor that generates stream signals based on difference values. An image encoder 751-1 encodes a first-layer signal L1 corresponding to a base layer, output from the image converter 110, thereby generating and outputting a stream signal St1 corresponding to the layer signal L1.

Subtractors 755-2 to 755-$n$ calculate differences between the first-layer signal L1 corresponding to the base layer, output from the image converter 110, and second-layer to n-th layer signals L2 to Ln corresponding to enhancement layers. Image encoders 751-2 to 751-$n$ encode the difference values between the first-layer signal L1 and the second-layer to n-th-layer signals L2 to Ln, output from the subtractors 755-2 to 755-$n$, thereby generating and outputting stream signals St2 to Stn.

The image encoders 751-1 to 751-$n$ execute encoding in accordance with bitrates supplied from a controller 754. Encoding schemes that may be employed include, for example, MPEG (Moving Picture Experts Group), which is suitable for compressing moving pictures, and JPEG (Joint Photographic Experts Group), which is suitable for compressing still pictures.

An entropy encoder 753 executes lossless encoding of block processing information Inf supplied from the image converter 110 to output a block-processing-information stream St-Inf.

The controller 754 controls the number of layers to be transmitted in accordance with the bandwidth of a transmission path or the status of occurrence of transmission error so that stable decoding can be achieved at a receiving end. For example, when it is known that the transmission path or reception bandwidth is narrow depending on applications, the controller 754 exercises control so that only the first-layer stream is transmitted, thereby decreasing the transmission bitrate. As another example, the controller 754 monitors errors on the transmission path, and exercises control so that the number of layers of data transmitted is reduced and the transmission bitrate is decreased when the error occurrence rate increases.

Figure 35:
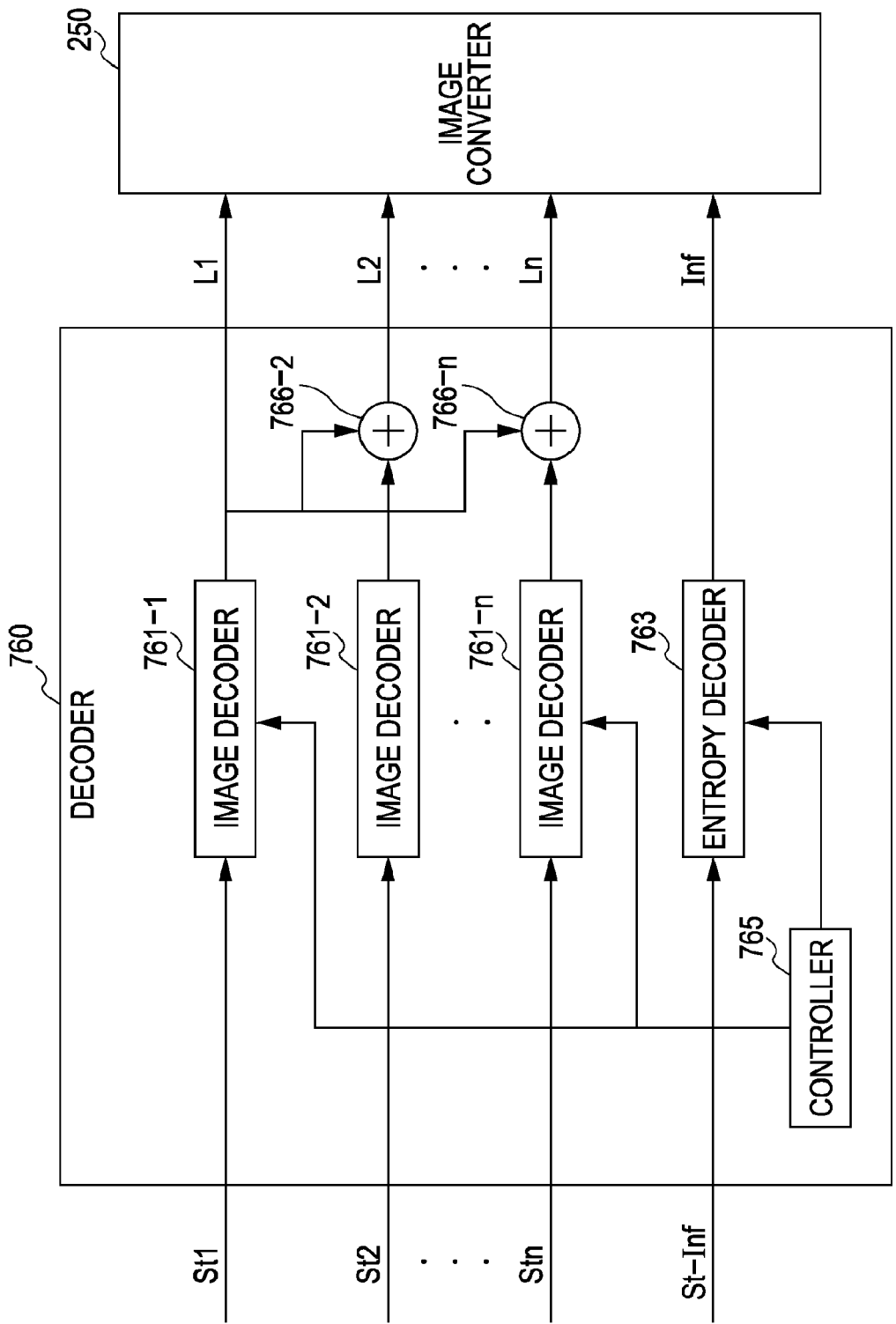
FIG. 35 is a diagram showing an example construction of the decoder in the image expander.

Next, the construction and operation of a decoder 760 in the image expander 200 that decodes the stream signals based on the difference values will be described in detail with reference to FIG. 35.

The decoder 760 receives the stream St1 corresponding to the first-layer signal L1 corresponding to the base layer and the streams St1 to Stn composed of encoded data of the differences between the first-layer signal L1 and the second-layer to n-th layer signals L2 to Ln, transmitted from the encoder 750 of the image compressor 100, and executes decoding to generate the layer signals L1 to Ln.

An image decoder 761-1, under the control of a controller 764, decodes the stream St1 corresponding to the first layer corresponding to the base layer, thereby generating a first-layer signal L1 corresponding to the first layer.

Image decoders 761-2 to 761-$n$, under the control of the controller 764, decodes the streams St2 to Stn corresponding to the difference values between the first-layer signal L1 and the second-layer to n-th layer signals L2 to Ln, thereby calculating the difference values between the first-layer signal L1 and the second-layer to n-th layer signals L2 to Ln.

Furthermore, the difference values are input to adders 766-2 to 766-$n$ and added to the first-layer signal L1, whereby second-layer to n-th-layer signals L2 to Ln are generated and output. An entropy decoder 764 executes lossless decoding of the block-processing-information stream St-Inf to output block processing information Inf.

Also in this example of processing, in the decoder 760, the controller 765 restricts streams received in accordance with the status of data reception by the decoder 760, the processing ability of the image expander 200, and so forth, thereby controlling the number of layers of data for which decoding and image conversion are executed. For example, when reception errors increase, the controller 215 assumes that reception quality is degraded. Then, the controller 215 requests a transmitting end to reduce the transmission bitrate so that the number of streams received is reduced. Also, the controller 215 exercises control so that the number of streams received is reduced when, for example, power consumption of the decoder 760 and the image converter 250 is to be reduced in accordance a request from an application.

When difference values are calculated and output as stream signals as described above, the amount of data is reduced, and the efficiency of encoding and decoding is improved. Furthermore, since the amount of data transferred is reduced, network congestion is alleviated.

Figure 36:
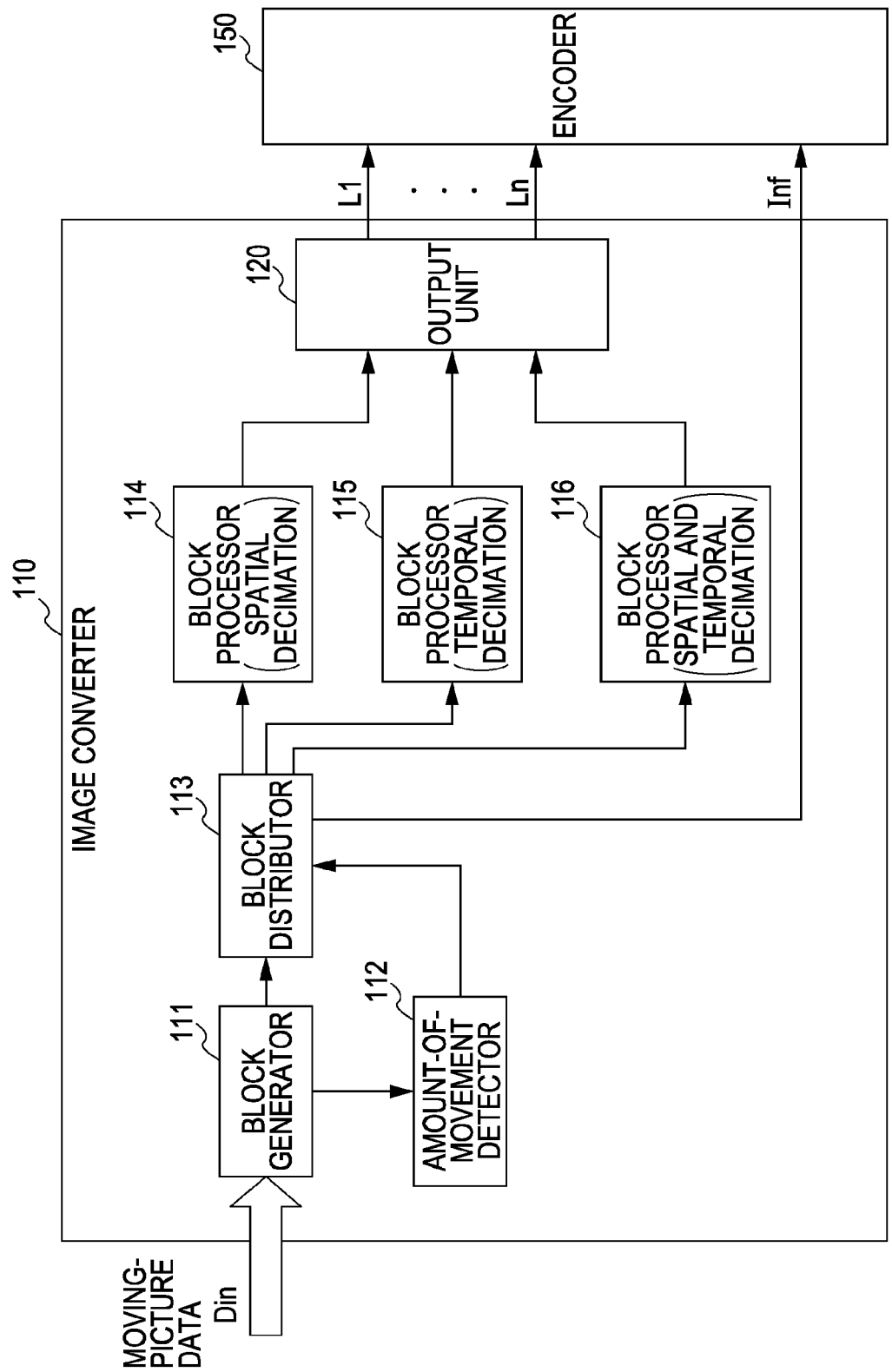
FIG. 36 is a diagram showing an example construction of the image converter in the image compressor.

The embodiment has been described above in the context of examples where an image compressor executes packing based on decimated data and an image expander executes unpacking. However, packing and unpacking may be omitted. In that case, data obtained through spatial decimation, temporal decimation, or spatial and temporal decimation by block processors in the image compressor 100 are directly input to the encoder 150 shown in FIG. 1 as layer signals L1 to Ln of individual layers without packing, thereby generating and outputting stream signals St1 to Stn corresponding to the individual layer signals L1 to Ln. FIG. 36 shows the construction of an image converter 110 not including packing processors. The construction is otherwise the same as the construction described earlier with reference to FIG. 2.

Figure 37:
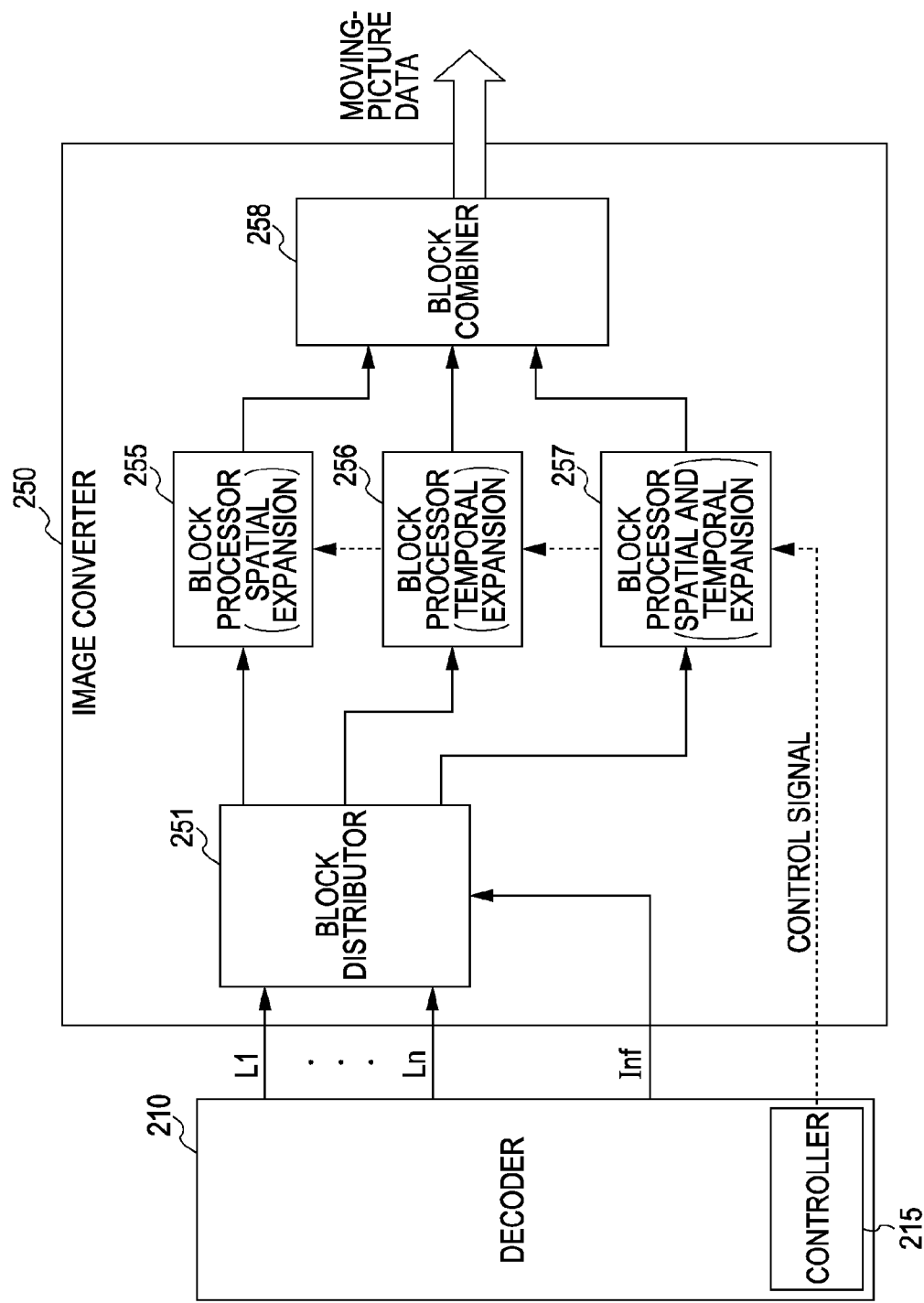
FIG. 37 is a diagram showing an example construction of the image converter in the image expander.

In the image expander 200, layer signals L1 to Ln generated through decoding by the decoder 210 are input to the image converter 250, and the image converter 250 executes expansion based on the layer signals L1 to L2 without unpacking, thereby generating block data of individual frames. FIG. 37 shows the construction of an image converter 250 not including unpacking processors. The construction is otherwise the same as the construction described earlier with reference to FIG. 23.

According to this example of processing, a simple apparatus can be implemented by omitting packing and unpacking.

Although the embodiments of the present invention have been described above, obviously, it is possible for those skilled in the art to make modifications or alternatives of the embodiments without departing from the spirit of the present invention. That is, the present invention has been described by way of examples, and the present invention should not be construed restrictively. The spirit of the present invention should be construed according to the claims.

The series of processes described in this specification can be executed by hardware, by software, or by combination of hardware and software. When the processes are executed by software, programs in which processing sequences are recorded are installed and executed in a memory of a computer embedded in special hardware, or the programs are installed and executed on a general-purpose computer that is capable of executing various processes.

For example, the programs can be recorded in advance on a hard disc or a read-only memory (ROM) that serves as a recording medium. Alternatively, the programs may be temporarily or permanently stored (recorded) on a removable recording medium such as a flexible disc, a compact disc read-only memory (CD-ROM), a magneto-optical (MO) disc, a digital versatile disc (DVD), a magnetic disc, or a semiconductor memory. Such a removable recording medium can be provided in the form of what is called package software.

Instead of installing the programs on a computer from the removable recording medium described above, the programs may be transferred by wireless to a computer from a downloading site or transferred by wire to a computer via a network such as a local area network (LAN) or the Internet, so that the computer can receive the programs transferred and install the programs on an internal recording medium such as a hard disc.

The various processes described in this specification may be executed in parallel or individually as needed or in accordance with the processing ability of an apparatus that executes the processes, instead of being executed sequentially in the orders described. A system in this specification refers to a logical combination of a plurality of apparatuses, and is not limited to one in which constituent apparatuses exist within the same case.

What is claimed is:

1. An image processing apparatus that compresses moving-picture data, the image processing apparatus comprising:
   an image converter configured to decimate pixels in individual blocks that are defined by dividing frames of moving-picture data, the image converter being configured to generate a plurality of layer signals using different sampled pixels corresponding to representative pixels in pixel decimation; and
   an encoder configured to receive the plurality of layer signals generated by the image converter and to generate encoded data based on the layer signals,
   wherein,
   (1) the image converter includes
      (a) block generator configured to receive individual frames of the moving-picture data and to divide the individual frames of moving-picture data into blocks,
      (b) an amount-of-movement detector configured to detect amounts of movement of an object in the individual blocks generated by the block generator,
      (c) a block distributor which receives as an input the results of the amounts of movement detected by the amount-of-movement detector, and
      (d) block processors respectively configured to execute (i) spatial decimation, (ii) temporal decimation, and (iii) spatial and temporal decimation of a plurality of blocks in a plurality of successive frames forming a unit of decimation, and
      (e) a plurality of packing processors respectively in communication with the block processors, each configured to generate a packed block in which sample pixels included in data output from a respective block processor are packed, the packing processors being configured to generate a plurality of packed block signals as the plurality of layer signals using different sample pixels;
   (2) the block distributor selectively distributes each of the blocks supplied by the block generator to one of the block processors according to the amounts of movement detected by the amount-of-movement detector;
   (3) the plurality of blocks are decimated spatially, temporally, or spatially and temporally so that a plurality of pieces of decimated data corresponding to a plurality of layer signals is generated using the different sampled pixels; and
   (4) the encoder is configured to encode the plurality of layer signals and to generate streaming signals corresponding to the individual layer signals.

2. The image processing apparatus according to claim 1, wherein the encoder is configured to calculate a difference between the layer signals and to generate encoded data on the basis of the difference calculated.

3. The image processing apparatus according to claim 1, wherein the block processors are configured to generate the plurality of layer signals using different sampled pixels so that the plurality of layer signals have equivalent amounts of information.

4. An image processing method for compressing moving-picture data, the image processing method comprising the steps of:
   receiving individual frames of moving-picture data;
   generating blocks by dividing individual frames of moving-picture data into blocks;
   detecting amounts of movement of an object in the individual blocks generated in the block generating step;
   selectively distributing the blocks among a plurality of block processors based on the amounts of movement detected;
   block processing the blocks with the block processors by, respectively, executing spatial decimation, temporal decimation, or spatial and temporal decimation of the blocks in a plurality of successive frames forming a unit of decimation, the plurality of blocks being decimated spatially, temporally, or spatially and temporally so that a plurality of pieces of decimated data corresponding to a plurality of layer signals are generated using different sampled pixels;
   packing the decimated blocks by generating respective packed blocks in which sampled pixels included in data generated in the block processing step are packed, the packing generating a plurality of packed blocks corresponding to a plurality of layer signals corresponding to the different sampled pixels; and
   encoding the layer signals and generating streaming signals corresponding to the individual layer signals.

5. The image processing method according to claim 4, wherein the encoding step includes the step of calculating a difference between the layer signals and generating encoded data on the basis of the difference calculated.

6. The image processing method according to claim 4, wherein the block processing step includes generating the plurality of layer signals using different sampled pixels so that the plurality of layer signals have equivalent amounts of information.

7. A non-transitory and tangible computer readable medium on which is stored a computer program which when executed on a computer based system causes the computer based system to effects the steps of:

receiving individual frames of moving-picture data;
generating blocks by dividing individual frames of moving-picture data into blocks;
detecting amounts of movement of an object in the individual blocks generated in the block generating step;
selectively distributing the blocks among a plurality of block processors based on the amounts of movement detected;
block processing the blocks with the block processors by, respectively, executing spatial decimation, temporal decimation, or spatial and temporal decimation of the blocks in a plurality of successive frames forming a unit of decimation, the plurality of blocks being decimated spatially, temporally, or spatially and temporally so that a plurality of pieces of decimated data corresponding to a plurality of layer signals are generated using different sampled pixels;
packing the decimated blocks by generating respective packed blocks in which sampled pixels included in data generated in the block processing step are packed, the packing generating a plurality of packed blocks corresponding to a plurality of layer signals corresponding to the different sampled pixels; and
encoding the layer signals and generating streaming signals corresponding to the individual layer signals.

\* \* \* \* \*